US012720030B2

(12) United States Patent
Zobel et al.

(10) Patent No.: US 12,720,030 B2
(45) Date of Patent: Aug. 25, 2026

(54) SYSTEMS AND METHODS FOR IMAGE REPROJECTION

(71) Applicants: QUALCOMM Incorporated, San Diego, CA (US); Shmuel Zobel, Hinanit (IL)

(72) Inventors: Pia Zobel, Hinanit (IL); Yuval Schwartz, Haifa (IL); Tal Zadik, Haifa (IL); Itschak Martsiano, Haifa (IL); Roee Hardoon, Zichron Yaakov (IL); Meir Tzur, Haifa (IL); Ron Gaizman, Hof HaCarmel (IL); Yehuda Pasternak, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/931,063

(22) Filed: Sep. 9, 2022

(65) Prior Publication Data

US 2023/0216999 A1 Jul. 6, 2023

Related U.S. Application Data

(60) Provisional application No. 63/266,316, filed on Dec. 31, 2021.

(51) Int. Cl.
*H04N 13/111* (2018.01)
*G06T 5/77* (2024.01)
(Continued)

(52) U.S. Cl.
CPC .............. *H04N 13/111* (2018.05); *G06T 5/77* (2024.01); *G06T 7/20* (2013.01); *G06T 7/50* (2017.01); *G06T 2207/20081* (2013.01)

(58) Field of Classification Search
None
See application file for complete search history.

(56) References Cited

U.S. PATENT DOCUMENTS

2011/0148858 A1* 6/2011 Ni ........................ H04N 13/111 348/E13.001
2016/0353058 A1* 12/2016 Caviedes ................ H04N 7/15
(Continued)

FOREIGN PATENT DOCUMENTS

TW 201812708 A 4/2018

OTHER PUBLICATIONS

Bowles H., et al., "Iterative Image Warping", Computer Graphics Forum: Journal of the European Association for Computer Graphics, Wiley-Blackwell, Oxford, vol. 31, Jun. 20, 2012 , pp. 237-246, XP071487678, ISSN: 0167-7055, 10 Pages, abstract, p. 238, paragraph 3-p. 241, paragraph 3.3, p. 243, paragraph 4.
(Continued)

*Primary Examiner* — Xiaolan Xu
(74) *Attorney, Agent, or Firm* — QUALCOMM Incorporated

(57) ABSTRACT

An imaging system receives depth data (corresponding to an environment) from a depth sensor and first image data (a depiction of the environment) from an image sensor. The imaging system generates, based on the depth data, first motion vectors corresponding to a change in perspective of the depiction of the environment in the first image data. The imaging system generates, using grid inversion based on the first motion vectors, second motion vectors that indicate respective distances moved by respective pixels of the depiction of the environment in the first image data for the change in perspective. The imaging system generates second image data by modifying the first image data according to the second motion vectors. The second image data includes a second depiction of the environment from a different perspective than the first image data. Some image reprojection applications (e.g., frame interpolation) can be performed without the depth data.

30 Claims, 41 Drawing Sheets

(51) Int. Cl.
*G06T 7/20* (2017.01)
*G06T 7/50* (2017.01)

(56) References Cited

U.S. PATENT DOCUMENTS

| | | | | |
|---|---|---|---|---|
| 2018/0268531 | A1* | 9/2018 | Takahashi | G06T 7/593 |
| 2019/0325580 | A1* | 10/2019 | Lukac | G06T 3/4038 |
| 2020/0286293 | A1* | 9/2020 | Jia | G06T 15/205 |

OTHER PUBLICATIONS

International Search Report and Written Opinion—PCT/US2022/082189—ISA/EPO—May 3, 2023.

Lee S., et al., "Iterative Depth Warping", ACM Transactions on Graphics, ACM, NY, US, vol. 37, No. 5, Oct. 23, 2018, pp. 1-13, XP058685227, ISSN: 0730-0301, abstract, p. 2, left-hand column, line 6-last line p. 3, paragraph 3-p. 5.

Purica A.I., et al., "Improved View Synthesis by Motion Warping and Temporal Hole Filling", 2015 IEEE International Conference on Acoustics, Speech and Signal Processing (ICASSP), IEEE, Apr. 19, 2015, pp. 1191-1195, XP033186904, abstract, p. 1191, paragraph 1-p. 1193, paragraph 3.

Bowles H., et al., "Iterative Image Warping", Computer Graphics Forum, Jorenal of the European Association for Computer Graphics, May 2012, vol. 31, No. 2, Wiley-Blackwell, Jun. 20, 2012, pp. 237-246, Abstract, Method Section.

Purica A. I., et al., "Improved View Synthesis by Motion Warping and Temporal Hole Filling", 2015 IEEE International Conference on Acoustics, Speech and Signal Processing (ICASSP), Apr. 19, 2015, IEEE, pp. 1191-1195, Abstract, Temporal Hole Filing Section.

Taiwan Search Report—TW111149249—TIPO—May 25, 2026.

* cited by examiner

Time Warp 705 by Time Warp Engine 230 image 710 without time warp 705 image 715 using time warp 705

Dense
MV Map 720 n-4 n-3 n-2 n-1 n

Use Grid-inversion to calculate MV maps for interpolated frames

Depth Sensor Support 805 by Depth Sensor Support Engine 235 offset 820

Image sensors 810

Depth Sensors 815 (e.g., ToF sensors )

Use reprojection to calculate depth at position of image sensors 810

900

Reprojection 1105 by Reprojection SAT Engine 250

Tele 1130

Wide 1135

Modif. Tele 1140 depth data 1160 offset 1120

Tele Sensor 1110

Wide Sensor 1115

Sensor 1125

Sensors are on different locations. Use reprojection for seamless switch between cameras

1200

Head Pose Correction 1205 by Head Pose Correction Engine 255

Input Image 1210 with original head pose

Reprojected Image 1215 with Head Pose Altered depth data 1220

Use reprojection to render video from a different perspective, position, FOV, and/or angle

1300

XR Late Stage Reprojection 1305 by XR Late Stage Reprojection Engine 260

HMD 1320

HMD 1320

Input Image 1310

Reprojected Image 1315

Use reprojection to simulate an image from a different head pose

1400

Special Effects Engine 1405 by Special Effects Engine 265

Input Image 1410

Reprojected Image 1415

Use reprojection to simulate camera moving in space (e.g., around object(s))

2200

Image Processing Engine 2440

Temporal Deblur Engine 2505: Identify blurred frames m blurred frames

Reprojection Engine (RGE) 2535

Optical Flow Engine 2420 (e.g., dense grid, matrix)

Grid Inversion Engines 2425 (e.g., m grid inversions)

Warping Engine 2430

Warping Engine Downsample 2530

Transformation 2520 (e.g., shrink)

Frame n

Frame n-M

3000

Additional Examples 3005 of 3D Stabilization 905 by 3D Stabilization Engine 240

Orig

Stable

Orig

Stable

Orig

Stable

Orig

Stable

Use reprojection to eliminate annoying parallax walk movement

SYSTEMS AND METHODS FOR IMAGE REPROJECTION

CROSS-REFERENCE TO RELATED APPLICATIONS

This application claims the benefit of U.S. Provisional Application No. 63/266,316, filed Dec. 31, 2021 and titled "Systems and Methods for Image Reprojection," which is hereby incorporated by reference in its entirety and for all purposes.

FIELD

This application is related to image processing. More specifically, this application relates to systems and methods of reprojecting a first image that is captured from a first perspective to generate a second image that appears to be captured from a second perspective, for instance using grid inversion.

BACKGROUND

A camera is a device that receives light and captures image frames, such as still images or video frames, using an image sensor. A camera captures images that depict an environment from a perspective corresponding to the field of view of the camera.

An extended reality (XR) device is a device that displays an environment to a user, for example through a head-mounted display (HMD) or mobile handset. The environment is at least partially different from the real-world environment in which the user is in. The user can generally change their view of the environment interactively, for example by tilting or moving the HMD or other device. Virtual reality (VR), augmented reality (AR), and mixed reality (MR) are examples of XR. XR devices can include sensors that capture information from the environment.

BRIEF SUMMARY

In some examples, systems and techniques are described for image processing. In some examples, an imaging system receives depth data (corresponding to an environment). The imaging system receives first image data (including a depiction of the environment) captured by an image sensor. The imaging system generates, based on the depth data, first motion vectors corresponding to a change in perspective of the depiction of the environment in the first image data. The imaging system generates, using grid inversion based on the first motion vectors, second motion vectors that indicate respective distances moved by respective pixels of the depiction of the environment in the first image data for the change in perspective. The imaging system generates second image data by modifying the first image data according to the first motion vectors and/or the second motion vectors. The second image data includes a second depiction of the environment from a different perspective than the first image data. The imaging system outputs the second image data. Some image reprojection applications (e.g., frame interpolation) can be performed without the depth data.

In one example, an apparatus for image processing is provided. The apparatus includes a memory and one or more processors (e.g., implemented in circuitry) coupled to the memory. The one or more processors are configured to and can: receive depth data including depth information corresponding to an environment; receive first image data captured by an image sensor, the first image data including a depiction of the environment; generate, based on at least the depth data, a first plurality of motion vectors corresponding to a change in perspective of the depiction of the environment in the first image data; generate, using grid inversion based on the first plurality of motion vectors, a second plurality of motion vectors that indicate respective distances moved by respective pixels of the depiction of the environment in the first image data for the change in perspective; generate second image data at least in part by modifying the first image data according to the second plurality of motion vectors, wherein the second image data includes a second depiction of the environment from a different perspective than the first image data; and output the second image data.

In another example, a method of image processing is provided. The method includes: receiving depth data including depth information corresponding to an environment; receiving first image data captured by an image sensor, the first image data including a depiction of the environment; generating, based on at least the depth data, a first plurality of motion vectors corresponding to a change in perspective of the depiction of the environment in the first image data; generating, using grid inversion based on the first plurality of motion vectors, a second plurality of motion vectors that indicate respective distances moved by respective pixels of the depiction of the environment in the first image data for the change in perspective; generating second image data at least in part by modifying the first image data according to the second plurality of motion vectors, wherein the second image data includes a second depiction of the environment from a different perspective than the first image data; and outputting the second image data.

In another example, a non-transitory computer-readable medium is provided that has stored thereon instructions that, when executed by one or more processors, cause the one or more processors to: receive depth data including depth information corresponding to an environment; receive first image data captured by an image sensor, the first image data including a depiction of the environment; generate, based on at least the depth data, a first plurality of motion vectors corresponding to a change in perspective of the depiction of the environment in the first image data; generate, using grid inversion based on the first plurality of motion vectors, a second plurality of motion vectors that indicate respective distances moved by respective pixels of the depiction of the environment in the first image data for the change in perspective; generate second image data at least in part by modifying the first image data according to the second plurality of motion vectors, wherein the second image data includes a second depiction of the environment from a different perspective than the first image data; and output the second image data.

In another example, an apparatus for image processing is provided. The apparatus includes: means for receiving first image data captured by an image sensor, the first image data including a depiction of the environment; means for generating, based on at least the depth data, a first plurality of motion vectors corresponding to a change in perspective of the depiction of the environment in the first image data; means for generating, using grid inversion based on the first plurality of motion vectors, a second plurality of motion vectors that indicate respective distances moved by respective pixels of the depiction of the environment in the first image data for the change in perspective; means for generating second image data at least in part by modifying the first image data according to the second plurality of motion vectors, wherein the second image data includes a second depiction of the environment from a different perspective than the first image data; and means for outputting the second image data.

In some aspects, the second image data includes an interpolated image configured to depict the environment at a second time between a first time and a third time, wherein the first image data includes at least one image depicting the environment at least at one of the first time or the third time.

In some aspects, the first image data includes a plurality of frames of video data that includes a parallax movement, wherein the second image data includes a stabilized variant of the plurality of frames of video data that reduces the parallax movement.

In some aspects, the first image data includes a person looking at the image sensor from a first angle, wherein the second image data includes the person looking at the image sensor from a second angle that is distinct from the first angle.

In some aspects, a change in perspective includes a rotation in perspective according to an angle and about an axis. In some aspects, a change in perspective includes a translation in perspective according to a direction and a distance. In some aspects, a change in perspective includes a transformation. In some aspects, the change in perspective includes a movement along an axis between an original perspective of the depiction of the environment in the first image data and a position of an object in the environment, wherein at least a portion of the object is depicted in the first image data.

In some aspects, one or more of the methods, apparatuses, and computer-readable medium described above further comprise: identifying one or more gaps in the second image data based on one or more gaps in the second plurality of motion vectors; and modifying the second image data at least in part by filling in the one or more gaps in the second image data using interpolation before outputting the second image data.

In some aspects, one or more of the methods, apparatuses, and computer-readable medium described above further comprise: identifying one or more occlusion areas in the second image data based on one or more gaps in the second plurality of motion vectors; and modifying the second image data at least in part by filling in the one or more gaps in the second image data using inpainting before outputting the second image data.

In some aspects, one or more of the methods, apparatuses, and computer-readable medium described above further comprise: identifying one or more occlusion areas in the second image data based on one or more gaps in the second plurality of motion vectors; and modifying the second image data at least in part by filling in the one or more gaps in the second image data using inpainting using one or more trained machine learning models before outputting the second image data.

In some aspects, one or more of the methods, apparatuses, and computer-readable medium described above further comprise: identifying one or more conflicts in the second image data based on one or more conflicting values from the first image data in the second plurality of motion vectors; and selecting one of the one or more conflicting values from the first image data based on movement data associated with the second plurality of motion vectors.

In some aspects, the depth information includes a three-dimensional representation of an environment from a first perspective. In some aspects, the depth data is received from at least one depth sensor, wherein the at least one depth sensor includes at least one time of flight sensor.

In some aspects, outputting the second image data includes causing the second image data to be displayed using at least a display. In some aspects, outputting the second image data includes causing the second image data to be sent to at least a recipient device using at least a communication interface.

In some aspects, the depiction of the environment in the first image data depicts the environment from a first perspective, wherein the change in perspective is a change between the first perspective and the different perspective corresponding to the second depiction of the environment in the second image data.

In some aspects, the change in perspective includes at least one of a parallax movement in perspective or a rotation in perspective about an axis, further comprising: receiving, via a user interface, one of: an indication of a distance of the parallax movement in perspective, or an indication of an angle or an axis of the rotation in perspective.

In some aspects, one or more of the methods, apparatuses, and computer-readable medium described above further comprise: identifying, basing on one or more gaps in respective endpoints of the first plurality of motion vectors, one or more gaps in the second plurality of motion vectors that cause one or more gaps in the second image data; and modifying the second image data at least in part by filling in the one or more gaps in the second image data using interpolation before outputting the second image data.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
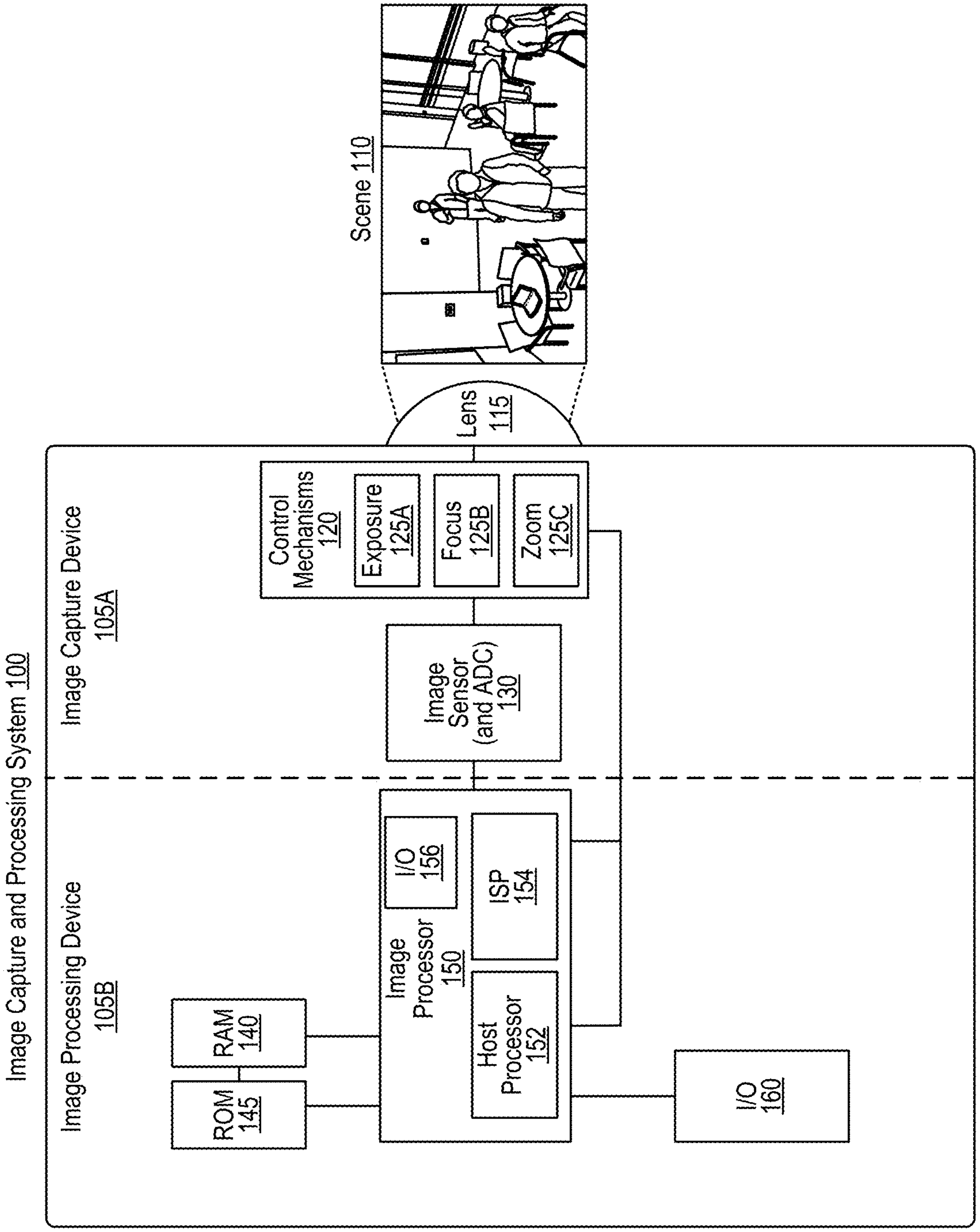
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A depth sensor is a sensor that measures a depth, range, or distance from the depth sensor to one or more portions of an environment that the depth sensor is in. Examples of depth sensors include light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, or combinations thereof. Depth data captured by depth sensors can include point clouds, 3D models, and/or depth images.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

An imaging system can include a depth sensor and an image sensor of a camera. The depth sensor captures depth data that includes depth information corresponding to an environment, such as a point cloud, a 3D model, a depth image, a set of disparity values, and/or a 3D representation of the environment. The image sensor captures first image data that includes a 2D depiction of the environment.

The imaging system uses the depth data to generate a first set of motion vectors. The first set of motion vectors correspond to a change in perspective of the depiction of the environment in the first image data, from a first perspective to a second perspective.

The imaging system applies grid inversion to the first set of motion vectors to generate a second set of motion vectors. The second set of motion vectors indicate respective distances moved by respective pixels of the depiction of the environment in the first image data for the change in perspective from the first perspective to the second perspective. In some cases, to apply grid inversion, the imaging system resolves conflicts with grid inversion by prioritizing larger motions over smaller motions, and/or by prioritizing motions of objects that are closer in the environment over motions of objects that are farther in the environment. In some cases, to apply grid inversion, the imaging system fills in missing areas using interpolation.

The imaging system generates second image data by modifying the image data according to the second set of motion vectors. For instance, the imaging system can modify the image data according to the second set of motion vectors by moving pixel data respective pixels of the depiction of the environment in the first image data by respective distances indicated by the second set of motion vectors. The second image data includes a second depiction of the environment from a different perspective than the first image data. The imaging system outputs the second image data, for instance by displaying the second image data or transmitting the second image data to a recipient device.

There are a variety of useful applications for the change in perspective put into effect by generating the second image data through modification of the first image data based on the second set of motion vectors that are based on grid inversion. For example, the change in perspective can be used for 3D stabilization of video data, for instance to reduce or eliminate parallax movements that may be caused by a user's unsteady hand holding the camera and/or by the user's footsteps. The change in perspective can be used for frame interpolation to increase effective frame rate of a video by generating an intermediate frame in between two existing frames. The change in perspective can be used for a "3D zoom" effect that scales a foreground of the environment more rapidly than a background of the environment, to look more similar to a true movement forward into the environment rather than upscaling. The change in perspective can be used to accommodate for an offset between two sensors (e.g., two cameras, the camera and the depth sensor, etc.). The change in perspective can be used for head pose correction, for instance to make the camera appear to be level with the head of a person when the camera is actually below or above the person, as is often the case for videoconferencing. The change in perspective can be used for XR, to rapidly simulate a different perspective on the environment even if the different perspective has not finished rendering. The change in perspective can be used for various special effects, such as effects that simulate a rotation around an object in the scene.

In some examples, systems and techniques are described for image processing. In some examples, an imaging system receives depth data (corresponding to an environment) captured by a depth sensor, and The imaging system receiving first image data (a depiction of the environment) captured by an image sensor. The imaging system generates, based on the depth data, first motion vectors corresponding to a change in perspective of the depiction of the environment in the first image data. The imaging system generates, using grid inversion based on the first motion vectors, second motion vectors that indicate respective distances moved by respective pixels of the depiction of the environment in the first image data for the change in perspective. The imaging system generates second image data by modifying the first image data according to the first motion vectors and/or the second motion vectors. The second image data includes a second depiction of the environment from a different perspective than the first image data. The imaging system outputs the second image data.

The imaging systems and techniques described herein provide a number of technical improvements over prior image processing systems. For instance, the image processing systems and techniques described herein can provide reprojection to a different perspective, for any translational and/or rotational movements in perspective. The image processing systems and techniques described herein can use this reprojection, and the grid inversion techniques that support it, for various applications, including improving video frame quality using optical flow, aligning depth and image data to overcome an offset distance between the two sensors, 3D depth-based video stabilization, 3D depth-based zoom (also referred to as cinematic zoom), aligning image data from two different cameras to overcome an offset distance between the two sensors, head pose correction, late stage reprojection for extended reality (XR), special effects, or combinations thereof. Use of grid inversion provides efficiency increases, computational load decreases, power usage decreases, heat generation decreases, and reduced need for heat dissipation components.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 4110 discussed with respect to the computing system 4100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth®, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 4120, read-only memory (ROM) 145 and/or 4125, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 4135, any other input devices 4145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP)

camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
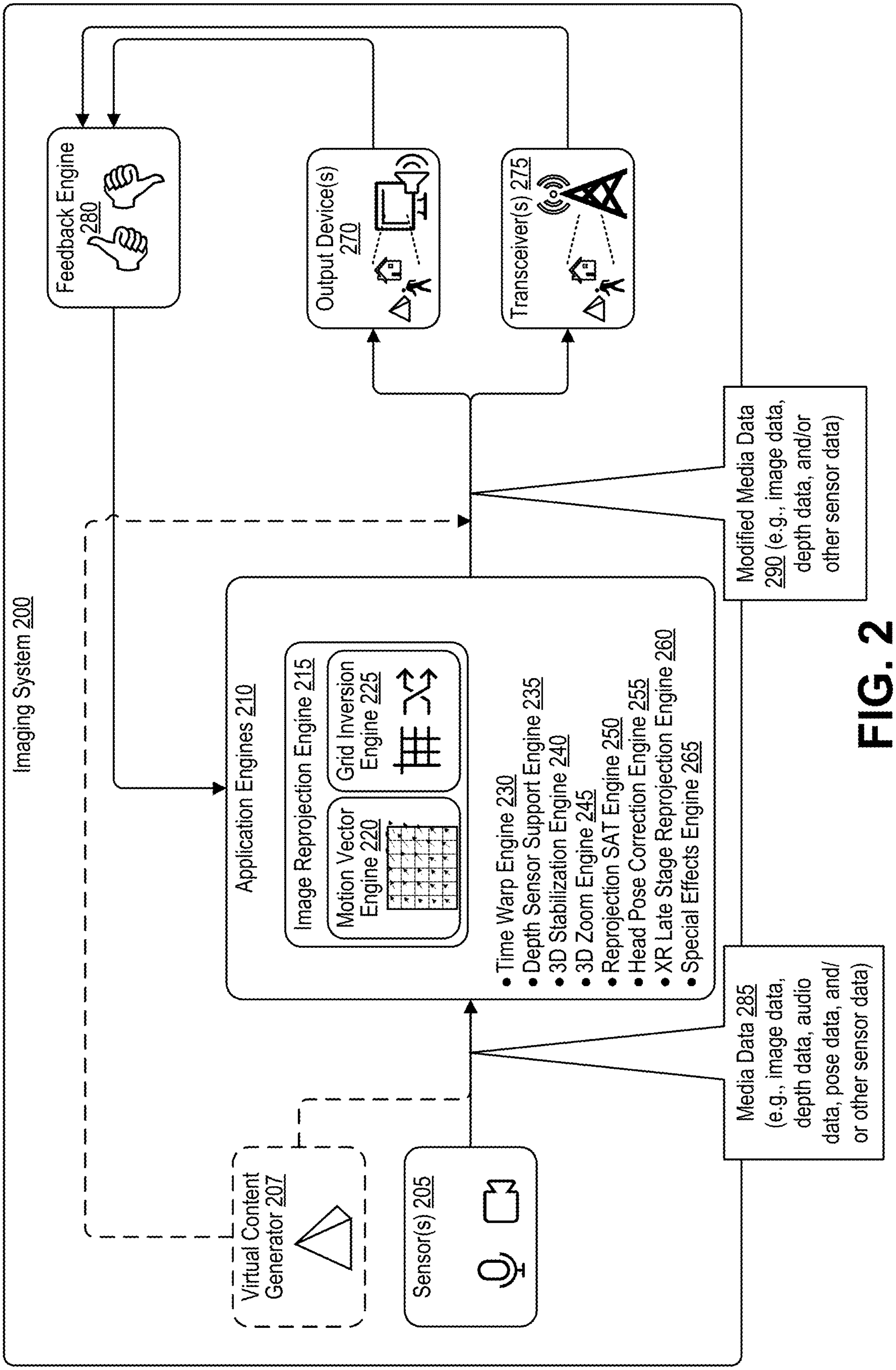
FIG. 2 is a block diagram illustrating an example architecture of an imaging system for performing reprojection operations for various applications, in accordance with some examples.

FIG. 2 is a block diagram illustrating an example architecture of an imaging system 200 for performing reprojection operations for various applications. In some examples, the imaging system 200 includes at least one image capture and processing system 100, image capture device 105A, image processing device 105B, or combination(s) thereof. In some examples, the imaging system 200 includes at least one computing system 4100. In some examples, the imaging system 200 includes at least one neural network 3900.

In some examples, the imaging system 200 includes one or more sensors 205. The sensors 205 capture sensor data measuring and/or tracking information about aspects of an environment, where the imaging system 200 and/or a user of the imaging system 200 are in the environment. In some examples, the sensors 205 can capture sensor data measuring and/or tracking information about the user's body and/or behaviors by the user. In some examples, the sensors 205 include one or more cameras that face at least a portion of the environment and/or the user. The one or more cameras can include one or more image sensors that capture images of at least a portion of the environment and/or the user. In some examples, the sensors 205 include one or more depth sensors that face at least a portion of the environment and/or the user. The one or more depth sensors can capture depth data (e.g., depth images, point clouds, 3D models, ranges between the depth sensors and portions of the environment, depths between the depth sensors and portions of the environment, and/or distances between the depth sensors and portions of the environment) of at least a portion of the environment and/or the user. In some examples, depth data (such as any of the types of depth data listed above) can also be determined using image data from stereoscopic cameras, using stereoscopic depth sensing. In some examples, depth data can be determined using image data from stereoscopic cameras by inputting the image data into trained machine learning model(s) that are trained based on training data. The training data includes other images captured by the stereoscopic cameras (or other cameras in a similar stereoscopic arrangement) along with corresponding depth data. In some examples, the sensors 205 include one or more other types of sensors, such as microphones, accelerometers, gyroscopes, positioning receivers, inertial measurement units (IMUs), biometric sensors, or combinations thereof. Within FIG. 2, the one or more sensors 205 are illustrated as a camera icon and a microphone icon.

The sensors 205 can include one or more cameras, image sensors, microphones, heart rate monitors, oximeters, biometric sensors, positioning transceivers, Inertial Measurement Units (IMUs), accelerometers, gyroscopes, gyrometers, barometers, thermometers, altimeters, depth sensors, other sensors discussed herein, or combinations thereof. Examples of depth sensors include light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, or combinations thereof. Examples of the positioning receivers include Global Navigation Satellite System (GNSS) receivers, Global Positioning System (GPS) receivers, cellular signal transceivers, Wi-Fi transceivers, wireless local area network (WLAN) transceivers, Bluetooth transceivers, beacon transceivers, near field communication (NFC) transceivers, personal area network (PAN) transceivers, radio frequency identification (RFID) transceivers, communication interfaces 4140, or combinations thereof. In some examples, the one or more sensors 205 include at least one image capture and processing system 100, image capture device 105A, image processing device 105B, or combination(s) thereof. In some examples, the one or more sensors 205 include at least one input device 4145 of the computing system 4100. In some implementations, one or more of the sensor(s) 205 may complement or refine sensor readings from other sensor(s) 205. For example, the application engines 210 and/or the image reprojection engine 215 can use sensor data from the positioning receivers, inertial measurement units (IMUs), accelerometers, gyroscopes, and/or other sensors to refine and/or complement image data and/or depth data. For examples, the application engines 210 and/or the image reprojection engine 215 can use such sensor data to aid determining the pose (e.g., 3D location coordinates and/or orientation (e.g., pitch, yaw, and/or roll)) of the imaging system 200 in the environment during capture of image data and/or depth data, and/or with image stabilization and/or movement compensation.

In some examples, the imaging system 200 includes a virtual content generator 207 that generates virtual content. The virtual content can include two-dimensional (2D) shapes, three-dimensional (3D) shapes, 2D objects, 3D objects, 2D models, 3D models, 2D animations, 3D animations, 2D images, 3D images, textures, portions of other images, characters, strings of characters, or combinations thereof. In some examples, the imaging system 200 can combine the virtual content generated by the virtual content generator 207 with sensor data from the sensor(s) 205 to form media data 285. In some examples, the imaging system 200 can combine the virtual content generated by the virtual content generator 207 with the media data 285. Within FIG. 2, the virtual content generated by the virtual content generator 207 is illustrated as a tetrahedron. In some examples, the virtual content generator 207 includes one or more software elements, such as one or more sets of instructions corresponding to one or more programs, that are run on one or more processors of the imaging system 200, such as the processor 4110 of the computing system 4100, the image processor 150, the host processor 152, the ISP 154, or a combination thereof. In some examples, the virtual content generator 207 includes one or more hardware elements. For instance, the virtual content generator 207 can include a processor such as the processor 4110 of the computing system 4100, the image processor 150, the host processor 152, the ISP 154, or a combination thereof. In some examples, the virtual content generator 207 includes a combination of one or more software elements and one or more hardware elements.

The imaging system 200 includes a set of application engines 210. The application engines 210 receive media data 285 from the sensor(s) 205. The media data 285 is captured by the sensor(s) 205. The media data 285 can include image data, for instance including one or more images or portions thereof. The image data can include video data, for instance including video frames of a video. The media data 285 can include depth data, for instance including depth images, point clouds, 3D models, ranges between the depth sensors and portions of the environment, depths between the depth sensors and portions of the environment, and/or distances between the depth sensors and portions of the environment, or combinations thereof. The media data 285 can include audio data, for instance including audio recorded by one or more microphones of the sensor(s) 205. In some cases, the audio data can include an audio track corresponding to a video of the image data. In some cases, the audio data can be multi-channel audio from multiple microphones of the sensor(s) 205, for instance allowing separate audio tracks corresponding to audio reaching the sensor(s) 205 from different directions in the environment. The media data 285 can include pose data, for instance including location of the imaging system 200 in the environment (e.g., latitude, longitude, and/or altitude), orientation of the imaging system 200 (e.g., pitch, yaw, and/or roll), movement speed of the imaging system 200, acceleration of the imaging system 200, velocity of the imaging system 200, momentum of the imaging system 200, rotation of the imaging system 200, or combinations thereof. In some examples, the pose data can be captured using positioning receivers, inertial measurement units (IMUs), accelerometers, and/or gyroscopes of the imaging system 200. In some examples, the imaging system 200 can infer aspects of the pose data, and/or can refine the pose data, based on pose determinations based on other types of media data 285, such as the image data, the depth data, and/or the audio data.

The application engines 210 include an image reprojection engine 215 with a motion vector engine 220 and a grid inversion engine 225. The motion vector engine 220 of the image reprojection engine 215 can determine and/or generate a first set of motion vectors corresponding to a movement from a first perspective of the environment to a second perspective of the environment. In some examples, the motion vector engine 220 can identify or generate a 3D representation of the environment based on the depth data captured by the depth sensors of the sensor(s) 205 and/or the image data captured by the image sensors of the sensor(s) 205. The motion vector engine 220 can rotate, translate, and/or transform the 3D representation of the environment from representing the environment from a first perspective to representing the environment from a second perspective. The motion vector engine 220 can determine first set of motion vectors based on this change in perspective from the first perspective to the second perspective.

The motion vectors output by the motion vector engine 220 of the image reprojection engine 215 can be output to the grid inversion engine 225. The grid inversion engine 225 of the image reprojection engine 215 can perform grid inversion on the motion vectors to generate a second set of motion vectors. The image reprojection engine 215 can use the second set of motion to modify at least a subset of the media data 285 to generate modified media data 290. For instance, the image reprojection engine 215 can receive an image of the media data 285 that depicts the environment from a third perspective, and can apply the second set of motion vectors to the image to generate a modified image of the modified media data 290. The modified image can depict the environment from a fourth perspective. The change from the third perspective to the fourth perspective can match the change from the first perspective to the second perspective, for example applying the same amounts, distance(s), and/or angle(s) of rotation, translation, and/or transformation. For instance, in some examples, the change from the first perspective to the second perspective includes a rotation in perspective according to an angle, and the change from the third perspective to the fourth perspective includes the rotation in perspective according to the angle. In some examples, the change from the first perspective to the second perspective includes a translation in perspective according to a direction and a distance, and the change from the third perspective to the fourth perspective includes the translation in perspective according to the direction and the distance. In some examples, the change from the first perspective to the second perspective includes a transformation, and the change from the third perspective to the fourth perspective includes the translation in perspective according to the transformation.

In some examples, the image reprojection engine 215 includes one or more software elements, such as one or more sets of instructions corresponding to one or more programs, that are run on one or more processors of the imaging system 200, such as the processor 4110 of the computing system 4100, the image processor 150, the host processor 152, the ISP 154, or a combination thereof. In some examples, the image reprojection engine 215 includes one or more hardware elements. For instance, the image reprojection engine 215 can include a processor such as the processor 4110 of the computing system 4100, the image processor 150, the host processor 152, the ISP 154, or a combination thereof. In some examples, the image reprojection engine 215 includes a combination of one or more software elements and one or more hardware elements.

In some examples, the image reprojection engine 215 includes ML system(s) and/or trained ML model(s) that receive, as inputs, the media data 285 from the sensor(s) 205 and/or the virtual content generator 207. The ML system(s) and/or trained ML model(s) output modified media data 290 based on the media data 285 and/or the virtual content. In some cases, the ML system(s) and/or trained ML model(s) can modify the media data 285 and/or the virtual content so that the modified media data 290 includes depiction(s) and/or represent(s) of the environment that are from a different perspective than the perspective of the depiction(s) and/or represent(s) of the environment in the media data 285. In some examples, the ML system(s) and/or trained ML model(s) of the image reprojection engine 215 may include one or more neural network (NNs) (e.g., neural network 3900), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), one or more computer vision systems, one or more deep learning systems, or combinations thereof.

The application engines 210 include a number of engines that apply the image reprojection by the image reprojection engine 215 (e.g., including the motion vector engine 220 and/or the grid inversion engine 225) in various ways for various applications. These engines of the application engines 210 include a Time Warp Engine 230, a depth sensor support Engine 235, a 3D Stabilization Engine 240, a 3D Zoom Engine 245, a Reprojection SAT Engine 250, a Head pose correction Engine 255, an extended reality (XR) Late Stage Reprojection Engine 260, and a Special Effects Engine 265. The "SAT" in the Reprojection SAT Engine 250 may refer to sensor alignment, spatial alignment transform, or both. The Reprojection SAT Engine 250 may use sensor alignment, spatial alignment transform, or both. These engines of the application engines 210 modify at least a subset of the media data 285 to generate the modified media data 290, for instance harnessing the image reprojection by the image reprojection engine 215 (e.g., including the motion vector engine 220 and/or the grid inversion engine 225) to do so.

In some examples, at least one of the application engines 210 includes ML system(s) and/or trained ML model(s) that receive, as inputs, the media data 285 from the sensor(s) 205 and/or the virtual content generator 207. The ML system(s) and/or trained ML model(s) output modified media data 290 based on the media data 285 and/or the virtual content. In some cases, the ML system(s) and/or trained ML model(s) can modify the media data 285 and/or the virtual content so that the modified media data 290 includes depiction(s) and/or represent(s) of the environment that are from a different perspective than the perspective of the depiction(s) and/or represent(s) of the environment in the media data 285. In some examples, the ML system(s) and/or trained ML model(s) of at least one of the application engines 210 may include one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof.

In some examples, the application engines 210, including the image reprojection engine 215, can analyze (e.g., to determine the motion vectors), process, and/or modify the media data 285 with the virtual content generated by the virtual content generator 207 incorporated into the media data 285. In some examples, the application engines 210, including the image reprojection engine 215, can analyze (e.g., to determine the motion vectors), process, and/or modify the media data 285 without the virtual content generated by the virtual content generator 207 incorporated into the media data 285. In some examples, the modified media data 290 output by the application engines 210, including the image reprojection engine 215, can already include the virtual content generated by the virtual content generator 207, for instance if the virtual content was incorporated into the media data 285 that was input into the application engines 210. In some examples, the modified media data 290 output by the application engines 210, including the image reprojection engine 215, lacks the virtual content generated by the virtual content generator 207, for instance if the virtual content was not incorporated into the media data 285 that was input into the application engines 210. In such examples, the virtual content generated by the virtual content generator 207 can be added to the modified media data 290 after the modified media data 290 is output by the application engines 210 but before the modified media data 290 is output using the output device(s) 270 and/or the transceiver(s) 275.

In some examples, at least one of the application engines 210 includes one or more software elements, such as one or more sets of instructions corresponding to one or more programs, that are run on one or more processors of the imaging system 200, such as the processor 4110 of the computing system 4100, the image processor 150, the host processor 152, the ISP 154, or a combination thereof. In some examples, at least one of the application engines 210 includes one or more hardware elements. For instance, at least one of the application engines 210 can include a processor such as the processor 4110 of the computing system 4100, the image processor 150, the host processor 152, the ISP 154, or a combination thereof. In some examples, at least one of the application engines 210 includes a combination of one or more software elements and one or more hardware elements.

In some examples, the imaging system 200 includes one or more output devices 270 that are configured to, and can, output the modified media data 290. In some examples, the output device(s) 270 include display(s) that are configured to, and can, display visual media, such as images and/or videos. In some examples, the output device(s) 270 include audio output device(s), such as loudspeakers or headphones or connectors that are configured to couple the imaging system 200 to loudspeakers or headphones. The audio output device(s) are configured to, and can, play audio media, such as music, sound effects, audio tracks corresponding to videos, audio recording recorded by microphone(s) (e.g., of the sensor(s) 205), or combinations thereof. The output device(s) 270 may output media that includes a representation of the environment (e.g., the media data 285 as captured by the sensor(s) 205), virtual content (e.g., as generated by the virtual content generator 207), a combination of the representation of the environment and the virtual content, modification(s) to the representation(s) of the environment and/or to the virtual content and/or the combination (e.g., as modified using the application engines 210 and/or the image reprojection engine 215), or a combination thereof. In some examples, the output device(s) 270 can face the user of the imaging system 200. For instance, the display(s) of the output device(s) 270 can face the user of the imaging system 200, and/or can display visual media to (e.g., toward) the user of the imaging system 200. Similarly, the audio output device(s) of the output device(s) 270 can face the user of the imaging system 200, and/or can play audio media to (e.g., toward) the user of the imaging system 200. In some examples, the output device(s) 270 include an output device 4135. In some examples, the output device 4135 can include the output device(s) 270. Within FIG. 2, the output device(s) 270 are illustrated as a display displaying visual media data and a corresponding loudspeaker playing audio media data.

The imaging system 200 also includes one or more transceivers 275 that the imaging system 200 can use to output the modified media data 290 generated by the application engines 210 (e.g., including the image reprojection engine 215), for instance by sending the media to a recipient device. The recipient device can output the media using its own output device(s), for instance by displaying visual media data of the media using display(s) of the output device(s) and/or by playing audio media data of the media using audio output device(s) of the output device(s). The transceiver(s) 275 may include wired or wireless transceiver(s), communication interface(s), antenna(e), connections, couplings, coupling systems, or combinations thereof. In some examples, the transceiver(s) 275 may include the communication interface 4140 of the computing system 4100. In some examples, the communication interface 4140 of the computing system 4100 may include the transceiver(s) 275. Within FIG. 2, the transceiver(s) 275 are illustrated as wireless transceiver(s) 275 sending media data.

In some examples, the imaging system 200 includes a feedback engine 280. The feedback engine 280 can detect feedback received from a user through a user interface of the imaging system. The feedback engine 280 can detect feedback about one engine of the imaging system 200 received from another engine of the imaging system 200, for instance whether one engine decides to use data from the other engine or not. The feedback can be feedback regarding any of the application engines 210, such as the image reprojection engine 215, the motion vector engine 220, the grid inversion engine 225, the Time Warp Engine 230, the Depth sensor support Engine 235, the 3D Stabilization Engine 240, the 3D Zoom Engine 245, the Reprojection SAT Engine 250, the Head pose correction Engine 255, the XR Late Stage Reprojection Engine 260, the Special Effects Engine 265, or a combination thereof. The feedback received by the feedback engine 280 can be positive feedback or negative feedback. For instance, if the one engine of the imaging system 200 uses data from another engine of the imaging system 200, the feedback engine 280 can interpret this as positive feedback. If the one engine of the imaging system 200 declines to data from another engine of the imaging system 200, the feedback engine 280 can interpret this as negative feedback. Positive feedback can also be based on attributes of the sensor data from the sensor(s) 205 and/or inputs from the user interface, such as the user smiling, laughing, nodding, pressing a button associated with positive feedback, making a gesture associated with positive feedback (e.g., a thumbs up), saying a positive statement (e.g., "yes," "confirmed," "okay," "next"), or otherwise positively reacting to the media. Negative feedback can also be based on attributes of the sensor data from the sensor(s) 205 and/or inputs from the user interface, such as the user frowning, crying, shaking their head (e.g., in a "no" motion), pressing a button associated with negative feedback, making a gesture associated with negative feedback (e.g., a thumbs down), saying a negative statement (e.g., "no," "negative," "bad," "not this"), or otherwise negatively reacting to the virtual content.

In some examples, the feedback engine 280 provides the feedback to one or more ML systems of the imaging system 200 as training data to update the one or more ML systems of the imaging system 200. For instance, the feedback engine 280 can provide the feedback as training data to the ML system(s) and/or the trained ML model(s) of any of the application engines 210, such as the image reprojection engine 215, the motion vector engine 220, the grid inversion engine 225, the Time Warp Engine 230, the Depth sensor support Engine 235, the 3D Stabilization Engine 240, the 3D Zoom Engine 245, the Reprojection SAT Engine 250, the Head pose correction Engine 255, the XR Late Stage Reprojection Engine 260, the Special Effects Engine 265, or a combination thereof. Positive feedback can be used to strengthen and/or reinforce weights associated with the outputs of the ML system(s) and/or the trained ML model(s). Negative feedback can be used to weaken and/or remove weights associated with the outputs of the ML system(s) and/or the trained ML model(s).

In some examples, the feedback engine 280 includes a software element, such as a set of instructions corresponding to a program, that is run on a processor such as the processor 4110 of the computing system 4100, the image processor 150, the host processor 152, the ISP 154, or a combination thereof. In some examples, the feedback engine 280 includes one or more hardware elements. For instance, the feedback engine 280 can include a processor such as the processor 4110 of the computing system 4100, the image processor 150, the host processor 152, the ISP 154, or a combination thereof. In some examples, the feedback engine 280 includes a combination of one or more software elements and one or more hardware elements.

Figure 3A:
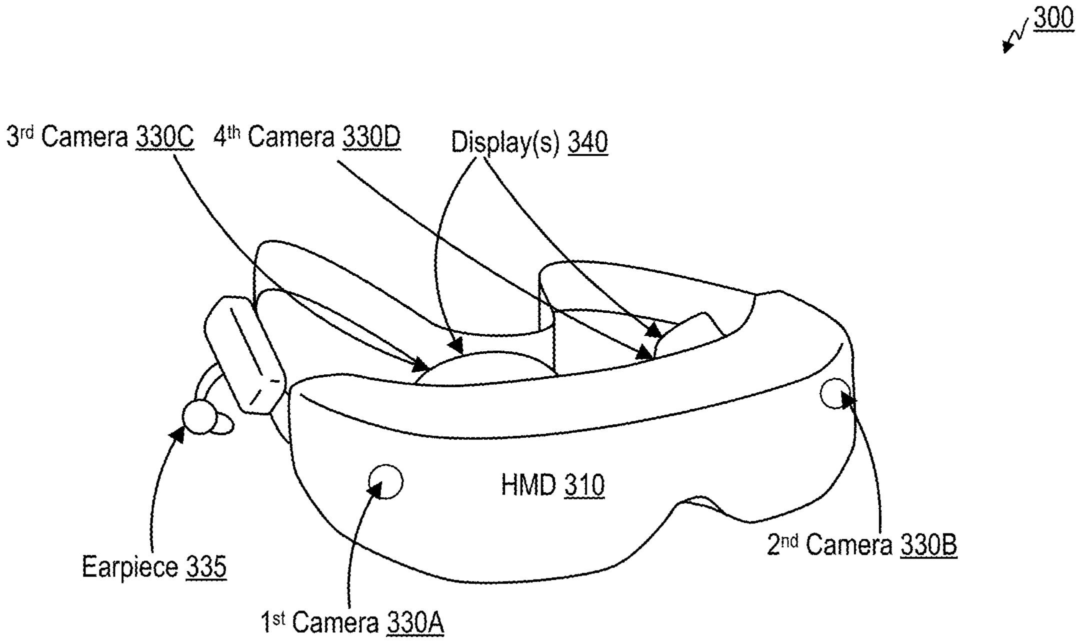
FIG. 3A is a perspective diagram illustrating a head-mounted display (HMD) that is used as an extended reality (XR) system, in accordance with some examples.

FIG. 3A is a perspective diagram 300 illustrating a head-mounted display (HMD) 310 that is used as an extended reality (XR) system 200. The HMD 310 may be, for example, an augmented reality (AR) headset, a virtual reality (VR) headset, a mixed reality (MR) headset, an extended reality (XR) headset, or some combination thereof. The HMD 310 may be an example of an imaging system 200. The HMD 310 includes a first camera 330A and a second camera 330B along a front portion of the HMD 310. The first camera 330A and the second camera 330B may be examples of the sensor(s) 205 of the imaging system 200. The HMD 310 includes a third camera 330C and a fourth camera 330D facing the eye(s) of the user as the eye(s) of the user face the display(s) 340. The third camera 330C and the fourth camera 330D may be examples of the sensors 205 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensors 205 and/or sensor(s) 205 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 270 of the imaging system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the left eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
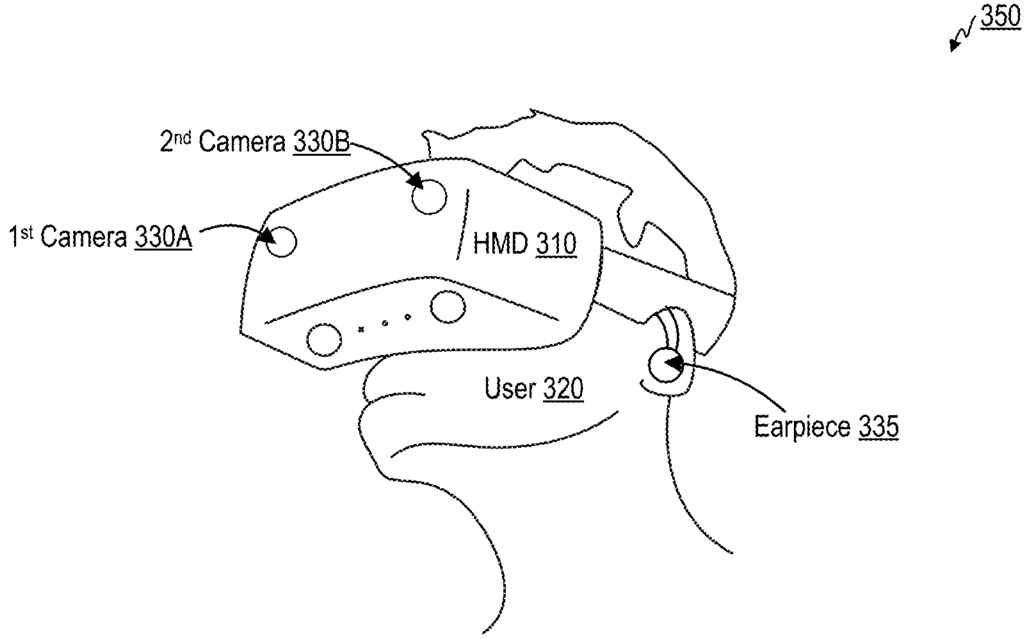
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). The one or more microphones can be examples of the sensor(s) 205 of the imaging system 200. The one or more earpieces can be examples of the output device(s) 270 of the imaging system 200. In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the virtual content generated by the virtual content generator 207, composited using a compositor, and/or displayed by the display(s) of the output device(s) 270. The output images can be based on the images captured by the first camera 330A and the second camera 330B, for example with the virtual content overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
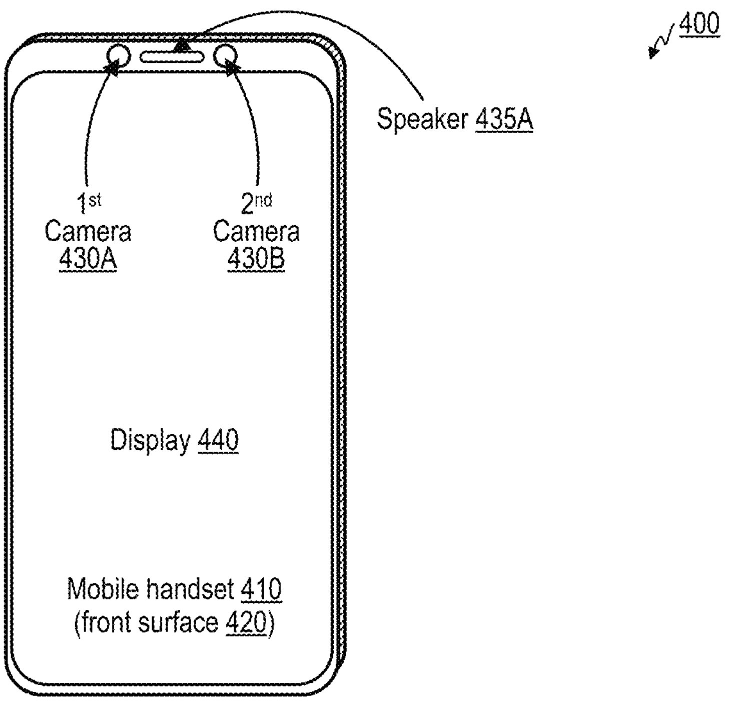
FIG. 4A is a perspective diagram illustrating a front surface of a mobile handset that includes front-facing cameras and that can be used as an extended reality (XR) system, in accordance with some examples.

FIG. 4A is a perspective diagram 400 illustrating a front surface of a mobile handset 410 that includes front-facing cameras and can be used as an extended reality (XR) system 200. The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensors 205 of the imaging system 200. The first camera 430A and the second camera 430B can face the user, including the eye(s) of the user, while content (e.g., the modified media output by the media modification engine 235) is displayed on the display 440. The display 440 may be an example of the display(s) of the output device(s) 270 of the imaging system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. The first camera 430A and the second camera 430B may be first and second image sensors, respectively. In some examples, the front surface 420 of the mobile handset 410 may only have a single camera.

In some examples, the front surface 420 of the mobile handset 410 may include one or more additional cameras in addition to the first camera 430A and the second camera 430B. The one or more additional cameras may also be examples of the sensors 205 of the imaging system 200. In some examples, the front surface 420 of the mobile handset 410 may include one or more additional sensors in addition to the first camera 430A and the second camera 430B. The one or more additional sensors may also be examples of the sensors 205 of the imaging system 200. In some cases, the front surface 420 of the mobile handset 410 includes more than one display 440. The one or more displays 440 of the front surface 420 of the mobile handset 410 can be examples of the display(s) of the output device(s) 270 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). The one or more microphones can be examples of the sensors 205 and/or of the sensor(s) 205 of the imaging system 200. In some examples, the mobile handset 410 can include one or more microphones along and/or adjacent to the front surface 420 of the mobile handset 410, with these microphones being examples of the sensors 205 of the imaging system 200. In some examples, the audio output by the mobile handset 410 to the user through the one or more speakers 435A and/or other audio output devices may include, or be based on, audio recorded using the one or more microphones.

Figure 4B:
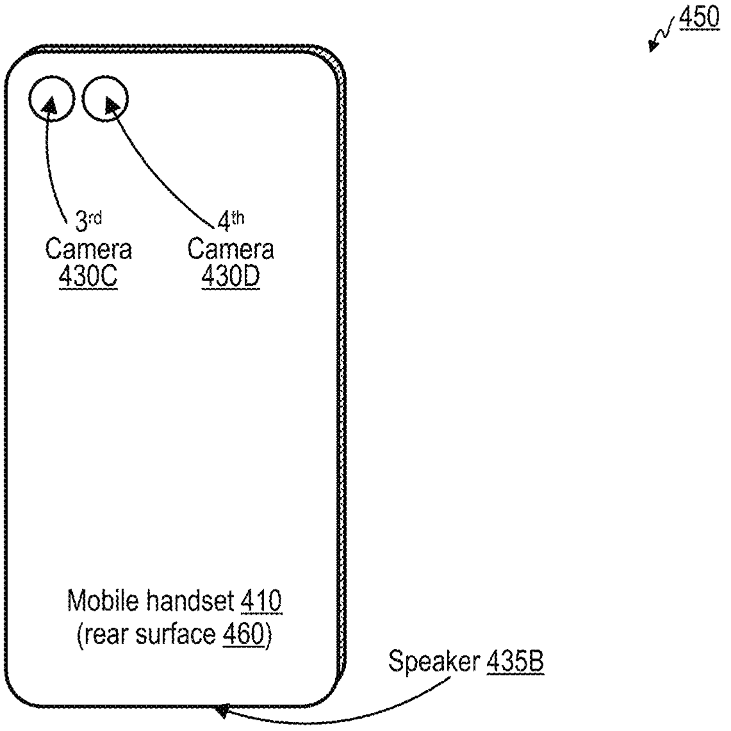
FIG. 4B is a perspective diagram illustrating a rear surface of a mobile handset that includes rear-facing cameras and that can be used as an extended reality (XR) system, in accordance with some examples.

FIG. 4B is a perspective diagram 450 illustrating a rear surface 460 of a mobile handset that includes rear-facing cameras and that can be used as an extended reality (XR) system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 205 of the imaging system 200 of FIG. 2. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 205 of the imaging system 200. In some examples, the rear surface 460 of the mobile handset 410 may include one or more additional sensors in addition to the third camera 430C and the fourth camera 430D. The one or more additional sensors may also be examples of the sensor(s) 205 of the imaging system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. The one or more speakers 435B can be examples of the output device(s) 270 of the imaging system 200. One speaker 435B is illustrated in FIG. 4B, but it should be understood that the mobile handset 410 can include more than one speaker and/or other audio device. In some examples, the mobile handset 410 can also include one or more microphones (not pictured). The one or more microphones can be examples of the sensors 205 and/or of the sensor(s) 205 of the imaging system 200. In some examples, the mobile handset 410 can include one or more microphones along and/or adjacent to the rear surface 460 of the mobile handset 410, with these microphones being examples of the sensor(s) 205 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images. The output images can be based on the images captured by the third camera 430C and/or the fourth camera 430D, for example with the virtual content overlaid and/or with modifications by the media modification engine 235 applied. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
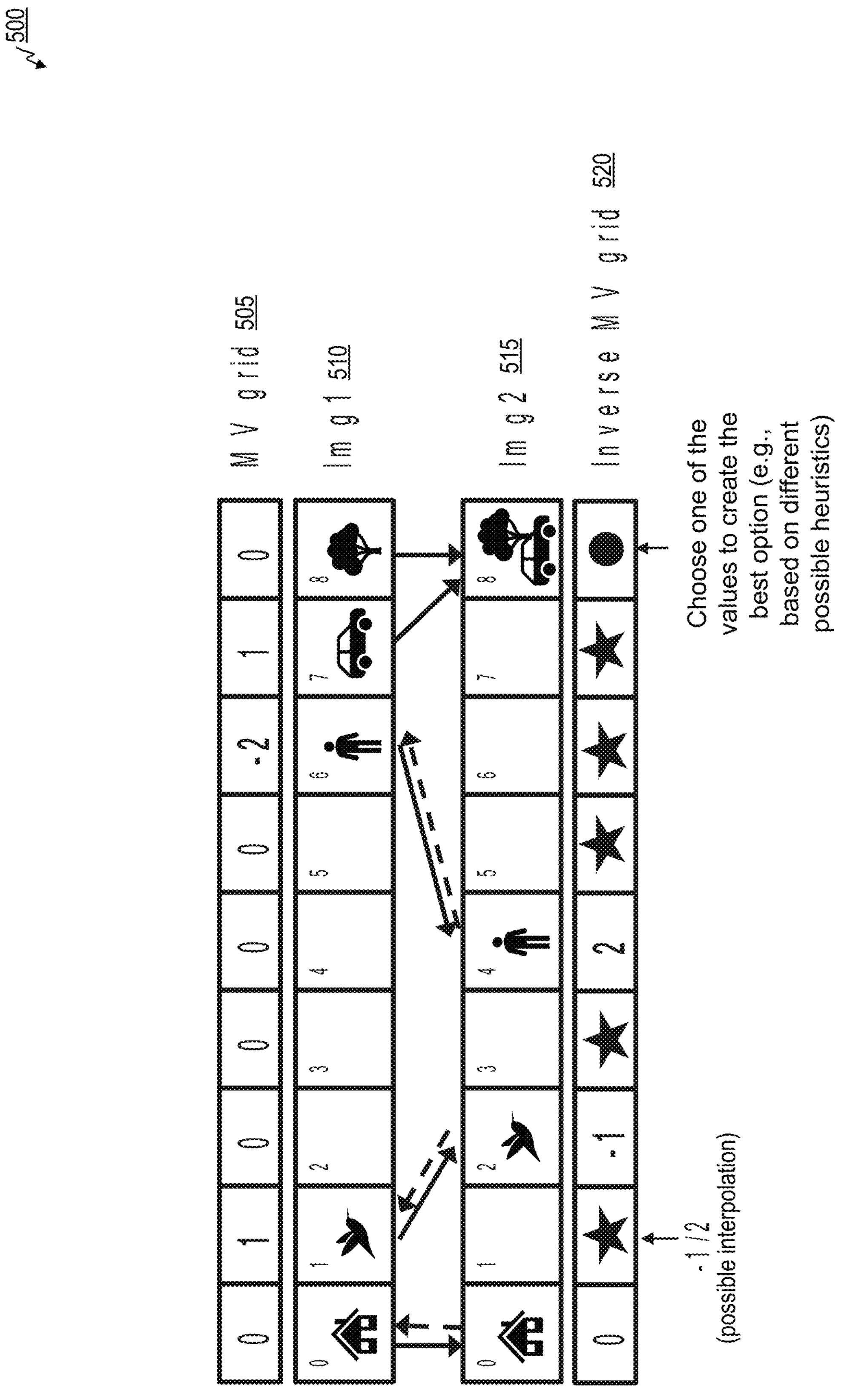
FIG. 5 is a block diagram illustrating an example of grid inversion, in accordance with some examples.

FIG. 5 is a conceptual diagram illustrating an example of grid inversion. Inputs to grid inversion include a first set of motion vectors, which are illustrated using solid black arrows going from a first image Img1 510 to a second image Img2 515 FIG. 5 as a motion vector (MV) grid. The motion vector grid indicates, for each pixel (or group of pixels), how much that pixel (or group of pixels) is going to move between a first image Img1 510 (e.g., visual or depth) of an environment and a second image Img2 515 (e.g., visual or depth) of the environment, using a motion vector in the motion vector (MV) grid 505. The motion vector grid 505 may be referred to as a motion vector map for the images. The motion vectors of the motion vector grid 505 can be determined using the motion vector engine 220, for instance using optical flow.

The grid inversion engine 225 can perform grid inversion, which changes characteristics(s) of the motion vectors (e.g., the direction, the origin, the location, the length, and/or the size) in the first group of motion vectors (the motion vector grid 505) to generate a second set of motion vectors (an inverse MV grid 520). Instead of indicating how each pixel from Img1 510 moves to Img2 515 (as in the MV grid 505), the motion vectors of the second set of motion vectors (the inverse MV grid 520) show how each pixel from Img2 515 can move back to Img1 510. The motion vectors of the second set of motion vectors (the inverse MV grid 520) are illustrated using dashed black arrows going from the second image Img2 515 to the first image Img1 510 FIG. 5.

Various black icons in FIG. 5 represent various elements in the environment that are depicted in the two images, Img1 510 and Img2 515. For instance, the elements include a house, a bird, a person, a car, and a tree. According to the MV grid 505, the house and the tree do not move from Img1 510 to Img2 515, represented by zeroes in the MV grid 505. Likewise, in the inverse MV grid 520, the house and the tree do not move from Img2 515 to Img1 510. The house is represented by a zero in the MV grid 505 and in the inverse MV grid 520, both at cell 0 where the house is located. The tree could be represented by a zero in the inverse MV grid at cell 8 where the tree is located, but there is a conflict with the car as discussed below, represented by a black circle. The bird moves right by 1 grid cell from Img1 510 to Img2 515 (from cell 1 to cell 2), represented by a 1 at cell 1 in the MV grid 505. The bird moves left by 1 grid cell from Img2 515 to Img1 510 (from cell 2 to cell 1), represented by a −1 at cell 2 in the inverse MV grid 520. The values are not only inverted (multiplied by −1) from the MV grid 505 to the inverse MV grid 520, but are also moved from the cell corresponding to the old location of the element in Img1 510 to the cell corresponding to the new location of the element in Img2 515. A black star in cell 1, where the bird was in Img1 510 but is missing from in Img2 515, indicates in the inverse MV grid 520 that the area of the image corresponding to cell 1 is missing and may need to be filled in (e.g., with interpolation and/or inpainting). The person moves left by 2 grid cells from Img1 510 to Img2 515 (from cell 6 to cell 4), represented by a −2 in cell 6 in the MV grid 505. The person moves right by 2 grid cells from Img2 515 to Img1 510 (from cell 4 to cell 6), represented by a 2 in cell 4 in the inverse MV grid 520. A black star in cell 6, where the person was in Img1 510 but is missing from in Img2 515, indicates in the inverse MV grid 520 that the area of the image corresponding to cell 1 is missing and may need to be filled in (e.g., with interpolation and/or inpainting). The car moves right by 1 grid cell from Img1 510 to Img2 515 (from cell 7 to cell 8), represented by a 1 in the MV grid 505. The car would move left by 1 grid cell from Img2 515 to Img1 510 (from cell 8 to cell 7), which could be represented by a −1 in the inverse MV grid 520. However, the car and the tree are in the same grid cell (cell 8) in Img2 515, so a red circle indicates a conflicting value (e.g., 0 for the tree, −1 for the car) in that cell of the inverse MV grid 520.

Figure 6:
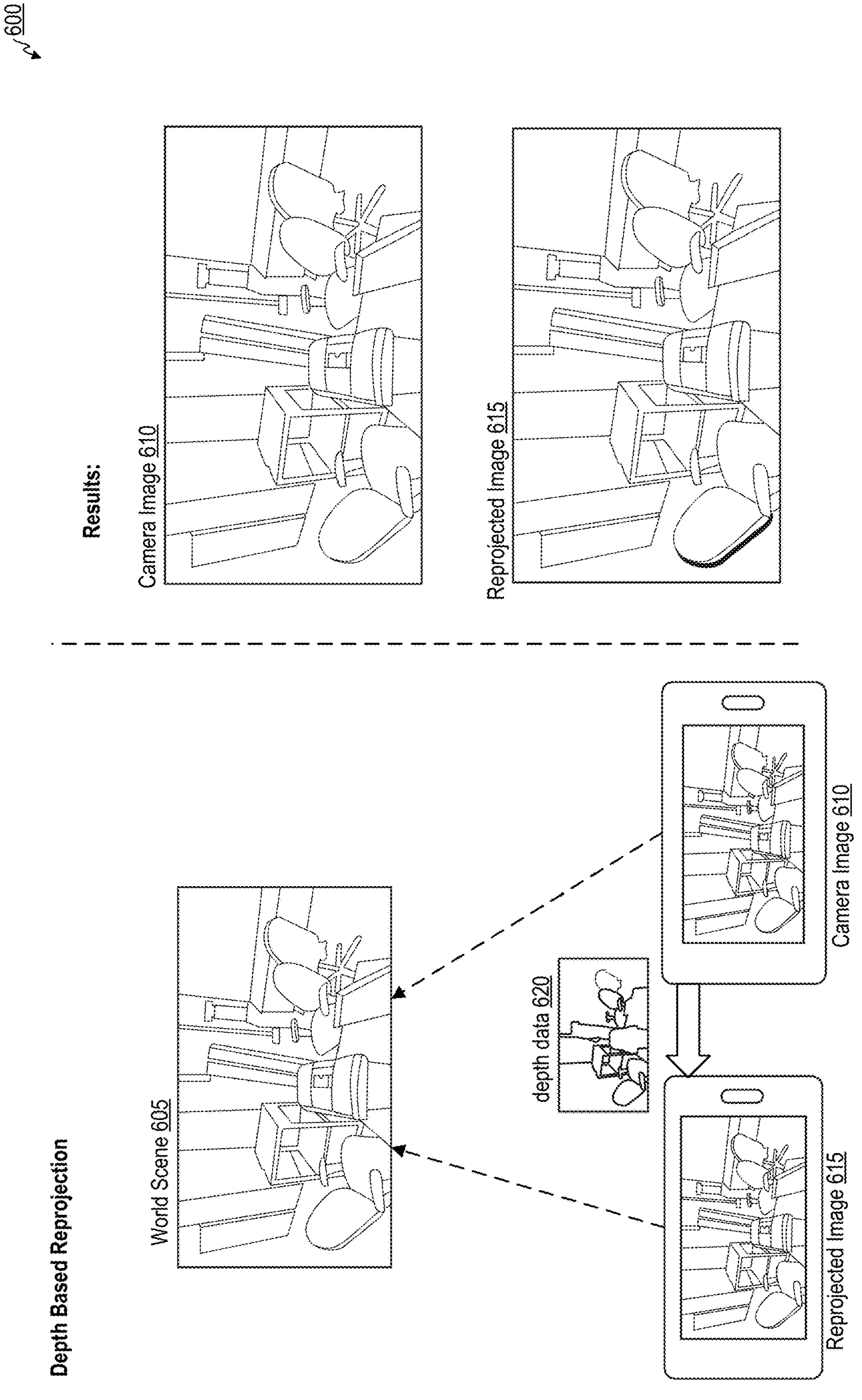
FIG. 6 is a conceptual diagram illustrating an example of depth-based reprojection, in accordance with some examples.

FIG. 6 is a conceptual diagram 600 diagram illustrating an example of depth-based reprojection. The depth-based reprojection is performed by the image reprojection engine 215. The example shows a camera image 610 of an environment (referred to as a world scene 605) with a desk that has a toolbox on it and some chairs around it. The image reprojection engine 215 uses depth data 620 of the environment (e.g., of the world scene 605) to reproject the camera image 610 to generate a reprojected image 615. The reprojected image 615 depicts the same environment as the camera image 610 (e.g., the world scene 605), but reprojected as if the environment was captured from a different perspective or viewpoint in the reprojected image 615 compared to the camera image 610. In the example illustrated in FIG. 6, the reprojected image 615 appears to be captured from a perspective or viewpoint of the environment that is translationally to the left of the perspective or viewpoint of the environment that is depicted in the camera image 610. In some examples, the image reprojection engine 215 can perform image reprojection using the inverse MV grid (e.g., inverse MV grid 520) generated by the grid inversion engine 225, for instance based on the depth data 620.

Figure 7:
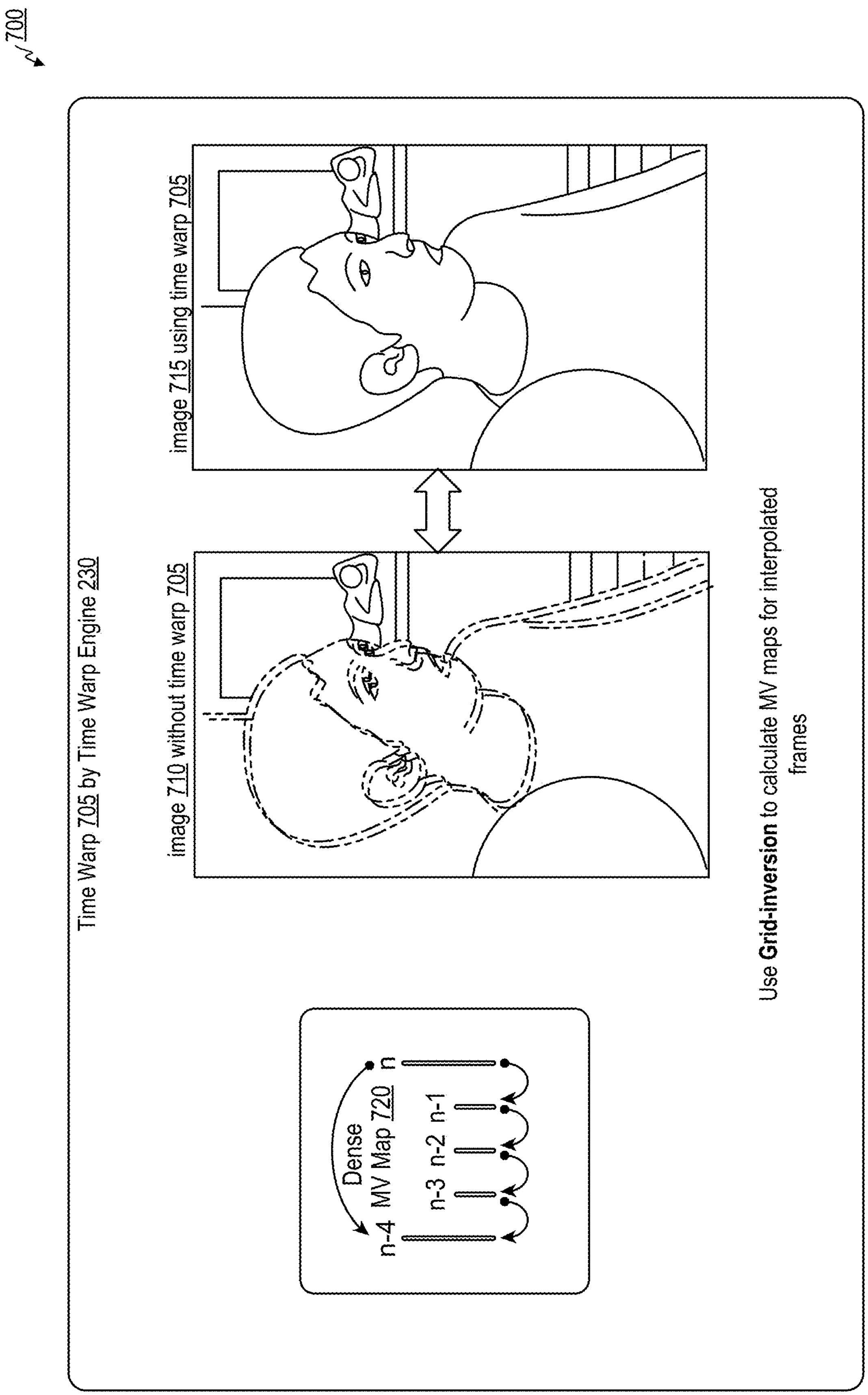
FIG. 7 is a conceptual diagram illustrating an example of a time warp performed by the time warp engine, in accordance with some examples.

FIG. 7 is a conceptual diagram 700 illustrating an example of a time warp 705 performed by the time warp engine 230. On the left, a large, or dense, motion vector map 720 is illustrated as a solid black arrow, showing how pixels move between image frame n and image frame n−4. Image frames n and n−4 are illustrated as tall vertical lines. The time warp 705 uses grid inversion (using the grid inversion engine 225) on the large, or dense, motion vector map 720 to create smaller motion vector maps, illustrated as shorter vertical arrows, for instance from image frame n to image frame n−1, from image frame n−1 to image frame n−2, from image frame n−2 to image frame n−3, and from image frame n−3 to image frame n−4.

To create the smaller vector maps, the time warp engine 230 uses resampling. For instance, to generate the smaller vector maps, the time warp engine 230 makes the values (representing the distance of movement of elements between frame n and frame n−4) in the motion vector map smaller, for instance by multiplying the values by ¼. In addition, the time warp engine 230 moves the values to the new location of each element in the corresponding frame, similarly to the movement of the values in the grid inversion of FIG. 5.

The time warp 705 can be used to interpolate motion vector maps in between existing motion vector maps, for instance if optical flow is only performed every k frames. Optical flow is a computationally expensive operation that can use a lot of power to perform, while the time warp 705 demonstrated here is a less expensive and lower power operation. Thus, optical flow can be used sparingly to reduce computational expense and power usage, and the time warp 705 can still allow the imaging system 200 to obtain motion vectors for each frame transition between any two adjacent frames (and in some cases, between any two frames).

In some examples, the smaller motion vector maps generated by the time warp 705 can be used to interpolate additional frames in between existing frames of a video, for instance to increase the frame rate of the video from a first frame rate to a second frame rate that is higher than the first frame rate.

In some examples, the smaller motion vector maps generated by the time warp 705 can be used to increase quality of certain frames of a video. For instance, if a particular frame of a video is blurry, includes a high amount of compression artifacts, includes compression artifacts that make the image difficult to clearly see the pictured scene, or otherwise suffers from low quality, then time warp 705 can improve quality of such a frame of a video. The time warp 705 can be used to determine motion vector maps from one or more adjacent or nearby frames of the video, and the image data from those frames can be used to generate a modified image for replacing the particular frame in question, so as to improve the image quality of the particular frame in question. The conceptual diagram 700 illustrates two instances of an image of a boy—a first image 710 on the left without time warp 705 applied, and a second image 715 on the right with time warp 705 applied, improving the clarity of the depiction of the boy in the second image 715 as compared to the first image 710. The image 715 on the right, which is improved using the time warp 705, appears sharper and clearer than the image 710 on the left, especially at and near various edges in the depiction of the boy, as indicated using solid lines to represent the various lines and edges of the depiction of the boy in the image 715. Additionally, in some examples, patterns such as a hair pattern, a fabric pattern, another patterns, text, logos, and/or other designs, can appear clearer and sharper in an image to which time warp 705 is applied (e.g., as in the image 715 on the right) than in an image without time warp 705 applied (e.g., the image 710 on the left).

Figure 23:
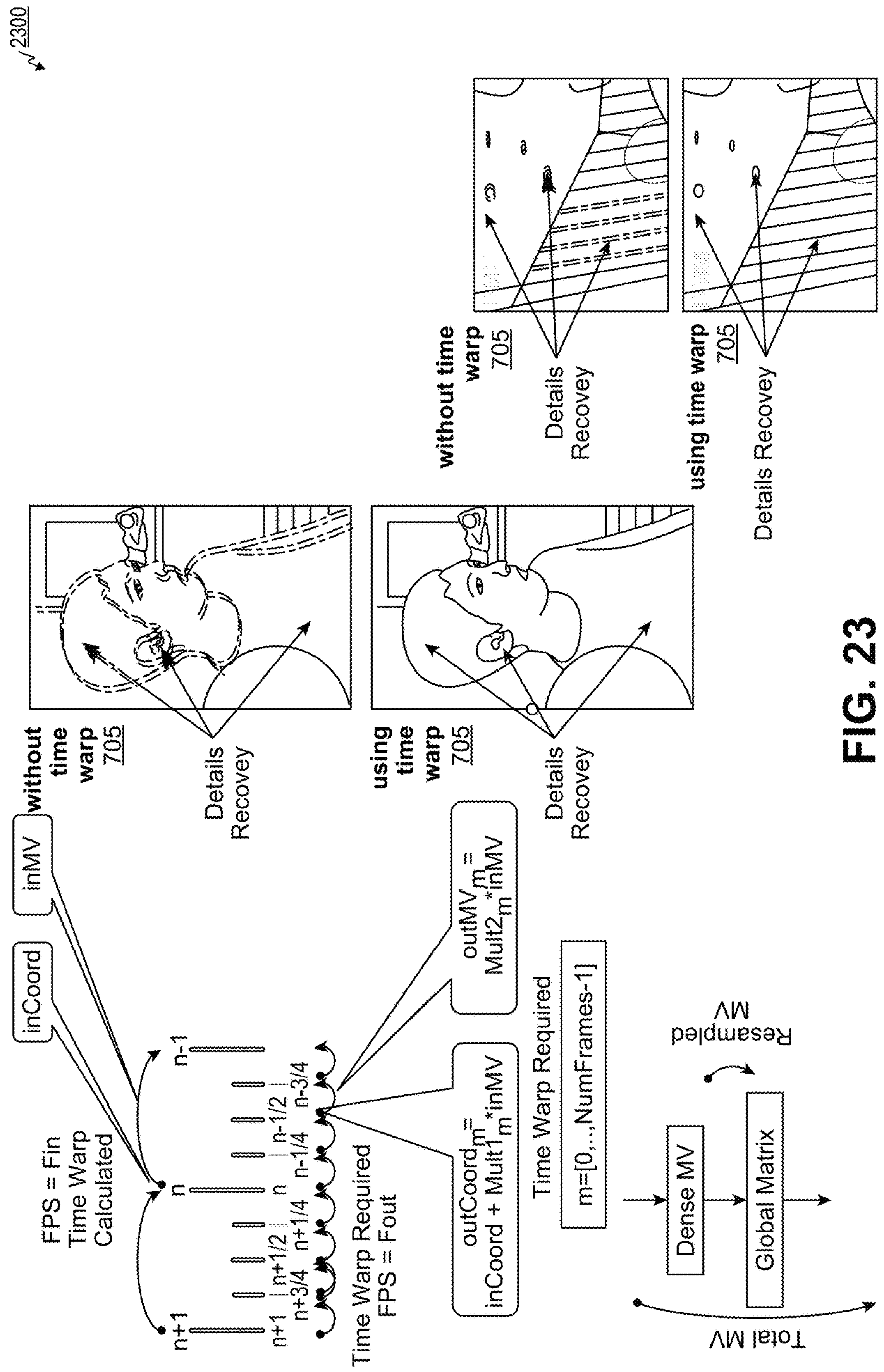
FIG. 23 is a conceptual diagram illustrating additional examples of a time warp performed by the time warp engine, in accordance with some examples.
Figure 29:
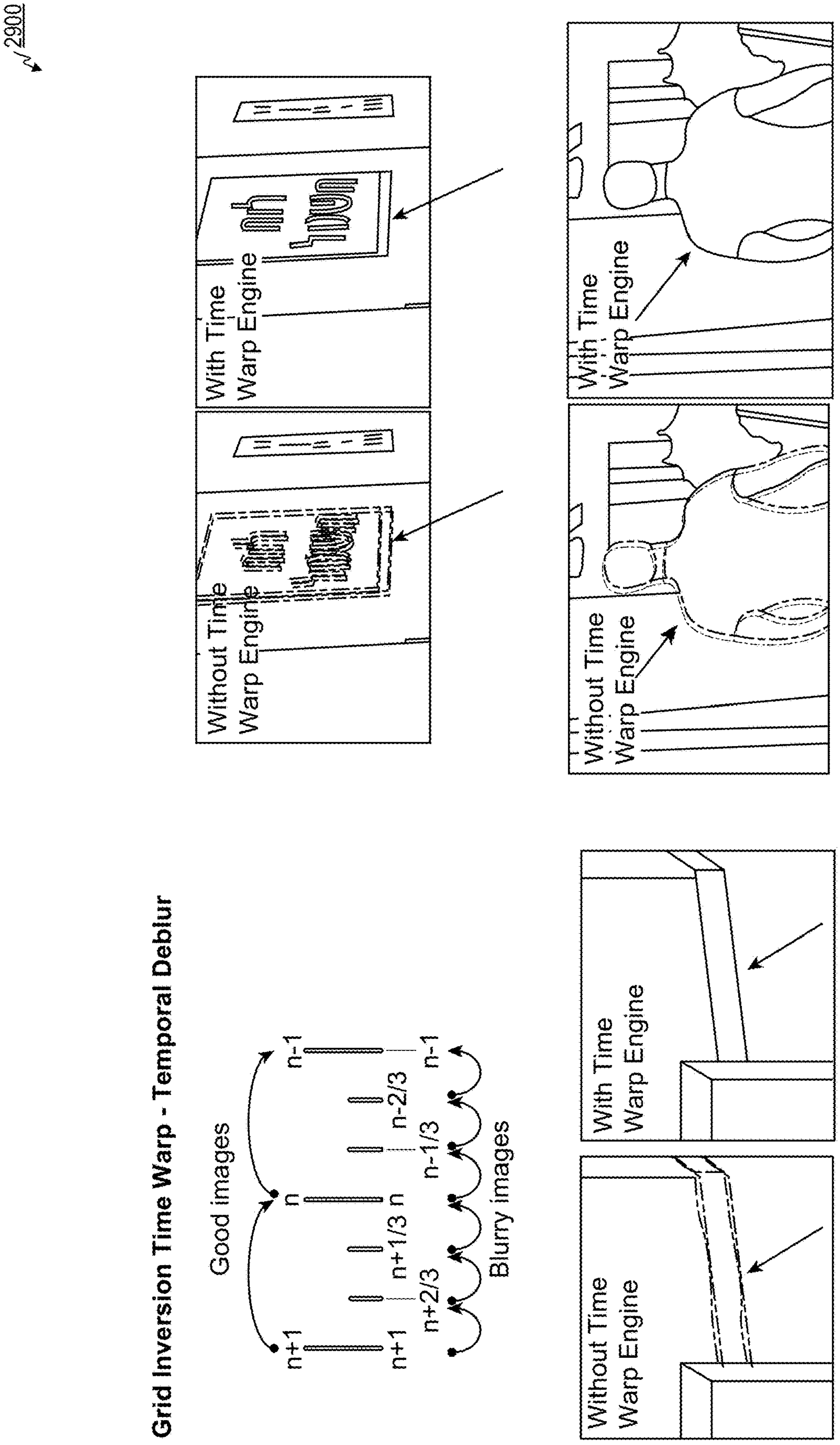
FIG. 29 is a conceptual diagram illustrating additional examples of a time warp performed with the time warp engine compared to images without the time warp engine processing, in accordance with some examples.

Additional examples of time warp 705, and improvement of images using time warp 705, are illustrated in FIGS. 23 and 29.

Figure 8:
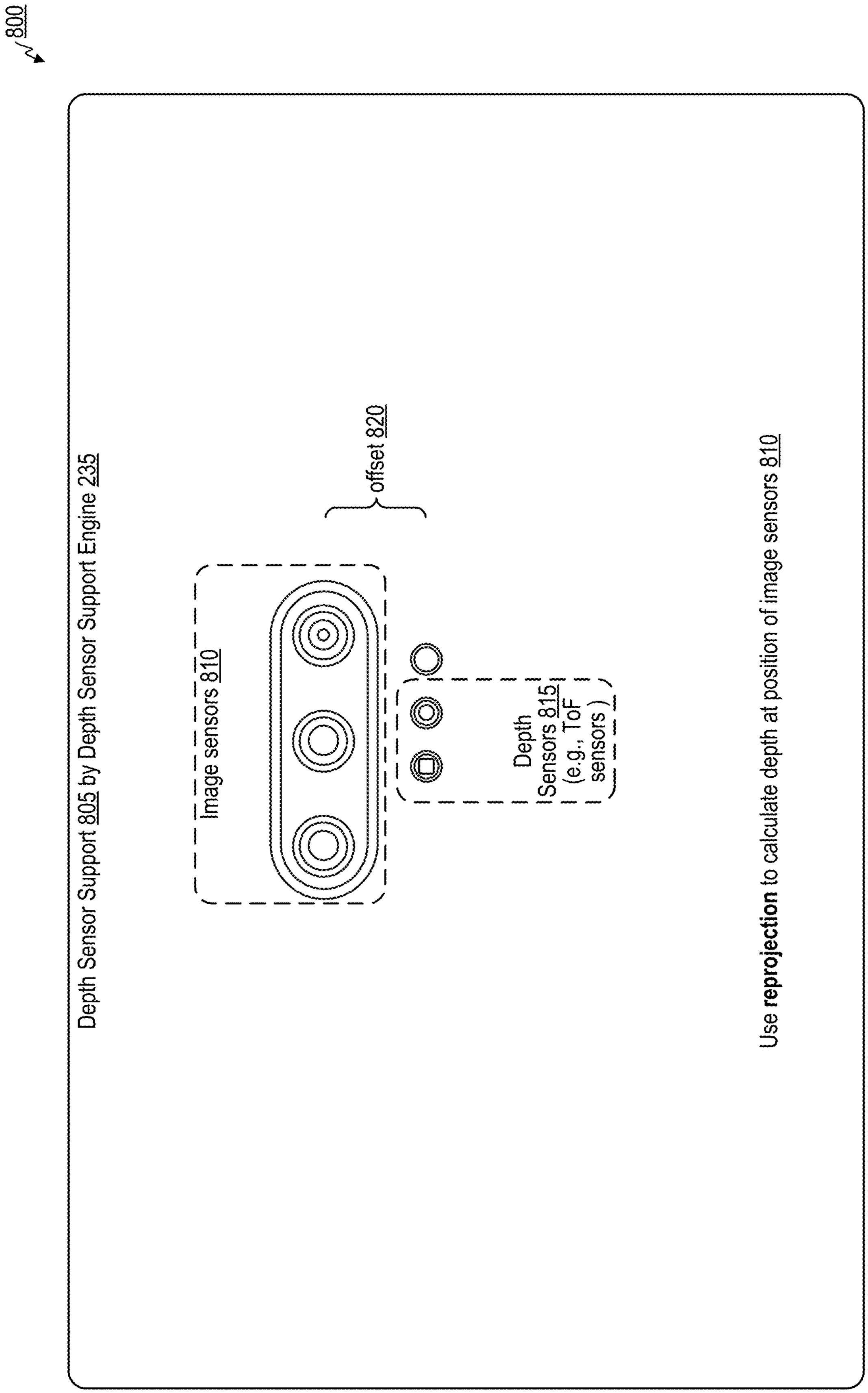
FIG. 8 is a conceptual diagram illustrating an example of depth sensor support performed by the depth sensor support engine, in accordance with some examples.

FIG. 8 is a conceptual diagram 800 illustrating an example of depth sensor support 805 performed by the depth sensor support engine 235. A cluster of sensors 205 on an imaging system 200 is illustrated, including a set of image sensors 810 and a set of depth sensors 815, which may include time of flight (ToF) sensors. In some cases, in image processing, image data from the image sensors 810 and depth data from the depth sensors 815 may be useful to use together, for instance to generate bokeh, simulated depth of field blurring, object recognition, and the like. However, the image sensors 810 and the depth sensors 815 are not collocated. Instead, the image sensors 810 and the depth sensors 815 are offset from one another by an offset 820. Thus, use of image data from the image sensors 810 and depth data from the depth sensors 815 may produce parallax issues due to slight mismatch in perspective caused by the offset 820. Thus, depth in the depth data may not match objects depicted in the image data. This mismatch may be especially pronounced for objects in the environment that are close to the sensors, which may appear in considerably different positions in the image data versus the depth data. Farther objects may appear more similar in the image data and the depth data.

To correct for this mismatch, in some examples, the image reprojection engine 215 can reproject the depth data from the depth sensors 815 to appear to come from the perspective of the image sensors 810. In some examples, the image reprojection engine 215 can reproject the image data from the image sensors 810 to appear to come from the perspective of the depth sensors 815. Because depth data may be needed for the image reprojection engine 215 to perform the reprojection, the image reprojection engine 215 can rely on extrinsic calibration between the image sensors 810 and the depth sensors 815 for the appropriate depth data.

Figure 9:
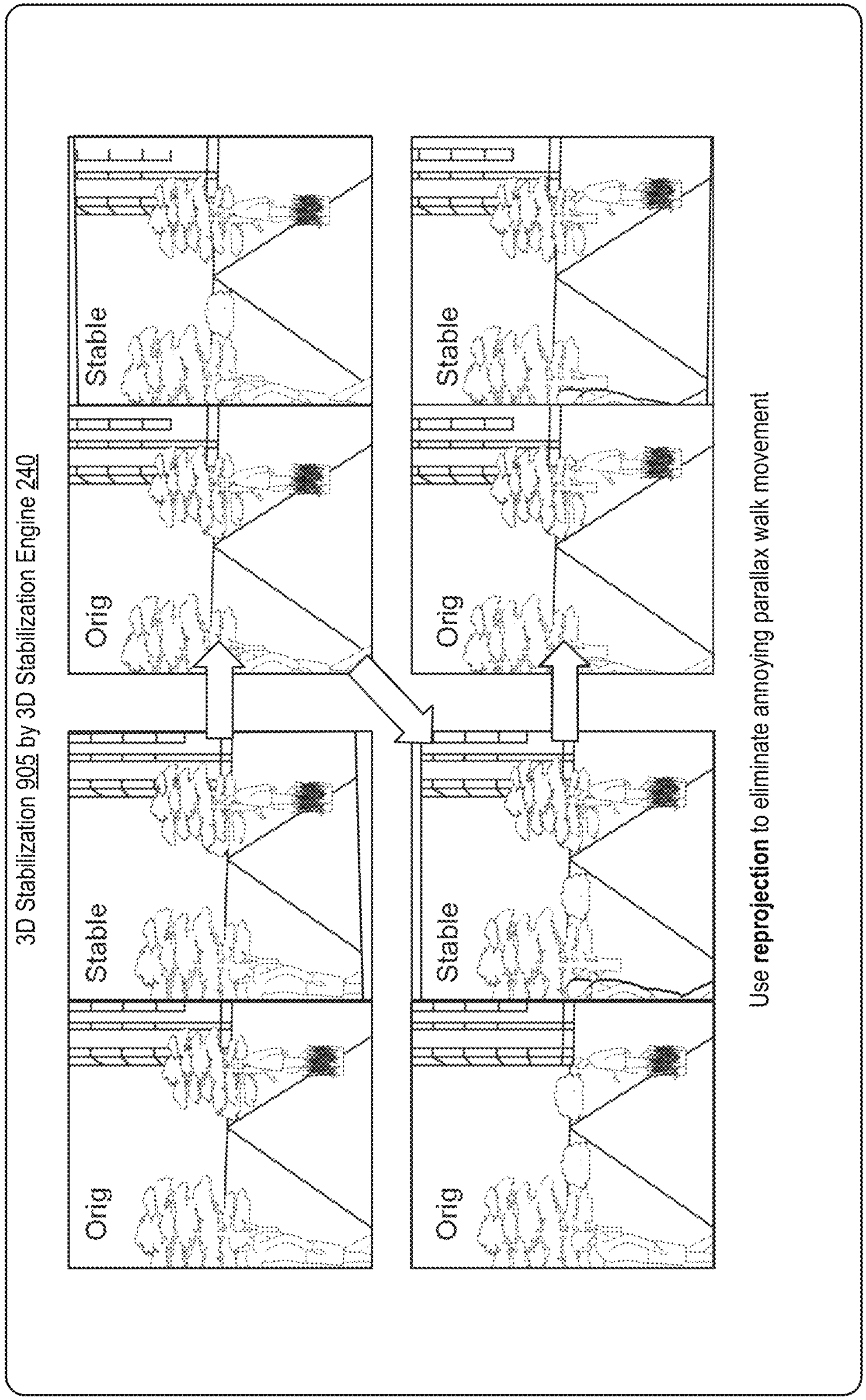
FIG. 9 is a conceptual diagram illustrating an example of 3D stabilization performed by the 3D stabilization engine, in accordance with some examples.

FIG. 9 is a conceptual diagram 900 illustrating an example of 3D stabilization 905 performed by the 3D stabilization engine 240. Traditional stabilization techniques can compensate for rotational movements, but generally cannot compensate for translational (e.g., parallax) movements in the real world. Image reprojection using the image reprojection engine 215 based on depth data for the environment can provide true 3D stabilization 905 that corrects for parallax movements, including translational movements, rotational movements, or both. For each video frame of a video captured using sensor(s) 205, including the four video frames labeled as original ("orig") in FIG. 9, reprojection is performed using the image reprojection engine 215 to generate stabilized variants ("stable") of the original video frames. The resulting reprojected video frames are reprojected so that their respective perspectives all fit on a line representing a virtual stabilized movement path, without any parallax movement perpendicular to the line or any rotation about an axis corresponding to the line (or any other axis). The line may be curved to represent a curved movement path, but do not have any jagged edges corresponding to such parallax movements or rotations.

For the pictured 3D stabilization 905, the input video illustrated by the video frames is wobbling in different directions—translationally up, translationally down, translationally left, translationally right, translationally forward, translationally backward, and/or rotationally (e.g., pitch, yaw, and/or roll). Because the image reprojection engine 215 reprojects the image from to change perspective on the environment, all of these movements in the wobble are stabilized by the reprojection using the image reprojection engine 215.

Figure 30:
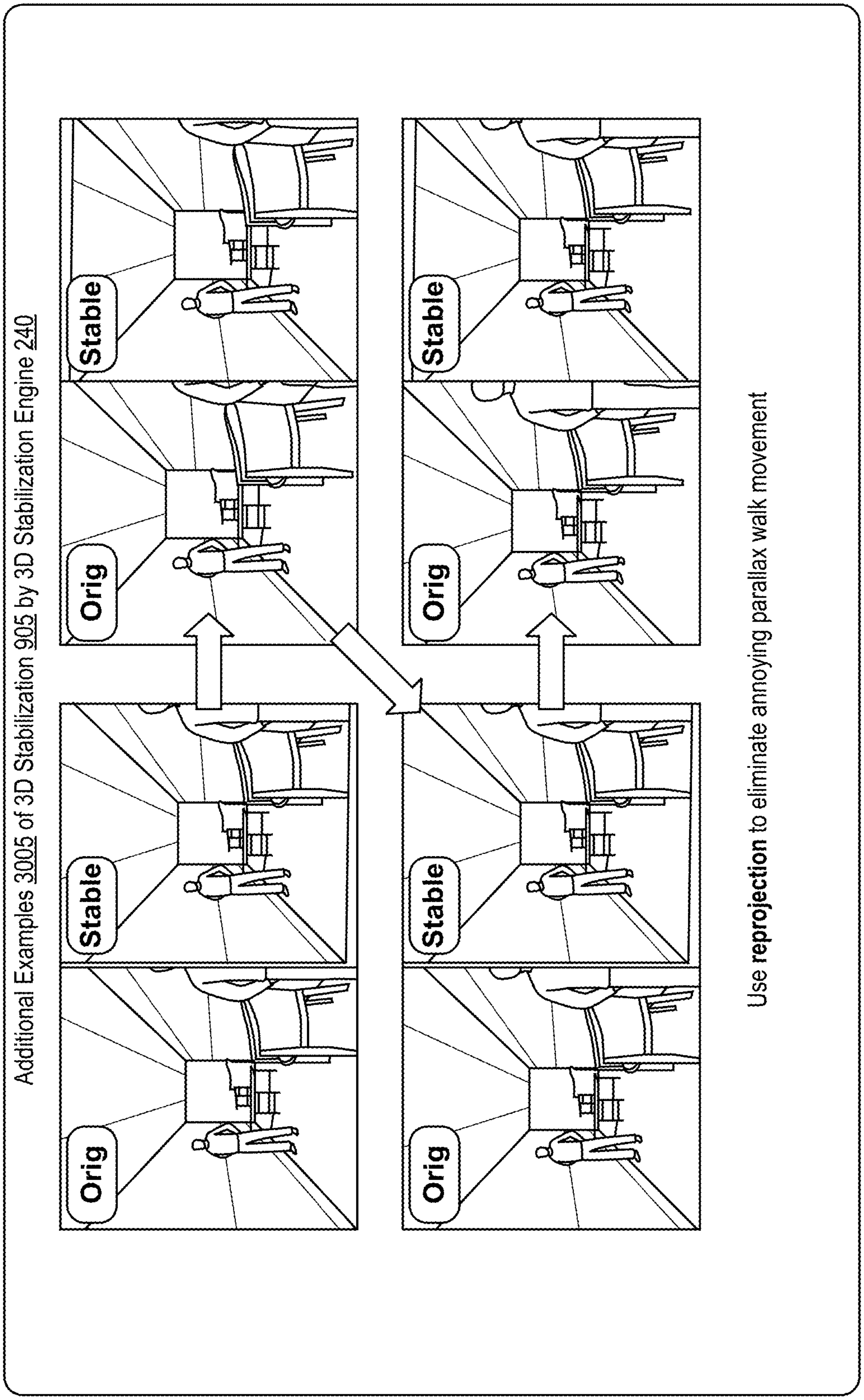
FIG. 30 is a conceptual diagram illustrating additional examples of 3D stabilization performed by the 3D stabilization engine, in accordance with some examples.

In some cases, blank areas can appear in the stabilized frames, for example at the edges of the frames and/or around the people in the frame (e.g., to the right of the woman in the fourth stabilized frame in the bottom-right of FIG. 9). These can represent occlusion areas for which there is no corresponding data in the original images. These occlusion areas can be filled in by the image reprojection engine 215, for example using interpolation and/or inpainting (e.g., deep learning based inpainting). Additional examples 3205 of 3D stabilization 905 are illustrated in FIG. 30. In some examples, these blank areas may appear black. In some examples, these blank areas may appear white. In FIG. 9, these blank areas are illustrated in white.

In some examples, for 3D stabilization as well as for certain other applications of the image reprojection engine 215, it may be useful to treat distant pixels as if they were at an infinite distance, making the locations of such pixels invariant under reprojection. In some examples, the image reprojection engine 215 can use a translation decay to smoothly transition a translation value towards a value representing infinity to treat distant pixels as if they were at an infinite distance.

Figure 10:
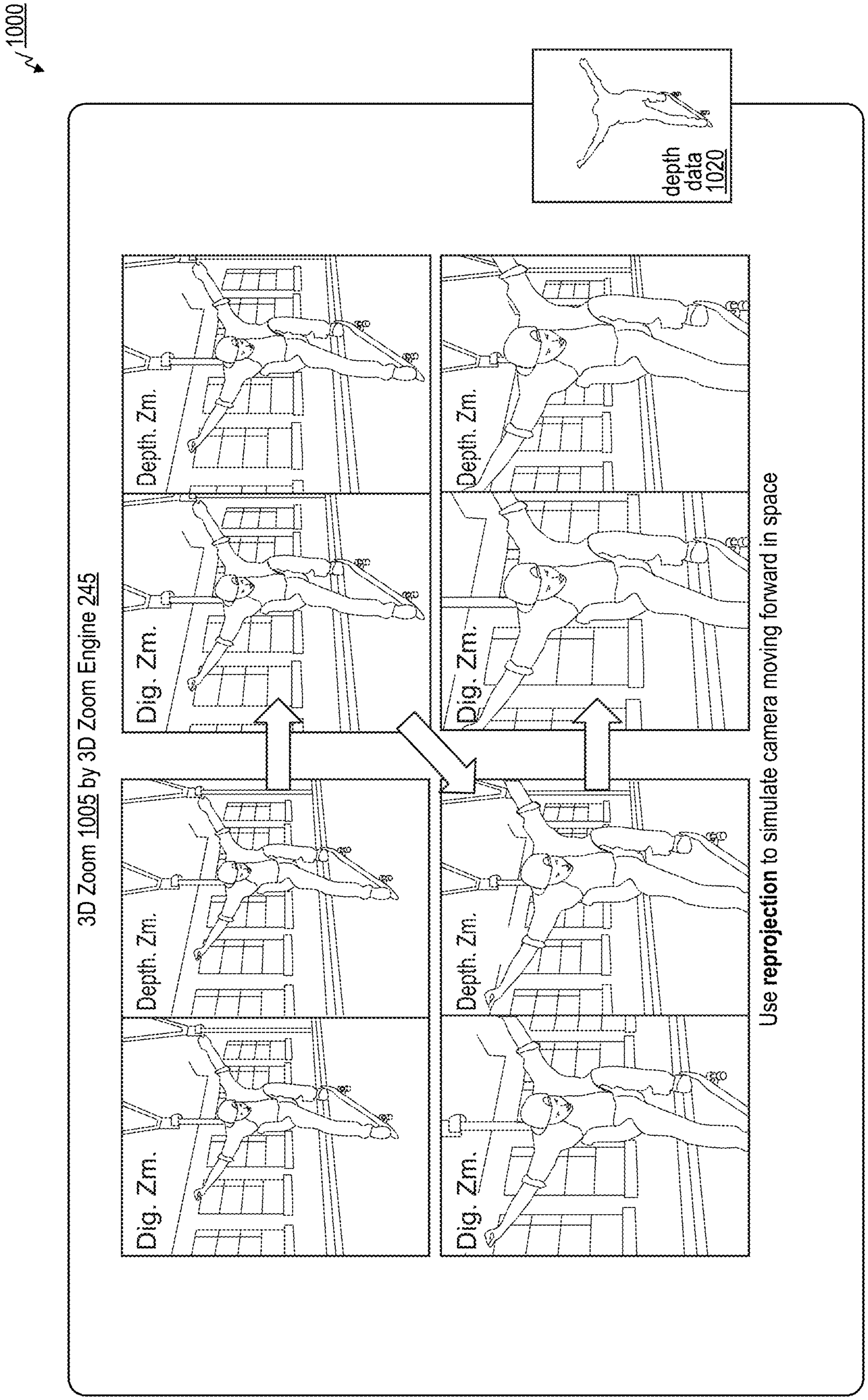
FIG. 10 is a conceptual diagram illustrating an example of 3D zoom (or cinematic zoom) performed by the 3D zoom engine, in accordance with some examples.

FIG. 10 is a conceptual diagram 1000 illustrating an example of 3D zoom 1005 (also referred to as cinematic zoom) performed by the 3D zoom engine 245. The 3D zoom 1005 performed by the 3D zoom engine 245 can include zooming into an image (e.g., making certain portions of the image larger while removing other portions of the image), moving a virtual camera in different directions (e.g., panning, rotating, etc.), and/or other types of zoom. In some cases, to perform digital zoom on an image, the entire image is traditionally upscaled and cropped, as illustrated in the sequence of four images labeled as digital zoom ("dig. zm.") in FIG. 10. The images illustrate a skateboarder in front of a house. Performing digital zoom (or even optical zoom in some examples, using an optical zoom lens or a switch between cameras and/or lenses) loses a significant portion of the field of view of the house. However, if the camera were brought closer to the skateboarder, not as much of the field of view of the house would be lost, as is lost using digital zoom. This is because the skateboarder is closer to the camera than the house is. In other words, the skateboarder is in the foreground, while the house is in the background.

Figure 31:
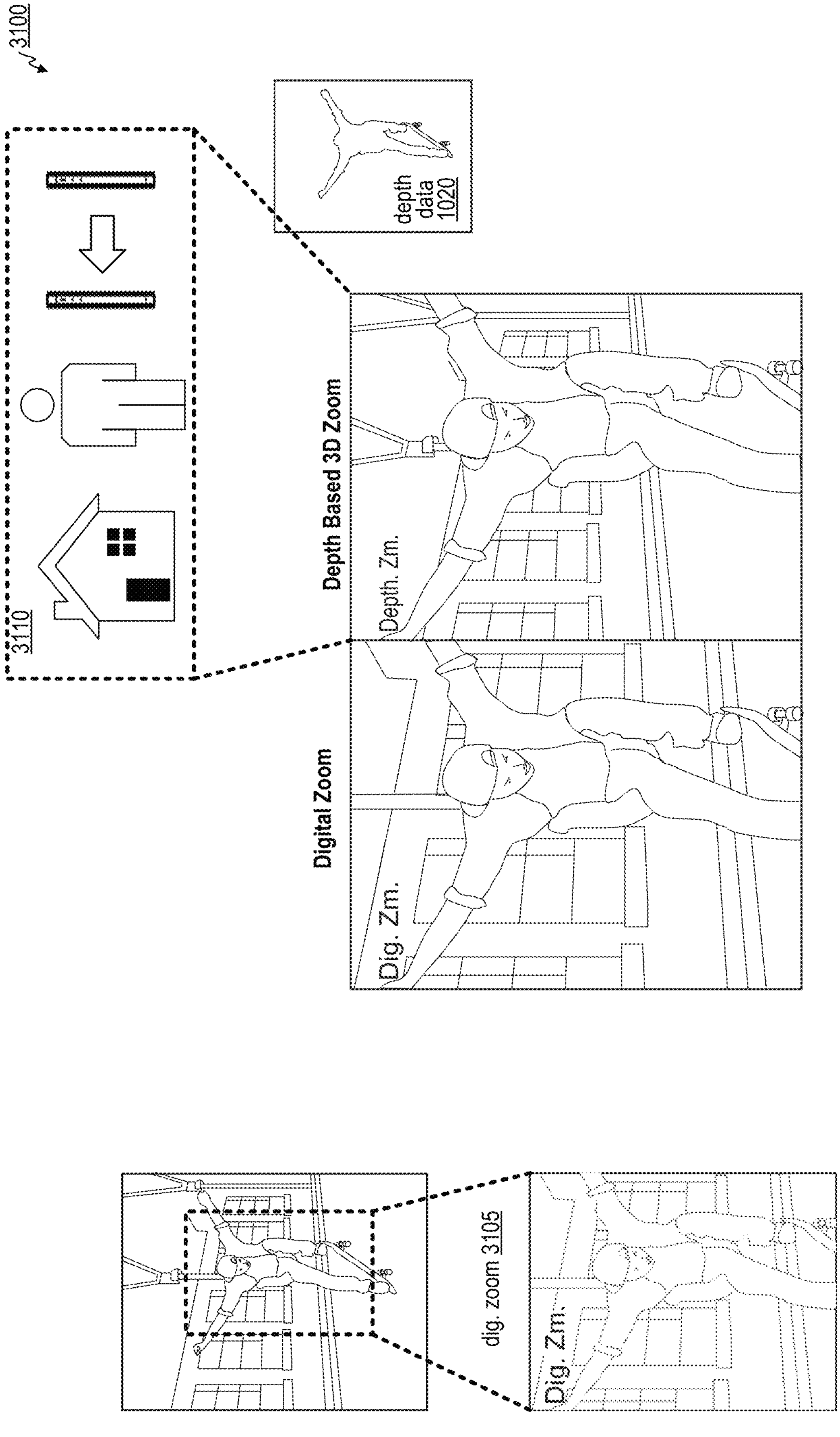
FIG. 31 is a conceptual diagram illustrating additional examples of 3D zoom (or cinematic zoom) performed by the 3D zoom engine, in accordance with some examples.

The 3D zoom 1005, or depth-based zoom or cinematic zoom, uses image reprojection using the image reprojection engine 215 based on depth data 1020 for the environment to simulate movement of the camera forward in the environment, in this case closer to the skateboarder. As illustrated in the sequence of four images labeled as depth-based zoom ("depth. zm.") in FIG. 10, the skateboarder increases in size just as much as in digital zoom, but less depth of field is lost for the house. For instance, in the last of the four images in the sequence, a span of four windows of the house is at least partially in frame under digital zoom, while a span of six windows of the house is at least partially in frame under the 3D depth-based zoom (though one of these windows is fully behind the skateboarder). Thus, 3D depth-based zoom (or cinematic zoom) minimizes loss of field of view, especially of background elements. Additional examples of 3D zoom 1005 (or depth-based zoom or cinematic zoom) are illustrated in FIG. 31.

Figure 11:
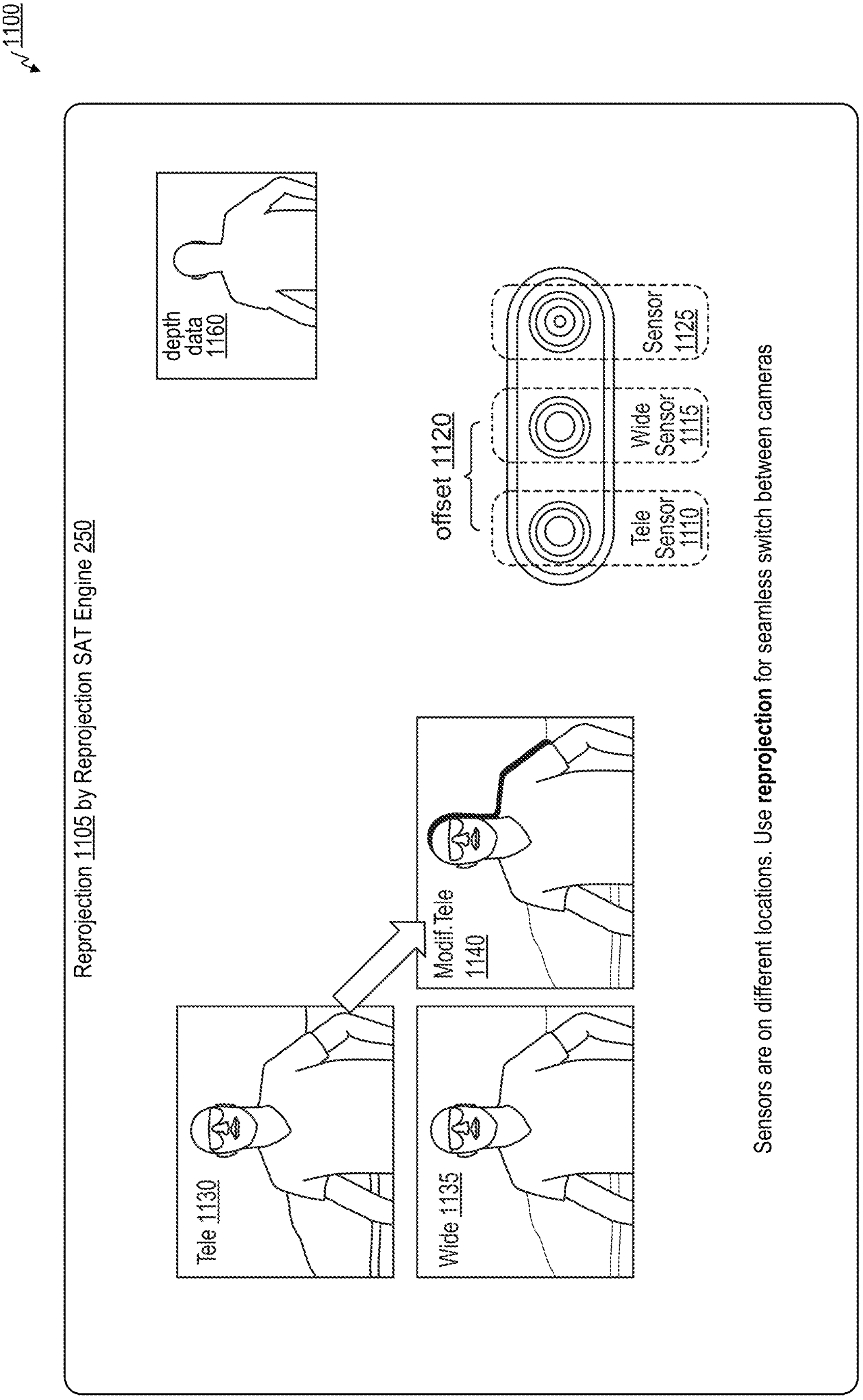
FIG. 11 is a conceptual diagram illustrating an example of reprojection performed by the reprojection SAT engine, in accordance with some examples.

FIG. 11 is a conceptual diagram 1100 illustrating an example of reprojection 1105 performed by the reprojection SAT engine 250. A cluster of sensors 205 of an imaging system 200 is illustrated in FIG. 11, with a telephoto sensor 1110, a wide angle sensor 1115, and another sensor 1125. In some cases, an imaging system 200 may switch between the telephoto sensor 1110 and the wide angle sensor 1115, for example to provide different levels of zoom for images of the environment. However, similarly to the scenario with the image sensors 810 and the depth sensors 815 of FIG. 8, the telephoto sensor 1110 and the wide angle sensor 1115 are not collocated. Instead, there is an offset 1120 between the telephoto sensor 1110 and the wide angle sensor 1115. Thus, switching between the telephoto sensor 1110 and the wide angle sensor 1115 produces a parallax effect. For example, a telephoto image 1130 captured using the telephoto sensor 1110 is pictured (labeled "tele"), and a wide-angle image 1135 captured using the wide angle sensor 1115 and cropped to match the field of view of the telephoto, i.e. digitally zoomed before the transition to the telephoto sensor is pictured (labeled "wide"). Both images depict a man in front of a faraway background. In the telephoto image 1130, the man appears slightly to the right of the position of the man in the wide-angle image 1135.

Similarly to the depth sensor support 805 of FIG. 8, the reprojection SAT engine 250 can perform reprojection 1105 to correct for the offset 1120 based on depth data 1160. For instance, the reprojection SAT engine 250 can perform reprojection 1105 to modify the telephoto image to modify the perspective so that the modified telephoto image 1140 (labeled "modif. tele") appears to be captured from the perspective of the wide-angle sensor 1115 (e.g., as in the wide-angle image 1135) rather than the perspective of the telephoto sensor 1110 (e.g., as in the telephoto image 1130). In the modified telephoto image 1140, the man appears slightly to the left of the position of the man in the unmodified telephoto image 1130. In the modified telephoto image 1140, the man appears similarly positioned to the position of the man in the wide-angle image 1135. A black shadow appears to the right of the man in the modified telephoto image 1140, caused by parallax movement of the image data depicting the man relative to the background. The black shadow represents a "hole" that can be filled in with image data, for example using interpolation and/or inpainting as discussed further.

Figure 32:
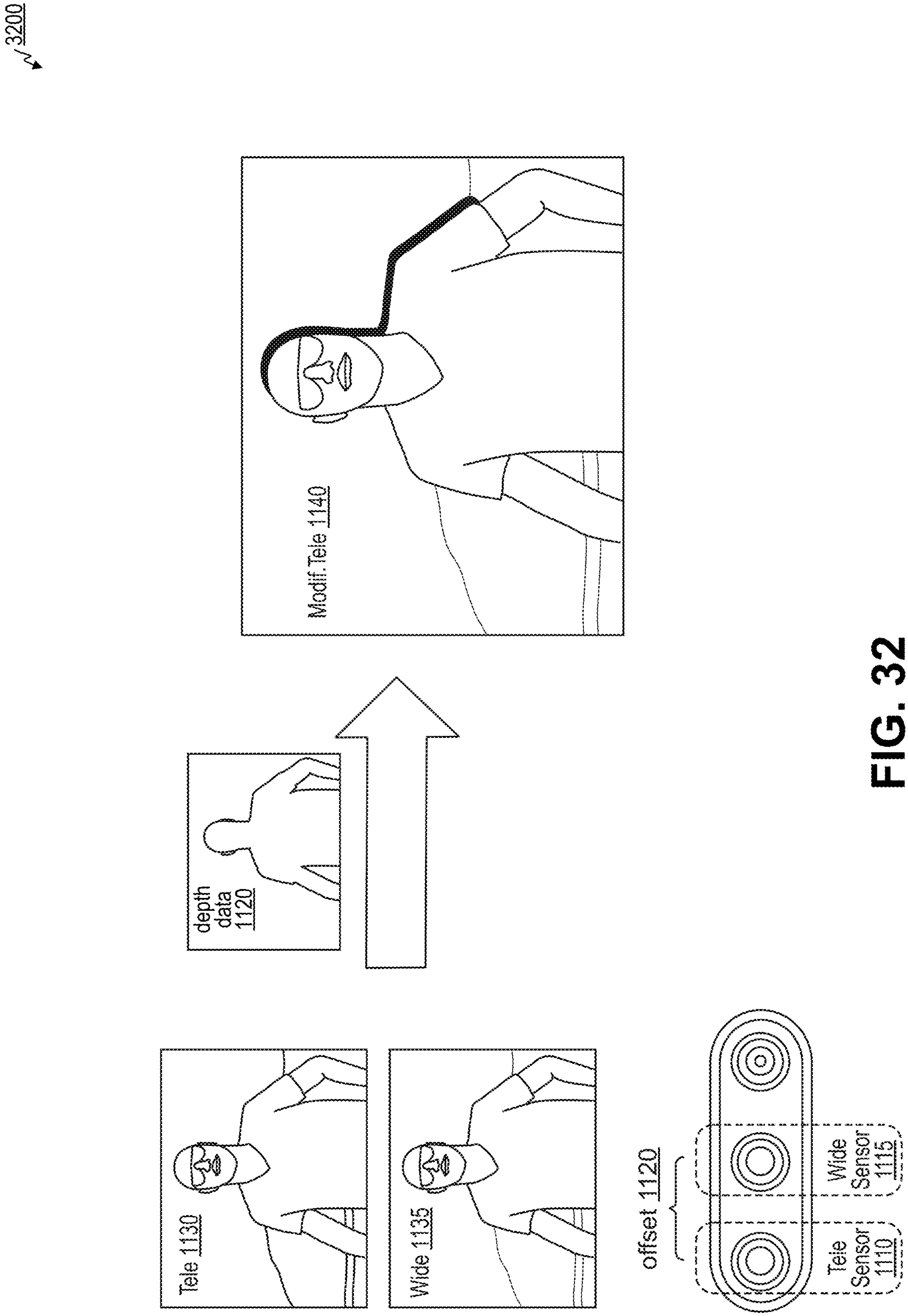
FIG. 32 is a conceptual diagram illustrating additional examples of reprojection performed by the reprojection SAT engine, in accordance with some examples.

In some examples, the reprojection SAT engine 250 can instead perform reprojection 1105 based on the depth data 1160 to modify the wide-angle image to modify the perspective so that the modified wide-angle image (not pictured) appears to be captured from the perspective of the telephoto sensor 1110 rather than the perspective of the wide-angle sensor 1115. Unlike transformations between sensors, where the set of digitally zoomed images from one sensor are warped based on image estimations to match the second sensor before the switch, the reprojection SAT engine 250 can correct the offset based on depth data, reducing parallax issues (e.g., parallax errors), especially for closer objects (e.g., objects in the foreground and/or that are at less than a threshold depth). Additional examples of reprojection 1105 are illustrated in FIG. 32.

Figure 12:
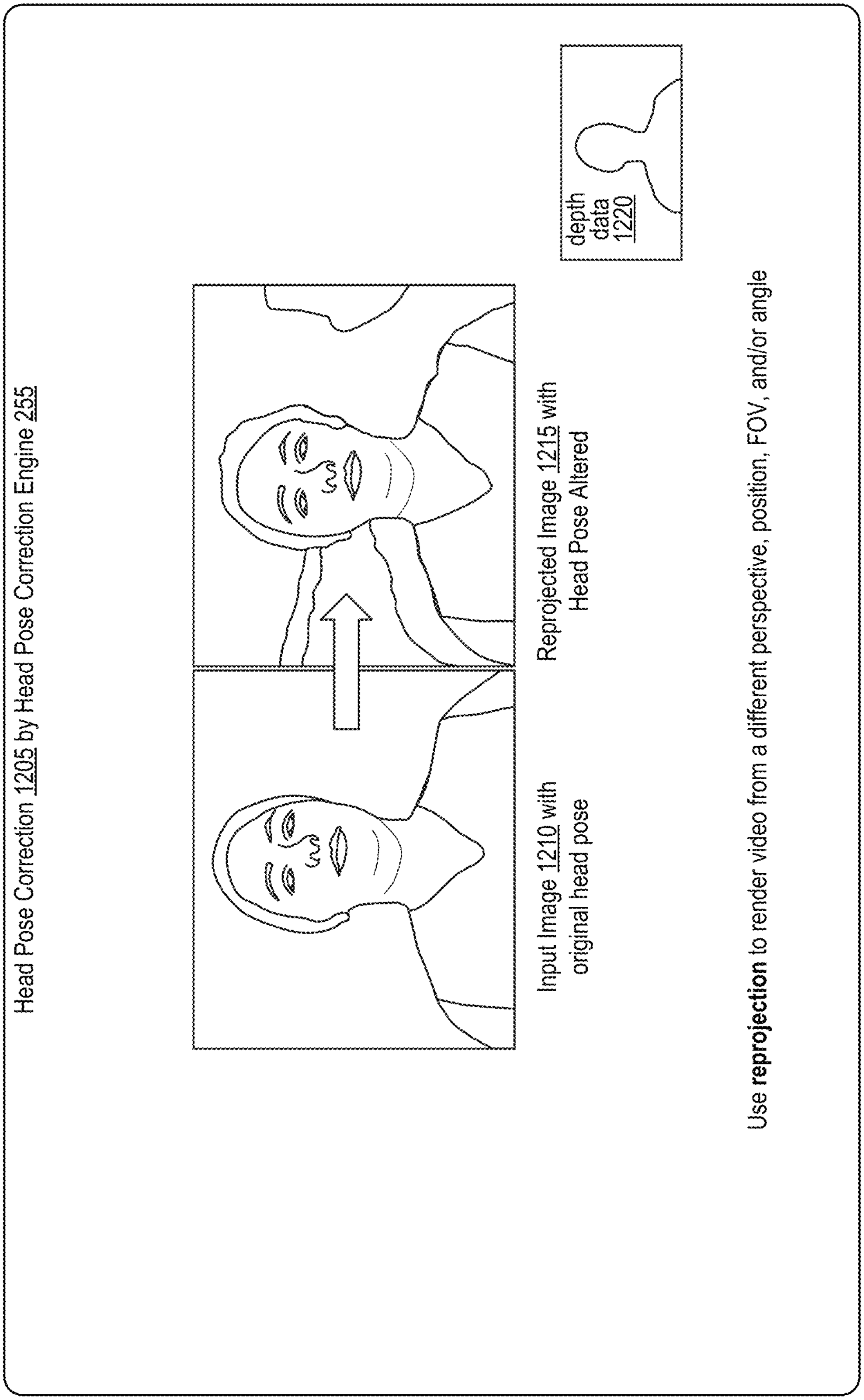
FIG. 12 is a conceptual diagram illustrating an example of head pose correction performed by the head pose correction engine, in accordance with some examples.

FIG. 12 is a conceptual diagram 1200 illustrating an example of head pose correction 1205 performed by the head pose correction engine 255. In some cases, images of users can be captured from sub-optimal angles and/or unflattering angles (e.g., an angle other than a perpendicular angle that is perpendicular to the user's face). For example, when users capture selfie images of themselves, or aim a camera at themselves for video conferencing, the angle from which the image is captured often does not align with the user's head pose, so that the user appears to be looking down, up, to the left, and/or to the right. In some cases, a user's hand can get tired and/or uncomfortable from holding their phone or other imaging system 200 for an extended period of time, which can exacerbate this problem as the user's hand drops or leans on a nearby surface.

The head pose correction 1205 performed by the head pose correction engine 255 can perform reprojection using the image reprojection engine 215 to reproject a real sensor to match a virtual sensor location for a more optimal and/or flattering perspective, such as a perspective from a perpendicular angle that is perpendicular to the user's face.

Figure 33:
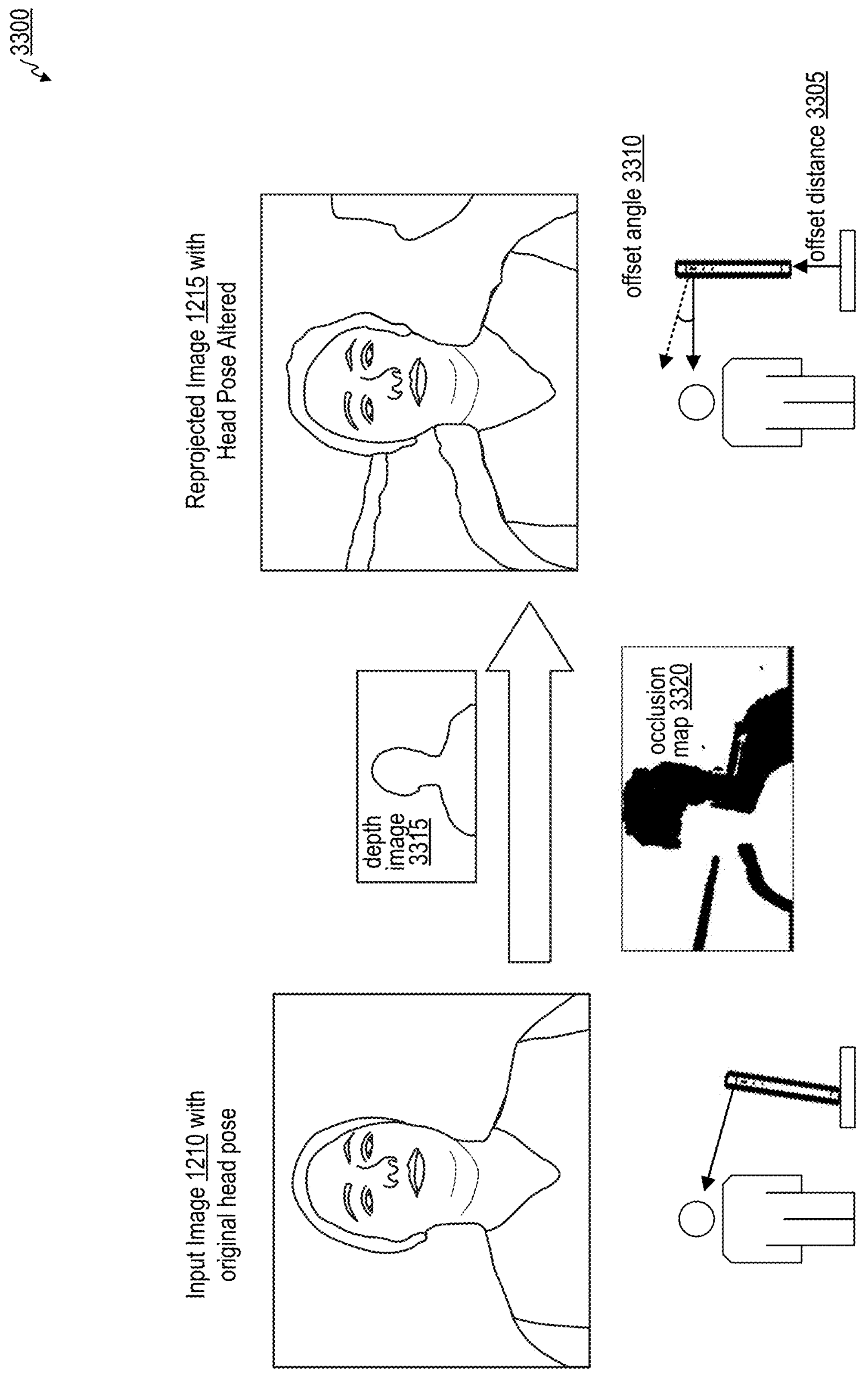
FIG. 33 is a conceptual diagram illustrating additional examples of head pose correction performed by the head pose correction engine, in accordance with some examples.

For example, a woman's original head pose in an input image 1210 is captured from an unflattering angle from slightly below the level of the woman's head, emphasizing the neck and chin areas of the woman. The head pose correction 1205 uses the image reprojection engine 215 based on the input image 1210 and depth data 1220 to generate a reprojected image 1215 from a perspective from a perpendicular angle that is perpendicular to the user's face. The reprojected image 1215 appears to be looking at the woman's face from a much more flattering perpendicular angle, emphasizing the woman's facial features rather than the woman's neck and chin as in the input image 1210. Additional examples of head pose correction 1205 are illustrated in FIG. 33.

Figure 13:
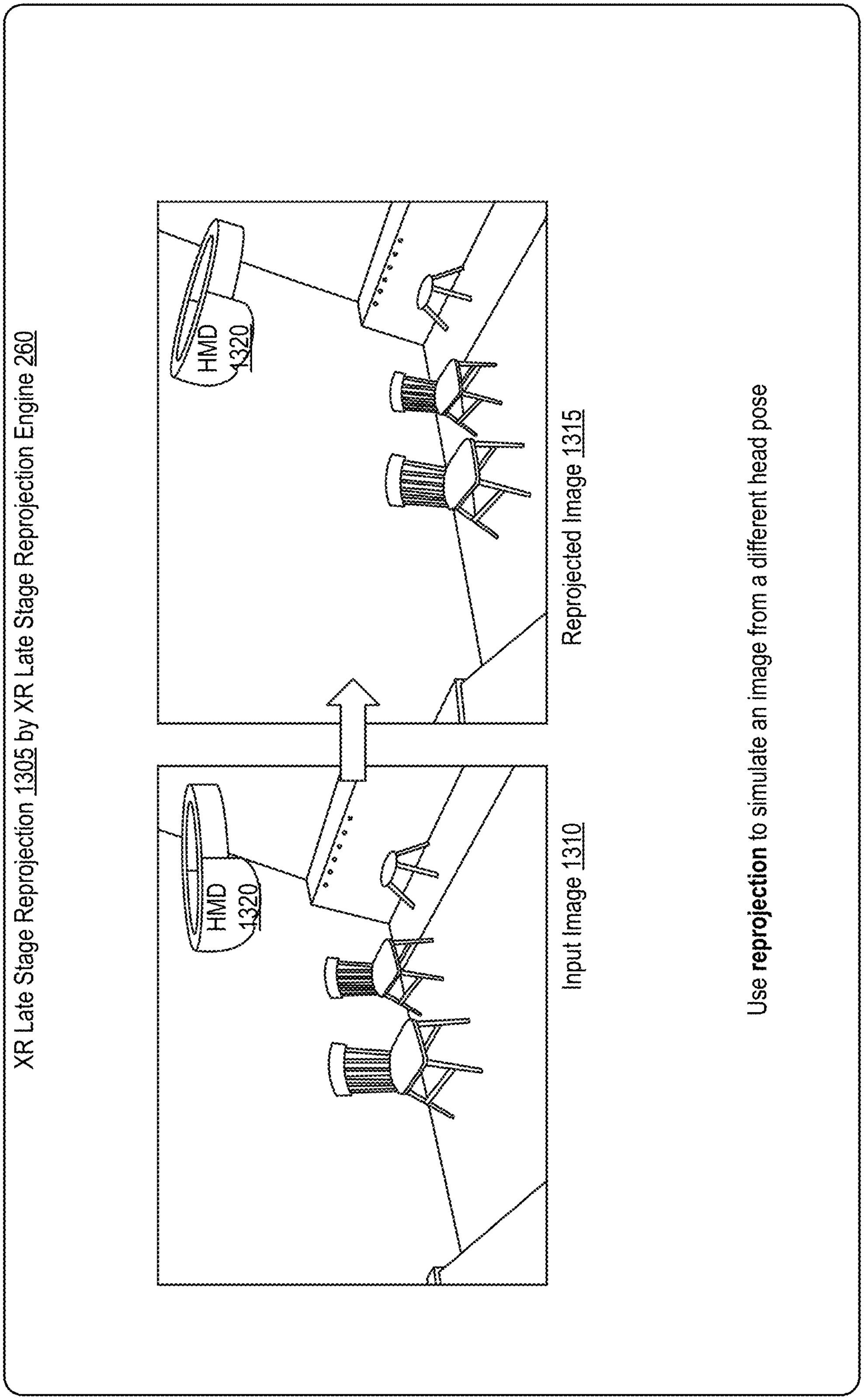
FIG. 13 is a conceptual diagram illustrating an example of XR late stage reprojection performed by the XR late stage reprojection engine, in accordance with some examples.

FIG. 13 is a conceptual diagram 1300 illustrating an example of XR late stage reprojection 1305 performed by the XR late stage reprojection engine 260. Some XR devices (e.g., HMD 1320), or other mobile devices, capture sensor data (e.g., images, videos, depth images, and/or point clouds) using their sensors 205 at a low frame rate to conserve battery power. Interpolation can be used to generate additional frames in between the frames of the low frame rate sensor data to improve the frame rate. High frame rate can be important for XR applications, as low frame rate XR can cause users to feel nauseous and/or can cause the XR to appear jittery and unrealistic.

Interpolation techniques are not always able to realistically represent all changes in perspective of the XR device (e.g., HMD 1320). For instance, interpolation may use digital zoom to simulate the user moving closer or farther from an object, which may cause a mismatch in field of view similar to that discussed with respect to the 3D zoom 1005 of FIG. 10. Interpolation techniques may also have difficulty with parallax movements, for instance caused by translational movements of the XR device (e.g., HMD 1320). Interpolation techniques may also have difficulty with rotational movements, for instance caused by changes in orientation (e.g., pitch, roll, and/or yaw) of the XR device (e.g., HMD 1320).

The XR late stage reprojection 1305 performed by the XR late stage reprojection engine 260 can perform image reprojection using the image reprojection engine 215 to reproject the image of the environment based on changes to the position of the XR device. The changes to the position of the XR device (e.g., HMD 1320) can be determined based on sensor data from pose sensors of the XR device (e.g., HMD 1320), which may use less bandwidth and/or power than image sensors or depth sensors. The changes to the position of the XR device (e.g., HMD 1320) can be inferred based on image data, depth data, and/or audio data from image sensors, depth sensors, and/or microphones of the sensors 205 of the XR device (e.g., HMD 1320).

For example, an input image 1310 is illustrated, based on which the XR late stage reprojection engine 260 generates a reprojected image 1315 using XR late stage reprojection 1305 based on an illustrated change in an orientation of the HMD 1320, which is an example of an XR device.

Figure 14:
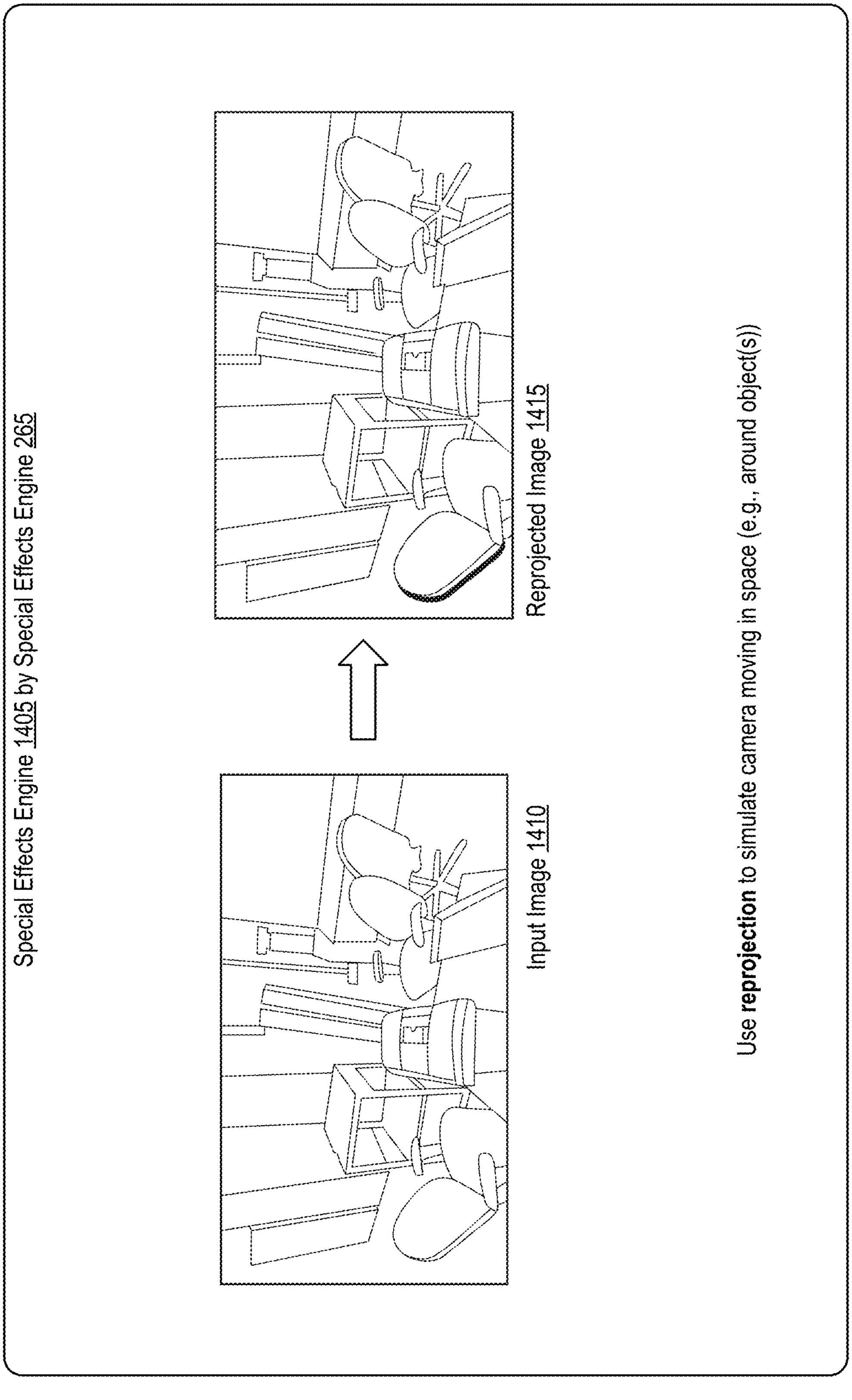
FIG. 14 is a conceptual diagram illustrating an example of special effects performed by the special effects engine, in accordance with some examples.

FIG. 14 is a conceptual diagram 1400 illustrating an example of special effects 1405 performed by the special effects engine 265. The special effects 1405 performed by the special effects engine 265 can perform image reprojection using the image reprojection engine 215 to reproject an input image 1410 to rotate around an object, to pan alongside an object, to rotate the perspective about an axis, to move the perspective along a path, or some combination thereof. In the example illustrated in FIG. 14, an input image 1410 of an environment is reprojected from a different perspective of the environment to form a reprojected image 1415. The perspective on the environment in the reprojected image 1415 is to the left of the perspective on the environment in the input image 1410, for instance making the toolbox appear to rotate and/or slant to the right in the reprojected image 1415 relative to the input image 1410.

Figure 15:
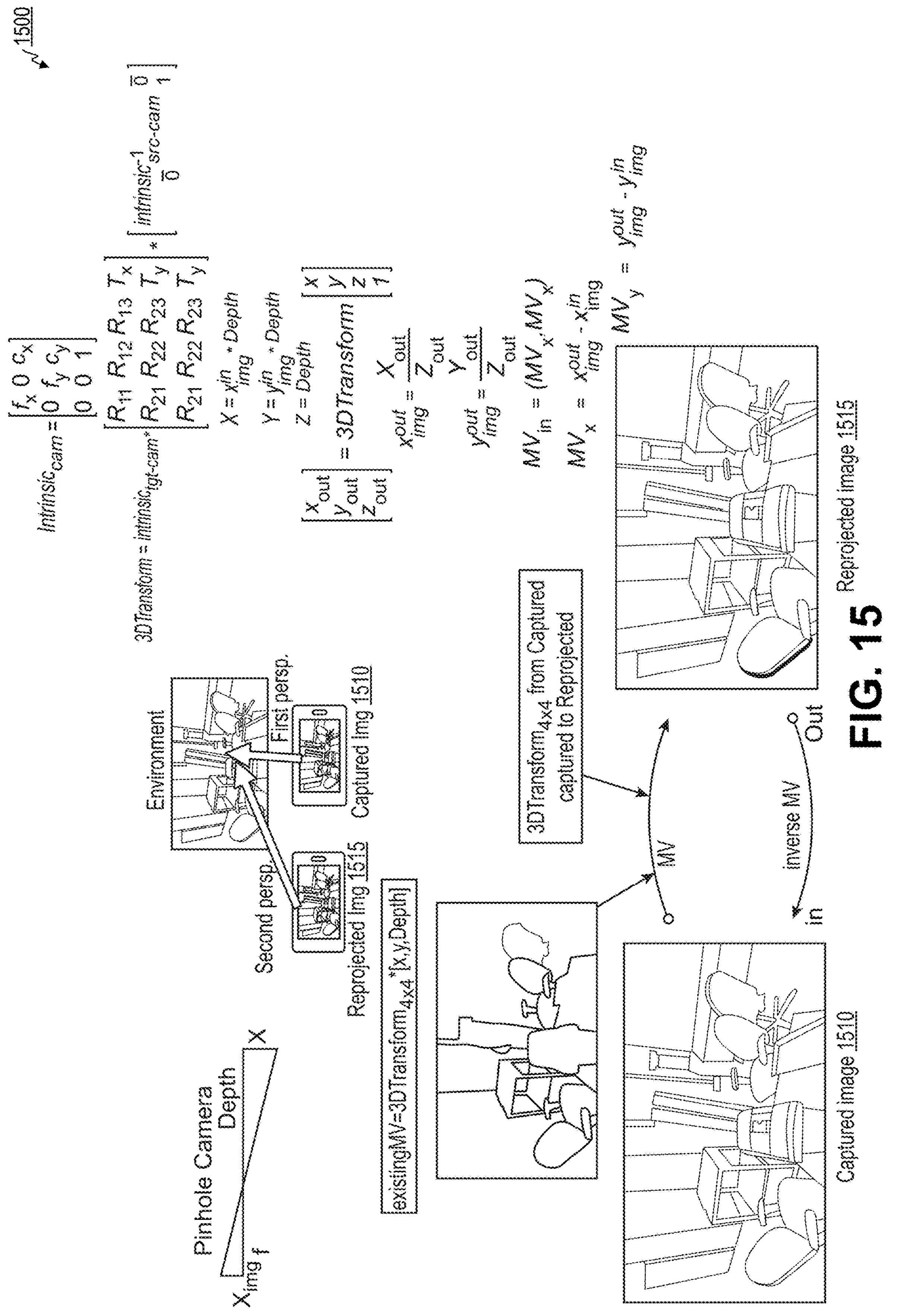
FIG. 15 is a conceptual diagram illustrating an image reprojection transformation based on matrix operations, in accordance with some examples.

FIG. 15 is a conceptual diagram 1500 illustrating an image reprojection transformation based on matrix operations. The conceptual diagram 1500 illustrates how the image reprojection engine 215 is able to reproject a captured image 1510 of an environment to generate a reprojected image 1515 of the environment from a different perspective than the captured image 1510. The image reprojection engine 215 receives a captured image 1510 from the sensor(s) 205, specifically from a camera. The captured image depicts the environment from a first perspective ("first persp."). An example of a captured image 1510 is illustrated in FIG. 15. For example, using a pinhole camera paradigm, together with the focal length (f) and the depth, an imaging system can determine where the objects are in the environment relative to the camera. The image reprojection engine 215 can use intrinsic matrix depicting the first camera (also known as the original camera, the source camera, or the first perspective), a second intrinsic matrix depicting a second camera or a virtual camera in the 3D world (also known as the target camera, or the second perspective), and a 3D transformation matrix, in order to move or reproject from the first camera to the second camera. In some examples, the image reprojection engine can also perform depth reprojection, to create a second depth map that depicts the environment from a second perspective, based on the same principles as image reprojection as described herein. Furthermore, a variety of transform paradigms can be used for image and/or depth reprojection, such as transform paradigms that take lens distortion (e.g., radial distortion) into account.

The image reprojection engine 215 receives a depth map ("depth on image domain") (e.g., depth data 620) for instance from a depth sensor and/or based on a determination of depth using the camera (e.g., stereoscopic depth perception, ToF sensor, and/or structured light). Based on the depth map, the image reprojection engine 215 can determine the exact location in 3D coordinates (e.g., X, Y, and Z) of any given object in the captured image 1510, such as any of the chairs, or the table, or the toolbox depicted in the captured image 1510. For instance, a set of equations are identified in FIG. 15 for determining the X, Y, and Z coordinates of an object in the environment, based on the depth of the object, the intrinsic matrix of the camera ($\text{Intrinsic}_{cam}$), and the coordinates $$x_{img}^{in}$$

and $$y_{img}^{in}$$

of the object in the captured image 1510. The equations are as follows:

$$X = x_{img}^{in} * \text{Depth}$$

$$Y = y_{img}^{in} * \text{Depth}$$

$$Z = \text{Depth}$$

An intrinsic matrix of the camera ($\text{Intrinsic}_{cam}$) can be used to transform 3D camera coordinates into 2D image coordinates, and can be based on measurement(s) of the focal length ($f_x$ and/or $f_y$) and/or principal point offset(s) ($c_x$ and/or $c_y$), as indicated below:

$$\text{Intrinsic}_{cam} = \begin{bmatrix} f_x & 0 & c_x \\ 0 & f_y & c_y \\ 0 & 0 & 1 \end{bmatrix}$$

A 3D transform can be based on the intrinsic matrix at a source camera position and at a target camera position corresponding to the reprojection, for instance as indicated below:

$$3DTransform = \text{intrinsic}_{tgt-cam} * \begin{bmatrix} R_{11} & R_{12} & R_{13} & T_x \\ R_{21} & R_{22} & R_{23} & T_y \\ R_{31} & R_{32} & R_{33} & T_z \end{bmatrix} * \begin{bmatrix} \text{intrinsic}_{src-cam}^{-1} & \vec{0} \\ \vec{0} & 1 \end{bmatrix}$$

The image reprojection engine 215 receives and/or determines a reprojection matrix that indicates how the perspective is to move in the environment for the reprojection (e.g., simulated movement of the camera). The values in the reprojection matrix depicted in FIG. 15 are labeled R11, R12, R13, Tx, R21, R22, R23, Ty, R31, R32, R33, and Tz. In another example, the image reprojection engine can get the transformation directly as a 3DTransform matrix (e.g., without performing at least some of the calculations indicated above). Once the image reprojection engine 215 knows how the perspective is to move in the environment, in the form of the reprojection matrix, the image reprojection engine 215 can determine the new 3D location of the object in the environment after the camera movement (e.g., in the reprojected image 1515), by determining $X_{out}$, $Y_{out}$, and $Z_{out}$ as follows:

$$\begin{bmatrix} X_{out} \\ Y_{out} \\ Z_{out} \end{bmatrix} = 3DTransform \begin{bmatrix} X \\ Y \\ Z \\ 1 \end{bmatrix}$$

The image reprojection engine 215 can use the new location of the object in the environment, defined by the coordinates $X_{out}$, $Y_{out}$, and $Z_{out}$, to determine new coordinates for the object in the reprojected image 1515, denoted as $$x_{img}^{out} \text{ and } y_{img}^{out},$$

respectively. The new coordinates for the object in the reprojected image 1515

$$x_{img}^{out} \text{ and } y_{img}^{out}$$

are determined by the image reprojection engine 215 as follows:

$$x_{img}^{out} = \frac{X_{out}}{Z_{out}}$$

$$y_{img}^{out} = \frac{Y_{out}}{Z_{out}}$$

The image reprojection engine 215 can use the coordinates of the object in the captured image $$1510(x_{img}^{in} \text{ and } y_{img}^{in})$$

and the new coordinates for the object in the reprojected image 1515

$$(x_{img}^{out} \text{ and } y_{img}^{out})$$

to determine motion vectors for the object from the captured image 1510 to the reprojected image 1515. The image reprojection engine 215 can determine the horizontal values for the motion vectors as $MV_x$, and the vertical values for the motion vectors as $MV_y$, as follows:

$$MV_{in} = (MV_x, MV_y)$$

$$MV_x = x_{img}^{out} - x_{img}^{in}$$

$$MV_y = y_{img}^{out} - y_{img}^{in}$$

The image reprojection engine 215 can use motion vectors $MV_x$ and $MV_y$ to know, for any pixel for any object in the captured image 1510, where that pixel should fall in the reprojected image 1515. In an illustrative example, parts of a chair may move 4 pixels to the right from the captured image 1510 to the reprojected image 1515. Meanwhile, parts of the toolbox may move 10 pixels to the right from the captured image 1510 to the reprojected image 1515, because the toolbox is closer to the camera than the chair. Thus, for each object, image reprojection engine 215 can calculate where the object should move to in the reprojected image 1515, compared to the captured image 1510.

The motion vectors can represent the pixel displacement of each pixel in the first image data to a pixel position in second image data where the displacement will be dependent upon the relative observation viewpoints of the first and second perspective and an inverse of the depth. As discussed above, the motion vectors can be determined based on depth data (e.g., "Depth" in the equations above). For instance, in some examples, the motion vectors can be determined based on position(s) of object(s) in the environment, such as 3D coordinates (e.g., X, Y, Z) that may be determined from the captured image data based on the depth data. In some examples, the motion vectors can be determined based on output(s) of a transformation of position(s) of object(s) in the environment, such as output(s) (e.g., $X_{out}$, $Y_{out}$, $Z_{out}$) of a transformation (e.g., 3DTransformation) of 3D coordinates (e.g., X, Y, Z) of the object(s).

In some examples, the focal length f of the camera may also factor into some of equations above. For instance, the determination of the X and Y coordinates of the object in the environment may be based on the focal length f, and the determination of the coordinates for the object in the reprojected image 1515

$$\left(x_{img}^{out} \text{ and } y_{img}^{out}\right),$$

for instance as indicated below:

$$X = \frac{x_{img}^{in} * \text{Depth}}{f}$$

$$Y = \frac{y_{img}^{in} * \text{Depth}}{f}$$

$$x_{img}^{out} = \frac{X_{out} * f}{Z_{out}}$$

$$y_{img}^{out} = \frac{Y_{out} * f}{Z_{out}}$$

Figure 16:
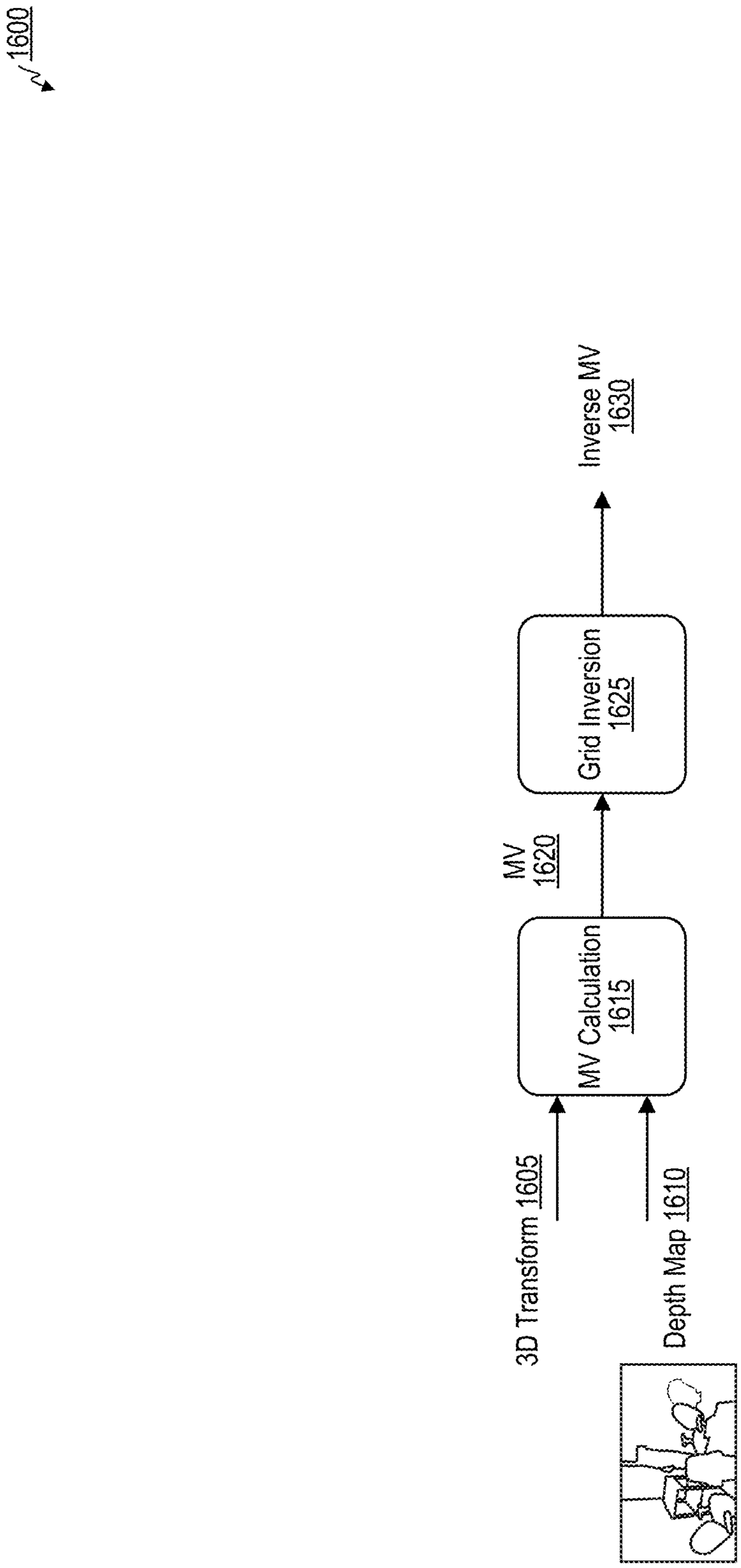
FIG. 16 is a block diagram illustrating a grid inversion transformation based on depth data and a 3D transformation, in accordance with some examples.

FIG. 16 is a block diagram 1600 illustrating a grid inversion transformation based on depth data and a 3D transformation. The grid inversion transformation obtains the 3D transformation 1605 (e.g., in the form of the reprojection matrix) and the depth map 1610, and generates motion vectors (MV) 1620 indicating motion of objects in the environment from the captured image 1510 to the reprojected image 1515 using a MV calculation 1615, as illustrated in FIG. 15. In some examples, the initial motion vectors can be referred to as existing motion vectors.

The grid inversion transformation performs grid inversion 1625 on the existing MV 1620 into inverse motion vectors 1630. In some examples, inverse motion vectors may be referred to as required motion vectors.

Figure 17:
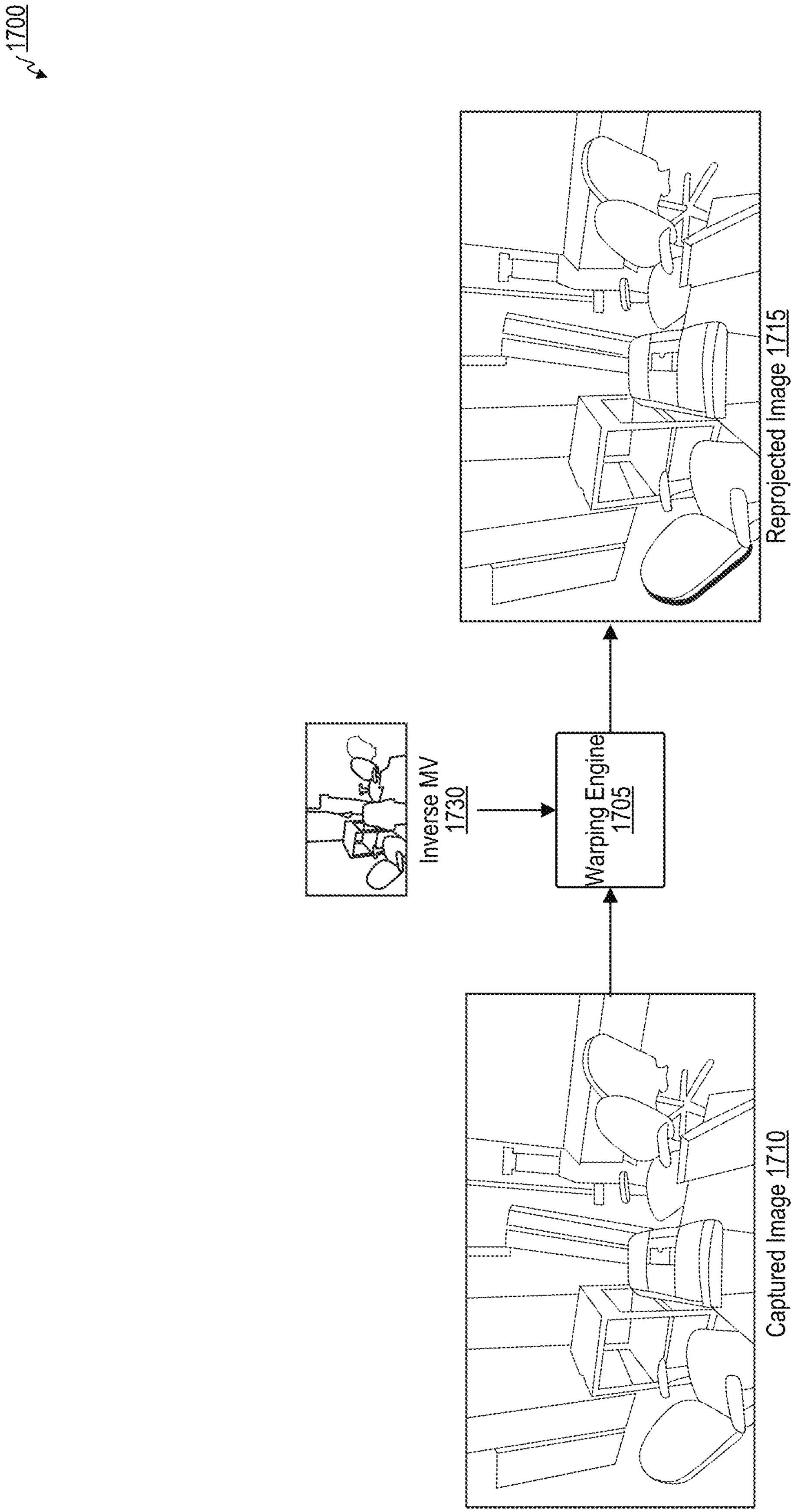
FIG. 17 is a block diagram illustrating an image reprojection transformation based on motion vectors, in accordance with some examples.

FIG. 17 is a block diagram 1700 illustrating an image reprojection transformation based on motion vectors. A warping engine 1705 is illustrated, which may be part of the image reprojection engine 215. The warping engine 1705 uses inverse motion vectors 1730 (e.g., the inverse MV of FIGS. 15-16) rather than the initially-determined motion vectors (the MV of FIGS. 15-16). This is because the inverse motion vectors 1730 are out-to-in motion vectors, while the initially-determined motion vectors (the MV) are in-to-out motion vectors. Out-to-in motion vector transformations are less computationally expensive than in-to-out motion vector transformations. In particular, if the warping engine 1705 generates the reprojected image 1715 using out-to-in motion vectors, such as the inverse motion vectors 1730, then the warping engine 1705 can generate the reprojected image 1715 pixel by pixel in raster order (or reverse raster order, or any preferred order) of the reprojected image. For each pixel in the reprojected image 1715, the out-to-in inverse motion vectors 1730 indicate to the warping engine 1705 to pull pixel data from a certain location in the captured image 1710, and fill that pixel of the reprojected image 1715 in with that pixel data from the captured image 1710. For instance, for a certain pixel in the reprojected image 1715, the warping engine 1705 can read the out-to-in inverse motion vectors 1730 to determine that the value for that pixel should be taken from the pixel that is 4 pixels to the left in the captured image 1710, and so forth.

In-to-out motion vectors can refer to motion vectors indicating motion of pixels from an initial image of a scene (from an initial perspective) to a target image of the scene (from a target perspective). The initially-determined motion vectors (e.g., the MV of FIGS. 15-16) can be examples of in-to-out motion vectors. Out-to-in motion vectors can refer to motion vectors indicating motion of pixels from the target image of the scene (from the target perspective) to the initial image of the scene (from the initial perspective). The inverse MV 1730 can be examples of out-to-in motion vectors.

When the warping engine 1705 performs warping (e.g., from the captured image 1710 to the reprojected image 1715), use of out-to-in motion vectors (e.g., the inverse motion vectors 1730) for the warping can provide a reduction in computational resource expenditure over use of in-to-out motion vectors (e.g., the MV of FIGS. 15-16) for the warping. In-to-out motion vectors (e.g., the MV of FIGS. 15-16) are organized based on the captured image 1710, not organized based on the reprojected image 1715. On the other hand, out-to-in motion vectors (e.g., the inverse motion vectors 1730) are instead organized based on the reprojected image 1715. When the warping engine 1705 performs warping to generate the reprojected image 1715, it is optimal to generate the reprojected image 1715 according to a pixel order based on the reprojected image 1715 (e.g., in raster order according to the reprojected image 1715) rather than to generate the reprojected image 1715 according to a pixel order based on the captured image 1710 (e.g., in raster order according to the captured image 1710). Use of the out-to-in motion vectors (e.g., the inverse motion vectors 1730) for the warping can allow the warping engine 1705 to generate the reprojected image 1715 according to a pixel order based on the reprojected image 1715 (e.g., in raster order according to the reprojected image 1715). For instance, using the inverse motion vectors 1730, the warping engine 1705 can generate each pixel of the reprojected image 1715, with any conflicts or missing areas already resolved as discussed with respect to FIG. 5. On the other hand, for the warping engine 1705 to generate the reprojected image 1715 in raster order of the pixels in reprojected image 1715 using in-to-out motion vectors, the warping engine 1705 would repeatedly search through the motion vectors through a pixel-by-pixel search of the captured image 1710 and the in-to-out motion vectors for each specific pixel of the reprojected image 1715 to find the data that should end up in that specific pixel of the reprojected image 1715. The repeated searches through the captured image 1710 and the in-to-out motion vectors are computationally expensive, and use significant power. In some cases, the warping engine 1705 may further need to resolve conflicts or fill in missing areas, and may resolve conflicts or fill in missing areas incorrectly if these searches bring up motion vectors in an incorrect order, for instance incorrectly prioritizing faraway objects over closer objects instead of prioritizing closer objects over faraway objects. Thus, even though it takes some computational expense to generate the out-to-in motion vectors (e.g., the inverse motion vectors 1730) from the in-to-out motion vectors (e.g., the motion vectors of FIGS. 15-16), the net result of using the out-to-in motion vectors (e.g., the inverse motion vectors 1730) for the warping is still a savings of computational resources and an increase in accuracy.

In some examples, the in-to-out MV (the existing MV) are determined at a low resolution, for example at ¼ of the resolution of the captured image, since determining the in-to-out MVs can be expensive. Generating the out-to-in MV (the required MV) by applying grid inversion to the in-to-out MVs is not computationally expensive. Further, reprojection using the out-to-in MV (the required MV) is not computationally expensive. The computationally inexpensive nature of these operations allows grid inversion and/or reprojection using the out-to-in MV (the required MV) to be performed efficiently, even at higher resolutions such as the full resolution of the captured image. Thus, the warping engine 1705 can generate the reprojected image to be a full reprojection of the captured image despite determining the in-to-out MV (the existing MV) at a lower resolution. This allows for further savings in computational resources and power.

The grid inversion engine 225 includes several mechanisms to handle missing data and/or conflicts in the inverted MV grid. As explained previously, the grid inversion engine changes the locations of the MVs to correlate the location of the pixels in the target image (e.g., the reprojected image 1715). In some cases, there are pixels that no MV in the input grid pointed to them, thus no MV will be placed at these locations using inversion alone. The grid inversion engine fill these cells in the inverted MV grid during its process by interpolation. Referring again to FIG. 5, an inverse MV grid 520 is generated via grid inversion, and includes missing cells that are marked using stars. For instance, cell 1 in the inverse MV grid 520 does not have a corresponding motion vector from the MV grid 505, is instead filled using inpainting. One option for interpolation is to interpolate the value for cell 1 using the values in its neighboring cells 0 and 2. For example, the weights for the interpolation can be by distance, thus based on the value 0 in cell 0 and the value −1 in cell 2, the interpolated value for cell 1 can be −½. Similar types of interpolation can be performed for cells 3, 5, 6, and 7.

The grid inversion engine 225 also includes mechanisms to handle conflicts in the inverted MV grid. In some cases, multiple MVs in the MV grid 505 can point to the same pixel in the second image (e.g., the second image Img2 515, the reprojected image 1715), thus creating conflicts of MVs in the inverted MV grid 520, requiring the grid inversion engine pick one of the conflicting values for a given cell in the inverse MV grid 525. An example of such a conflict is illustrated in cell 8 of the inverse MV grid 520. Both the car in cell 7 of the first image Img1 510 and the tree in cell 8 of the first image Img1 510 end up in the same pixel corresponding to cell 8 in the second image Img2 515 per the motion vectors extending from cells 7 and 8 in the MV grid 505. As a result, it can be unclear which value the grid inversion engine should pick to put into cell 8 of the inverse MV grid 520.

To resolve the conflict, the grid inversion engine 225 can select one value or the other. In some examples, a weighted average of the conflicting values can be used. If the grid inversion engine 225 has depth information corresponding to the two objects (e.g., from depth data 620), then the grid inversion engine 225 can select the value corresponding to the object that is closer to the sensors 205. This is because the closer object would, in many cases, cover, obstruct, or occlude the view of the farther object. If the grid inversion engine 225 lacks depth information corresponding to the two objects, then the grid inversion engine 225 can select the value based on other heuristics or techniques, for example selecting the value corresponding to the larger motion, or the object that appears to be larger. The object experiencing the larger motion is more likely to be closer to the sensors 205 regardless of object size, since a closer object's movement appears to cover a larger amount of the field of view of the sensors 205 than a father object's movement, even if the movements are the same speed. In some examples, the object that appears larger can also be closer to the sensors 205.

In some examples, referring to FIG. 5, the car that moves from cell 7 of the first image Img1 510 to cell 8 of the second image Img2 515 is closer to the sensors 205 than the tree, in which case the grid inversion engine 225 can select the value in cell 8 of the inverse MV grid 520 to be −1 (to be the inverse of the corresponding value of 1 in cell 7 of the MV grid 505). In some examples, in FIG. 5, the tree is closer to the sensors 205 than the car, in which case the grid inversion engine 225 can select the value in cell 8 of the inverse MV grid 520 to be 0 (based on the corresponding value of 0 in cell 8 of the MV grid 505). In some examples, the grid inversion engine 225 may lack information about relative depths of the car compared to the tree. In such a case, because the car is experiencing a larger motion (its value is 1 in the MV grid 505 compared to the tree's value of 0), the value in cell 8 of the inverse MV grid 520 is selected to be −1, since the car is likely to be closer to the sensors 205 than the tree. In some examples, if the car appears larger in the image(s) than the tree, the value in cell 8 of the inverse MV grid 520 is selected to be −1, since the car is likely to be closer to the sensors 205 than the tree. In some examples, the value in cell 8 of the inverse MV grid 520 is selected to be −½, as an average of the inverses of the values in cells 7 and 8 of the MV grid 505.

Different kind of interpolations can be performed, in one example the interpolation can weigh the values based on distance to neighboring cells. In another example the interpolation can weigh the values based on the depth of the neighboring. Other methods can apply. For instance, for larger gaps, like in cells 5, 6, and 7 of the inverse MV grid 520, the interpolation can weight information from closer cells higher than information from farther cells. For example, the value in cell 6 of the inverse MV grid 520 can be an average between the value (2) in cell 4 of the inverse MV grid 520 and the value in cell 8 of the inverse MV grid 520. The value in cell 8 of the inverse MV grid 520 may depend on how the conflict in cell 8 is resolved as discussed above. Assuming the value in cell 8 of the inverse MV grid 520 is −1, the value in cell 6 of the inverse MV grid 520 can be ½. The value in cell 5 of the inverse MV grid can 520 weight the value (2) in cell 4 of the inverse MV grid 520 higher than the value in cell 8 of the inverse MV grid 520 in its interpolation, for instance being the average of the value in cell 4 of the inverse MV grid 520 and the interpolated value in cell 6 of the inverse MV grid 520. Similarly, the value in cell 7 of the inverse MV grid 520 can weight the value (2) in cell 4 of the inverse MV grid 520 lower than the value in cell 8 of the inverse MV grid 520 in its interpolation, for instance being the average of the value in cell 8 of the inverse MV grid 520 and the interpolated value in cell 6 of the inverse MV grid 520. For instance, assuming the value in cell 8 of the inverse MV grid is −1, the value in cell 5 of the inverse MV grid can be set to 1.25, while the value in cell 7 of the inverse MV grid can be set to −0.25.

Figure 18:
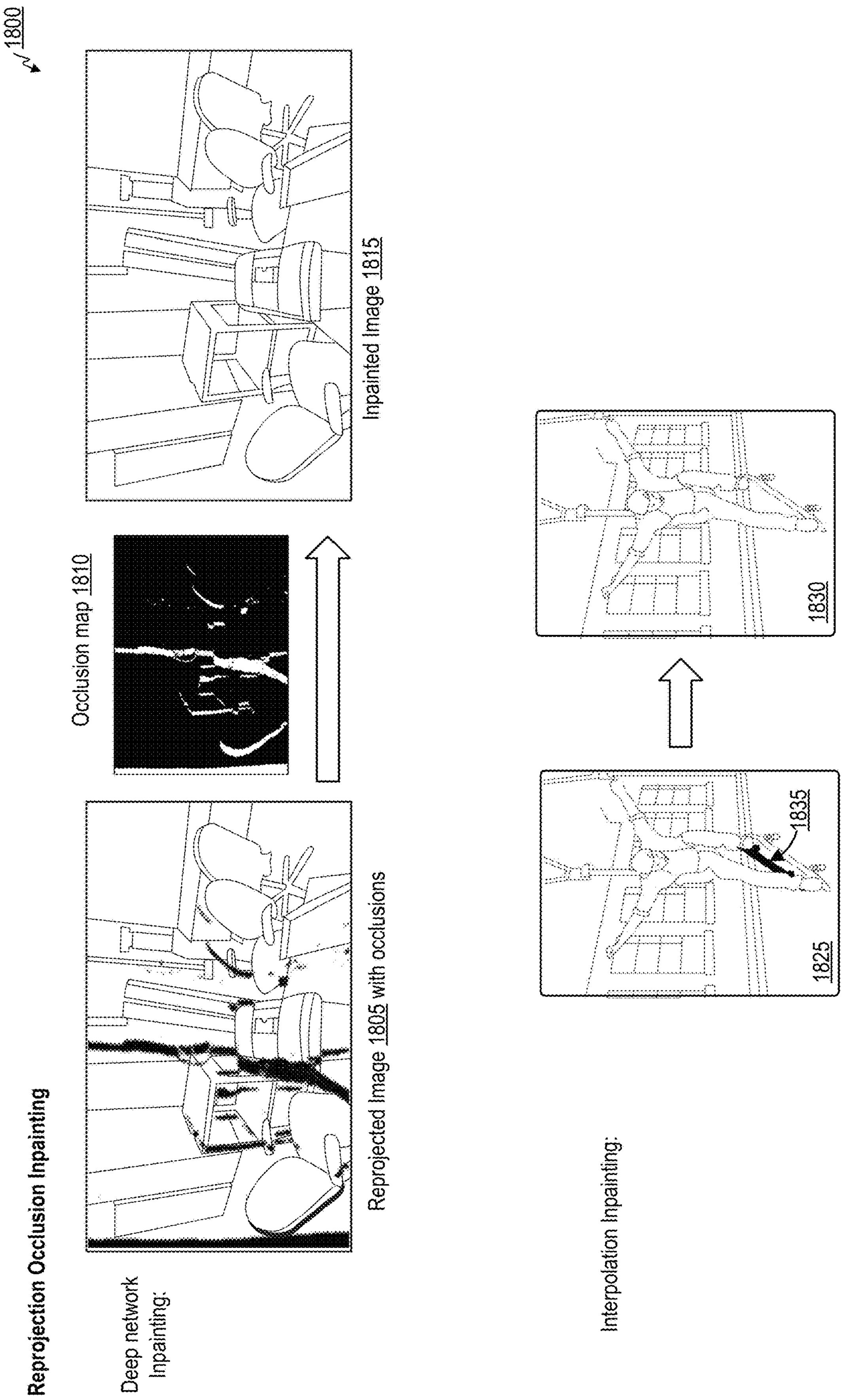
FIG. 18 is a conceptual diagram illustrating an example of inpainting to resolve occlusions, in accordance with some examples.

FIG. 18 is a conceptual diagram 1800 illustrating an example of inpainting to resolve occlusions. Some areas in certain reprojected images may not have appropriate data from the input image, and may therefore represent gaps or occlusions in such reprojected images. In the reprojected image 1805, occlusions areas appear as black areas. For instance, occlusion areas are visible to the left of each of the chair (especially the leftmost chair), to the left of the toolbox, and to the left of the table. These occlusion areas can occur when an object that is close to the sensors 205 is moved from side to side. An occlusion map 1810 of the reprojected image 1805 illustrates the occlusion areas in white, with all non-occluded areas in black. The imaging system 200 modifies the reprojected image 1805 to fill in the occlusion areas using inpainting to generate the inpainted image 1815. In some examples, deep learning based inpainting is used, which can provide high quality inpainting that intelligently inpaints based on the training of a deep learning model used for the deep learning based inpainting, which may have been trained based on training data that includes an original copy of an image and a second copy of an image with occlusions added, similar to the occlusions illustrated in the reprojected image 1805 and the occlusion map 1810. An example of deep learning based inpainting is illustrated in the inpainted image 1815.

In some examples, a less computationally expensive form of inpainting can be used, such as interpolation or in-line or nearest value inpainting, based on the computational bandwidth available, and/or the power allowance of the imaging system 200, for the inpainting operation. An example of an interpolation-based inpainting, for instance using interpolation and/or in-line or nearest value inpainting, is illustrated using a 3D depth-based zoom example at the bottom of FIG. 18. A 3D depth-based zoom image 1825 is illustrated in FIG. 18, with an occlusion area 1835 visible between the skateboarder's legs, at a former position of the skateboard. An inpainted image 1830 is illustrated using interpolation-based inpainting, for instance using interpolation or in-line or nearest value inpainting, to inpaint this occlusion area 1835.

Figure 19:
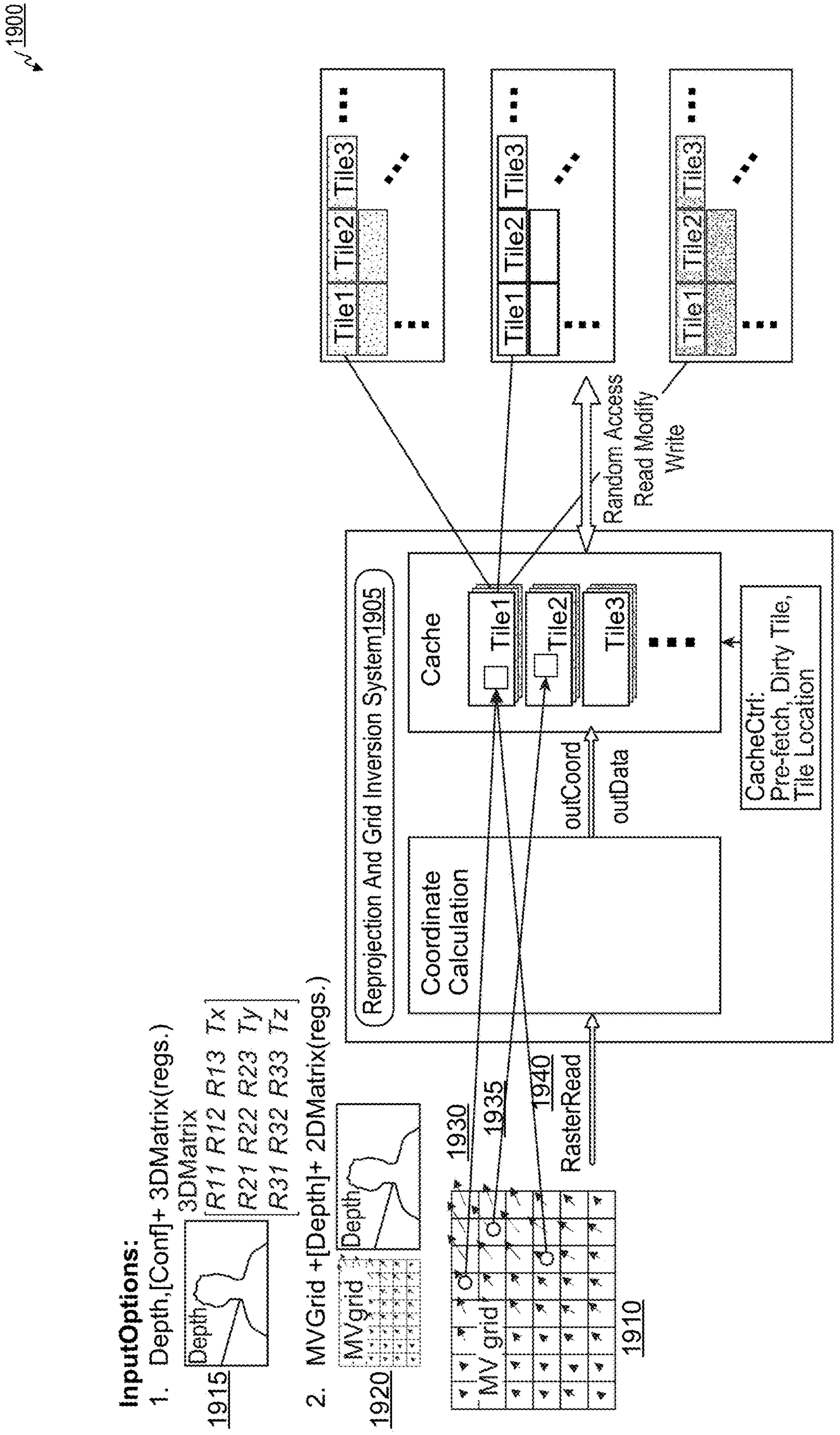
FIG. 19 is a block diagram illustrating an architecture of a reprojection and grid inversion system, in accordance with some examples.

FIG. 19 is a block diagram 1900 illustrating an architecture of a reprojection and grid inversion system 1905. The reprojection and grid inversion system 1905 can read data in raster order. In some examples, the reprojection and grid inversion system 1905 reads the MV grid 1910 in raster order, and/or reads depth data (e.g., from depth sensors) (e.g., first option 1915) in raster order, and gets a 3D matrix. For each pixel in the input, for each motion vector and/or depth value in the input, the reprojection and grid inversion system 1905 puts the pixel in the output in a location in the output. Each tile number represents a group of pixels in the output. Going in raster order, the pixel indicated by the arrow 1930 is going to tile 1 and the pixel indicated by the arrow 1935 is going to tile 2. Pixels that are not close to one another in the input grid can be closer in the output grid. Based on this, keeping the tiles in a cache may be useful, in case the reprojection and grid inversion system 1905 needs to write more data to the tiles. If the reprojection and grid inversion system 1905 starts with tile 1, for instance, and then moves to tile 2, the reprojection and grid inversion system 1905 may need tile 1 again in a later time. Keeping the tiles in cache (for as long as the reprojection and grid inversion system 1905 can based on a least recently used (LRU) caching system) allows the reprojection and grid inversion system 1905 to quickly modify the tile again and not read it from DRAM.

In some cases, using depth-based reprojection, closer objects can move more than farther objects. Thus, objects from different areas in the input image can appear in the same area in the reprojected image. The pixel/arrow 1930 and the pixel/arrow 1940 are one example of this, originating in different locations in the input (e.g., MV grid 1910), but falling in the same area in the output, for example in tile 1. The reprojection and grid inversion system 1905 thus can keep tile 1 in memory so that it can modify tile 1 (e.g., overwrite tile 1 with the value of the pixel indicated by the arrow 1940). Keeping the entire output buffer in memory hardware may be excessive, so the reprojection and grid inversion system 1905 can include a caching mechanism to keep tiles in memory hardware.

If the reprojection and grid inversion system 1905 is starting at the beginning of the raster order, and this is the first time the reprojection and grid inversion system 1905 wants to write to a tile (e.g., the value of the pixel indicated by the arrow 1930 to tile 1), the reprojection and grid inversion system 1905 just resets tile 1 and writes the value in question into tile 1 without the need to read the tile from the DRAM first. In some examples, value from tile 1 can be moved from cache to DRAM. The reprojection and grid inversion system 1905 uses the cache so that it doesn't need to perform read/modify/write operations too many times, but the reprojection and grid inversion system 1905 does have the capability for read/modify/write operations when necessary. As long as the tiles are in the cache, the reprojection and grid inversion system 1905 has immediate access to them. At some point, the cache can get full, and the reprojection and grid inversion system 1905 can send a tile from the cache to DRAM to make room for another tile (based on LRU). At some other time, the reprojection and grid inversion system 1905 needs, again, a tile that was sent from the cache to the DRAM, then the reprojection and grid inversion system 1905 can read the tile back from the DRAM to the cache in order to modify it, and at some other point the tile can be written to the DRAM.

Additionally, the reprojection and grid inversion system 1905 has a prefetch mechanism that allows the reprojection and grid inversion system 1905 to bring the needed tiles up ahead of time and before processing, to avoid latency issue from reading tiles from the DRAM. The reprojection and grid inversion system 1905 works in an ordered fashion, and the prefetch mechanism can ensure that the reprojection and grid inversion system 1905 always has what it needs in the cache. The reprojection and grid inversion system 1905 can switch between prefetching and processing in lockstep, rather than randomly, to make sure that the reprojection and grid inversion system 1905 can work through all of the data in an ordered fashion and have everything in cache that requires processing.

The reprojection and grid inversion system 1905 can, in a first option 1915, receive depth data and a 3D matrix. In some examples, the reprojection and grid inversion system 1905 can generate the MV grid 1910 from the depth data and the 3D matrix. The reprojection and grid inversion system 1905 can, in a second option 1920, receive an MV grid with depth data and a 2D matrix. In some examples, the reprojection and grid inversion system 1905 can generate the MV grid 1910 from the MV grid with depth data and a 2D matrix. If the reprojection and grid inversion system 1905 receives depth and a 3D matrix (first option 1915), or if the reprojection and grid inversion system 1905 receives an MV grid and/or 2D matrix (second option 1920), the reprojection and grid inversion system 1905 uses its coordinate calculation system to calculate the output coordinates (outCoord) and output data (outData). In some examples, the output data can include output motion vectors (outMV) and output depth (outDepth). The reprojection and grid inversion system 1905 can also output additional output data (as part of outData), such as a confidence (outConf) and/or occlusions (outOcc), to determine where occlusion areas are. The output from the reprojection and grid inversion system 1905 can be output as output data to one or more buffers, cache, or other memory. In one illustrative example, the output buffers (or cache or other memory) illustrated on the right side of FIG. 19 include an output buffer (or cache or other memory) for depth, an output buffer (or cache or other memory) for MV grid (e.g., with depth and/or confidence), and an output buffer (or cache or other memory) for occlusion. These output buffers (or cache or other memory) can be output as multiple output images. The prefetch and caching mechanisms can handle the three buffers at once. Because each output buffer can store a different amount of bits in each tile, the prefetch and caching mechanisms can handle synchronization between all the different levels of the bits and the different size tiles at every stage.

In some examples, the reprojection and grid inversion system 1905 uses specialized hardware that is designed specifically to be efficient at the motion vector manipulation, coordinate calculation, caching, prefetching, and generating the output buffers. In some aspects, certain operations can be performed using a processor, such as a CPU or GPU.

In some examples, the output confidence (outConf) is not generated specifically for reprojection, but is the byproduct of depth measurements from a depth sensor. In some examples, the acquired depth can suffer from measurement inaccuracies and/or other issues that can be represented by a confidence map. It can be beneficial to improve the depth based on the confidence map and/or the visual (RGB) image. The reprojection and grid inversion system 1905 can reproject the depth and the confidence to match the visual (RGB) image, and to allow the confidence to be used in the correct domain in the reprojected image. Once the depth matches the RGB image, the reprojection and grid inversion system 1905 can use the confidence to improve the depth.

In some examples, the imaging system can use "triangle walk" operations to determine where a given pixel from an input image (e.g., first image Img1 510, captured image 1710) should be moved to in a reprojected image (e.g., second image Img2 515, reprojected image 1715).

Figure 20:
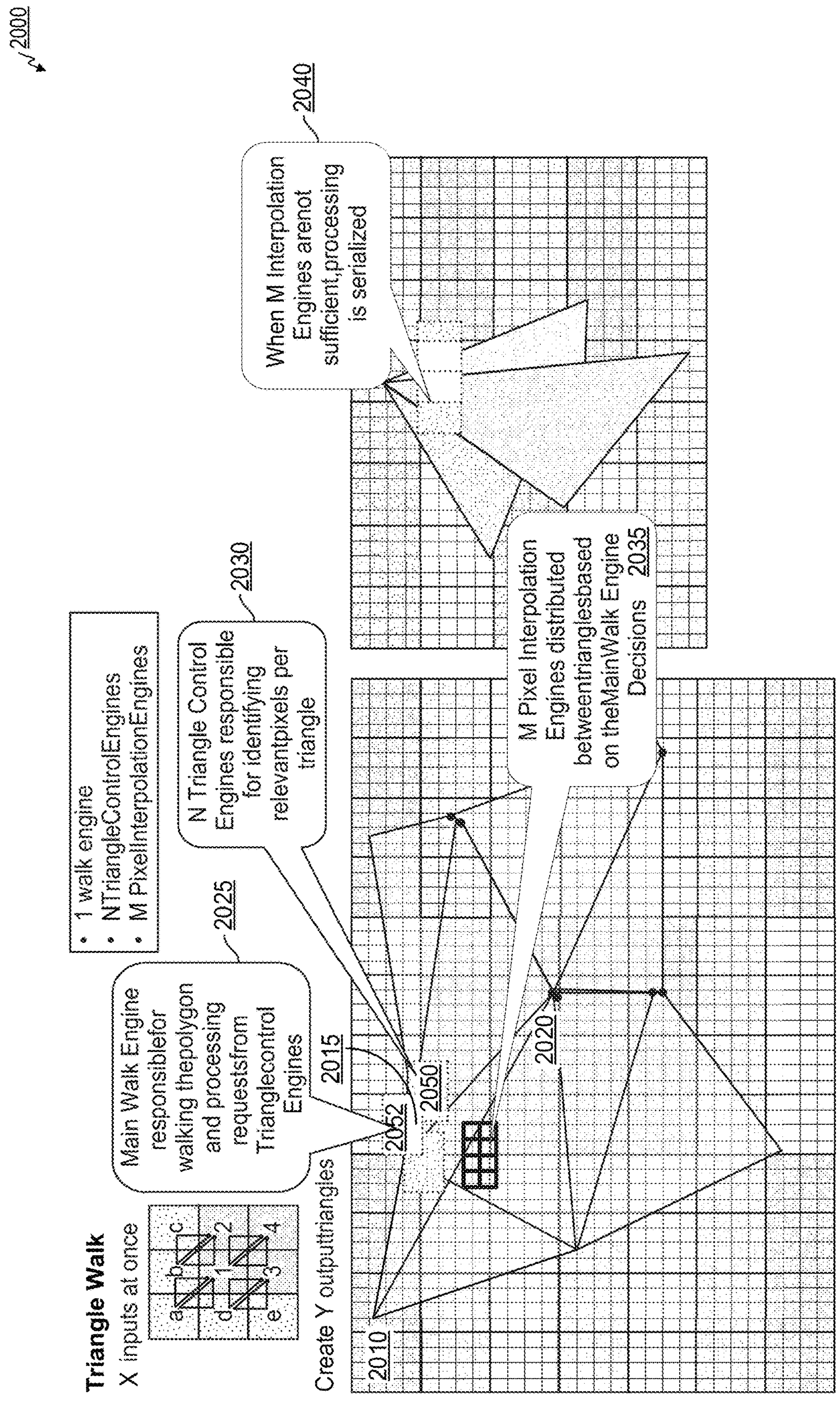
FIG. 20 is a conceptual diagram illustrating an example of triangle walk operations, in accordance with some examples.

FIG. 20 is a conceptual diagram 2000 illustrating an example of triangle walk operations. In some examples, different pixels from the input image can be moved to different locations in the reprojected image. The system can process X inputs at once, with X being equal to any integer value (e.g., 3, 4, 5, 6, 10, etc.). The system can generate Y output triangles (e.g., per set of inputs), with Y being equal to any integer value (e.g., 6, 7, 8, 9, 10, 15, etc.). The pixels in the input include a pixel a, a pixel b, a pixel c, and so forth. In some examples, the pixel data from pixel a in the input image can be moved to a first one of the locations in the reprojected image, the pixel data from pixel b in the input image can be moved to a second one of the locations in the reprojected image, and the pixel data from pixel c in the input image can be moved to a third one of the locations in the reprojected image, and so forth. Going through a map (e.g., the MV grid 505 or the inverse MV grid 520), the system finds out where each pixel in the input image should go in the reprojected image. So, in an illustrative example, pixel a of the input image ends up at pixel 2010 of the output, pixel b of the input ends up at pixel 2015 of the output, and pixel 1 of the input ends up at pixel 2020 of the output, and so forth. For each input pixel, the imaging system calculates where the input pixel's value is configured to end up in the output. For the areas in between the specific pixels in the output (e.g., the shaded triangular area in between pixels 2010, 2015, and 2020), the imaging system fills in the area using interpolation. To perform the interpolation, the imaging system can have a processor (e.g., a GPU or other processor) go over each of the triangles separately, and interpolate for each output pixel individually, one by one.

However, to increase efficiency, the imaging system can put the triangles together to form a large polygon, namely the polygon made from the combination of all of the triangles (including the triangle with pixels 2010, 2015, and 2020) on the output side of FIG. 20. The imaging system can have a dedicated hardware processor that is designed specifically to be efficient for the interpolation, or have other processor perform the interpolation (e.g., a GPU or other processor). It can be inefficient for the imaging system to use the processor (e.g., the GPU) to go over each of the triangles separately, and interpolate for each output pixel individually, as many of these triangles include image data that is close together and similar. To improve efficiency, the imaging system can merge the triangles into a polygon, and can have the processor (e.g., the GPU) go over the entire polygon at once, performing interpolation over the entire polygon's pixels.

The imaging system includes a main walk engine 2025, N triangle control engines 2030 (where N can be equal to any integer value, such as 6, 8, 10, or other value), and M pixel interpolation engines 2035 (where M can be equal to any integer value, such as 6, 8, 10, or other value, and may be equal to N in some implementations). The main walk engine 2025, illustrated as a box with a dashed line shaded in with white, goes over the whole polygon at once. The N triangle control engines 2030, two of which are illustrated as boxes with dashed lines and a light shading, and each is in charge of one of the triangles. The main walk engine 2025 traverses across the whole polygon, effectively pre-scanning output locations and/or areas that are to be used by the imaging system for image reprojection, allowing the imaging system to pre-fetch and/or retrieve data (e.g., tiles) from DRAM early to cache the data and thereby reduce or eliminate delays (e.g., in filling, interpolation, or other image processing operations) that might otherwise be caused by retrieval of the data from DRAM.

Figure 21:
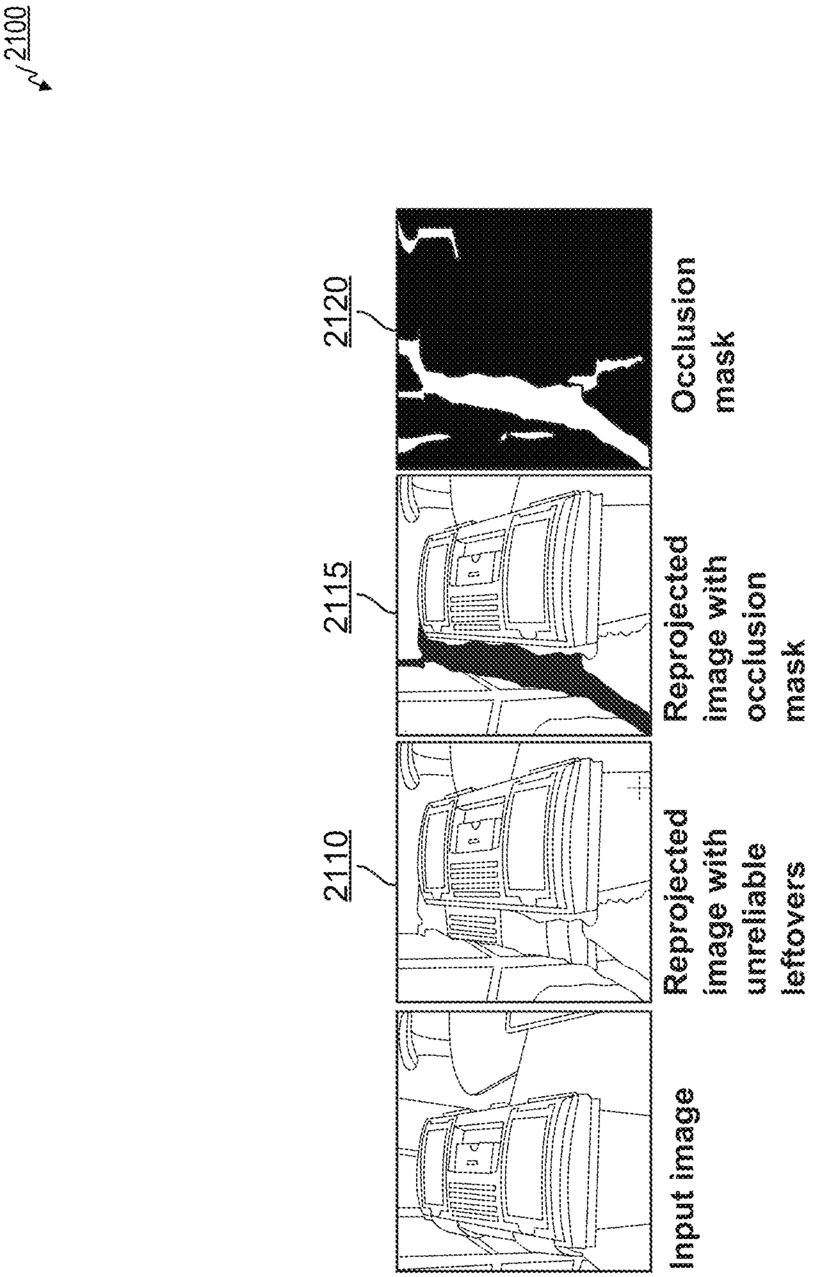
FIG. 21 is a conceptual diagram illustrating an example of occlusion masking, in accordance with some examples.

FIG. 21 is a conceptual diagram 2100 illustrating an example of occlusion masking. Occlusion areas are areas of a reprojected image within which the image reprojection engine 215 does not have image data available. As noted previously, the image reprojection engine 215 performs interpolation for areas that do not have specific values in the originally captured image. Even for occlusion areas, this interpolation is still performed, for instance to avoid those areas being filled with unreliable data (e.g., whatever happens to be in DRAM). The image 2110 may be an example of filling using such unreliable data. To perform reprojection, certain objects, such as the toolbox, may be slightly stretched in certain directions (e.g., horizontally), though this stretching is generally not significant enough to produce a negative effect, and in some cases can enhance the appearance of the new perspective in the reprojected image. However, in certain areas, the holes or gaps exceed a threshold size beyond which interpolation can unreliable, which can be determined to be an occlusion area by the image reprojection engine 215.

In some examples, the image reprojection engine 215 can determine that an occlusion area exists based on corner depth. For example, the image reprojection engine 215 may determine that an occlusion area exists in an area (e.g., as in the triangles of FIG. 20 or another shape) if the differences between the depths at corners of the area exceed a threshold difference. The threshold difference may change based on the minimum of the depths.

Once the image reprojection engine 215 defines that an occlusion area exists (e.g., based on the differences between the depths at corners of the area exceeding the threshold difference), the image reprojection engine 215 can perform inpainting to fill in the occlusion area(s) of the reprojected image with image data. The "unreliable leftovers" in image 2110 can represent one form of inpainting, using portions of the toolbox image data in the occlusion area. In some cases, this type of inpainting may work well, even if it looks unusual in the image 2110. In some examples, occlusion may be performed using deep learning, for instance using one or more trained ML models.

Figure 22:
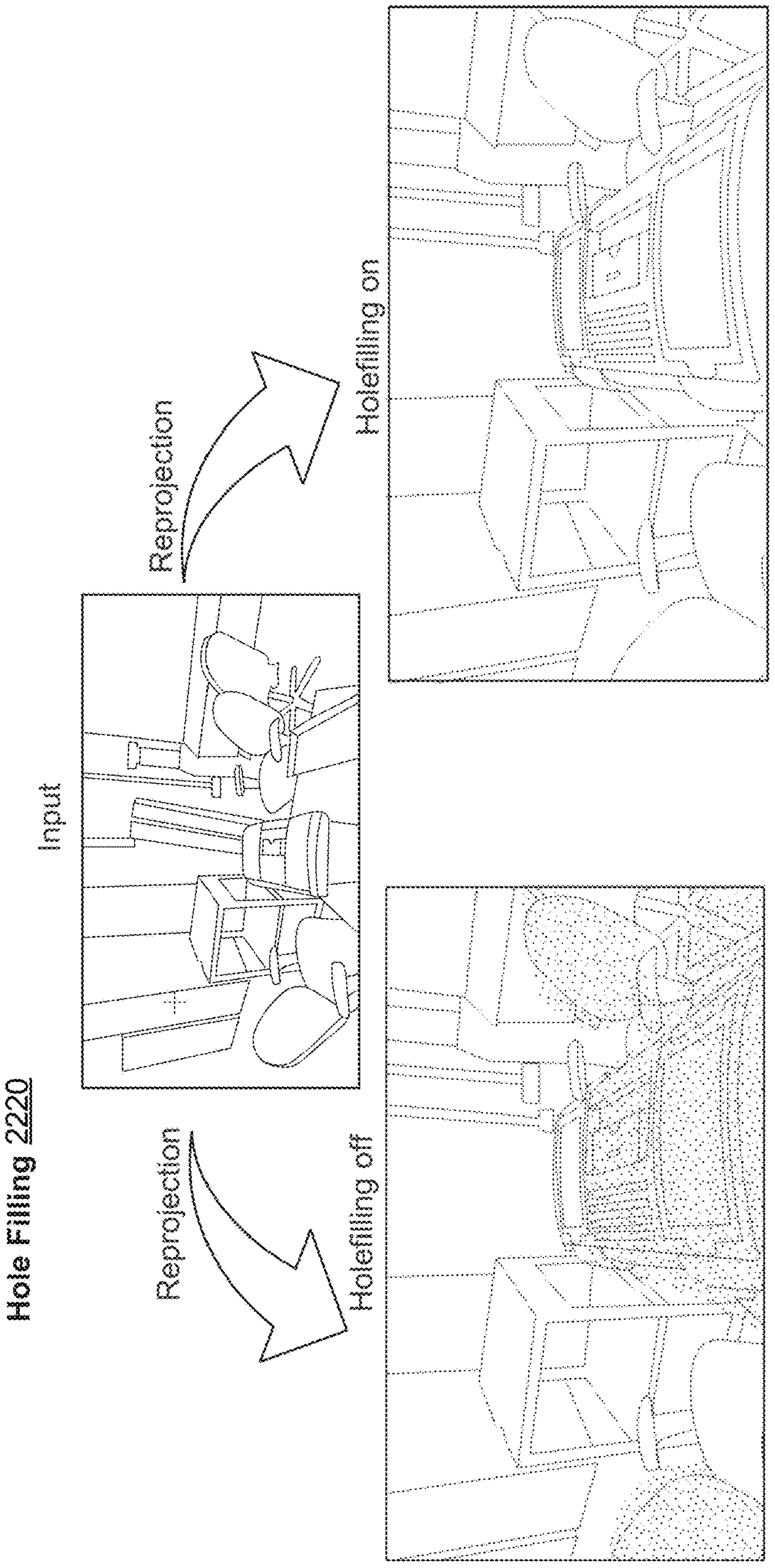
FIG. 22 is a conceptual diagram illustrating an example of hole filling, in accordance with some examples.

FIG. 22 is a conceptual diagram 2200 illustrating an example of hole filling. Hole filling refers to interpolation in the gaps where motion vector data does not exist. The flow 2220 illustrates that, with hole filling turned off, the reprojected image has many visual artifacts, for instance with a black and white dots in a visual artifact pattern that is particularly noticeably on the toolbox and other objects that are near the camera. With hole filling turned on, the holes in the reprojected image are filled in using interpolation, and the image looks clean and without such visual artifacts or visual artifact patterns. In some examples, hole filling can use inpainting, such as deep learning based inpainting, instead of or in addition to interpolation.

FIG. 23 is a conceptual diagram 2300 illustrating additional examples of a time warp 705 performed by the time warp engine 230. The time warp engine 230 calculates dense optical flows, here between frame n+1 and frame n, and between frame n and frame n−1, respectively. The input frame rate (in frames per second (FPS) is equal to Fin, which can be 30 FPS, 60 FPS, 120 FPS, 240 FPS, or other frame rate. The output frame rate is equal to Fout, which can be 60 FPS, 120 FPS, 240 FPS, 480 FPS, or other frame rate. These dense optical flows are calculated at high quality, but can be computationally expensive and/or use a high amount of power. The time warp engine 230 divides the dense optical flows to generate smaller partial optical flows between other frames, similarly to the time warp 705 of FIG. 7, for instance in between frames n−1 and n, or in between frames n and n+1. For example, the time warp engine 230 divides the dense optical flows to generate smaller partial optical flows for frames n+¾, n+½, n+¼, n−¼, n−½, and n−¾. These partial optical flows can serve as replacement to optical flow, as if each of the partial optical flows were calculated directly using an optical flow calculation. These partial optical flows can be broken down into fourths as in this example, or other similar fraction. These partial optical flows can be used to improve existing frames, if they exist, at frames n+¾, n+½, n+¼, n−¼, n−½, and n−¾. These partial optical flows can be used to generate new interpolated frames at frames n+¾, n+½, n+¼, n−¼, n−½, and n−¾. In some examples, the time warp 705 can be used to generate optical flows for video at a high frame rate (e.g., 90, 120 240, 480, or 960 fps) by first generating dense optical for the video at a lower frame rate (e.g., 30 or 60 fps) and using the time warp 705 to divide up the calculated dense optical flow into the optical flows for the frames in between.

In some examples, the time warp engine 230 can take the motion vectors for the optical flow, combine the motion vectors with a global matrix, and divide up the result into partial optical flows or motion vectors as in the time warp 705 after the combination.

Additional examples of image sharpening benefits of images without time warp 705 and using time warp 705 are illustrated. Details are recovered using the time warp 705 as indicated in the areas pointed at by the arrows, for example at the hair, ear, and t-shirt of the boy in the image in the middle, and at the markings in the image on the right. In particular, edges and/or areas that appear blurry are represented using dashed lines, while edges and/or areas that appear clear and sharp are represented using solid lines.

Figure 24:
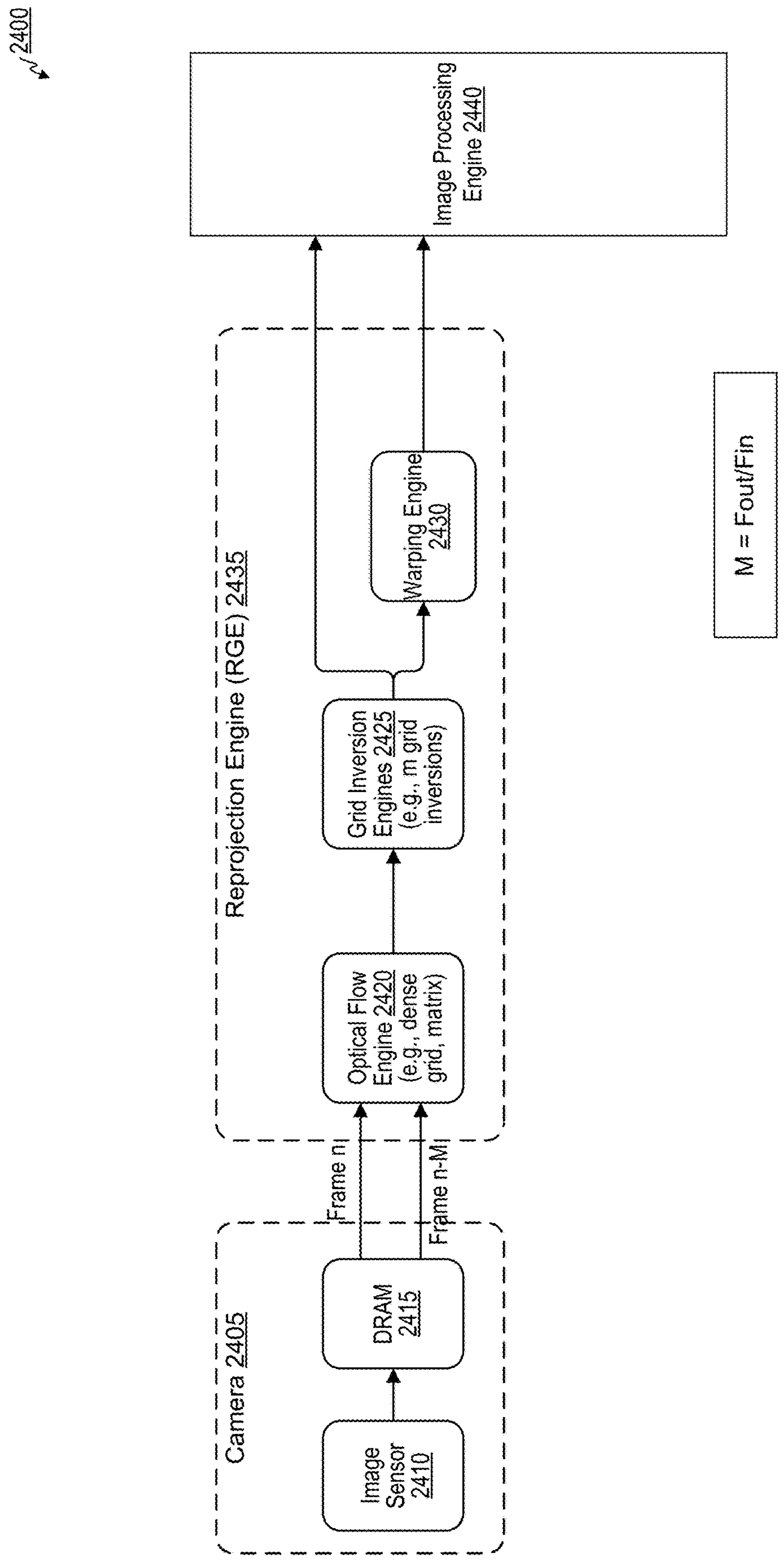
FIG. 24 is a block diagram illustrating an example architecture of a reprojection engine, in some examples for the time warp engine, in accordance with some examples.

FIG. 24 is a block diagram 2400 illustrating an example architecture of a reprojection engine 24341, in some examples for the time warp engine 230. The optical flow engine 2420 receives a frame n and a frame n-M from a camera 2405 with an image sensor 2410 and dynamic random access memory (DRAM) 2415. The optical flow engine 2420 and generates motion information. In some examples, the motion information includes two types of motion information, including global motion and local motion. For instance, a matrix (e.g., a global matrix) can in some cases represent the global motion. The optical flow engine can generate a dense grid of motion vectors to indicate local motion and 3D motion. In other examples, the dense grid of motion vectors can also indicate the global motion, and/or combination of local motion, 3D motion and global motion.

A grid inversion engine 2425 receives the motion information (e.g., the dense grid of motion vectors and in some cases the matrix representing the global motion) from the optical flow engine 2420. The grid inversion engine 2425 is run multiple (M) times, with each run dividing up the motion vectors and outputting a different part of the motion vectors. The grid inversion engine 2425 outputs M motion vectors. In some cases, the motion vectors can be multiplied by a factor. The motion vectors can be downscaled using a warping engine 2430 to provide different resolutions. The warping engine 2430 can receive the motion vectors from the dense grid and perform some warping, scaling, and/or other manipulations on the dense motion grid. In some examples, the warping engine 2430 can also get a transform matrix and warp the dense grid based on it. In other example, the warping engine 2430 can get a transform matrix and combine it with the dense grid The inverse motion vectors output by the grid inversion engine 2425 and/or the warping engine 2430 are output to an image processing engine 2440 to generate a reprojected image based on the inverse motion vectors.

Figure 25:
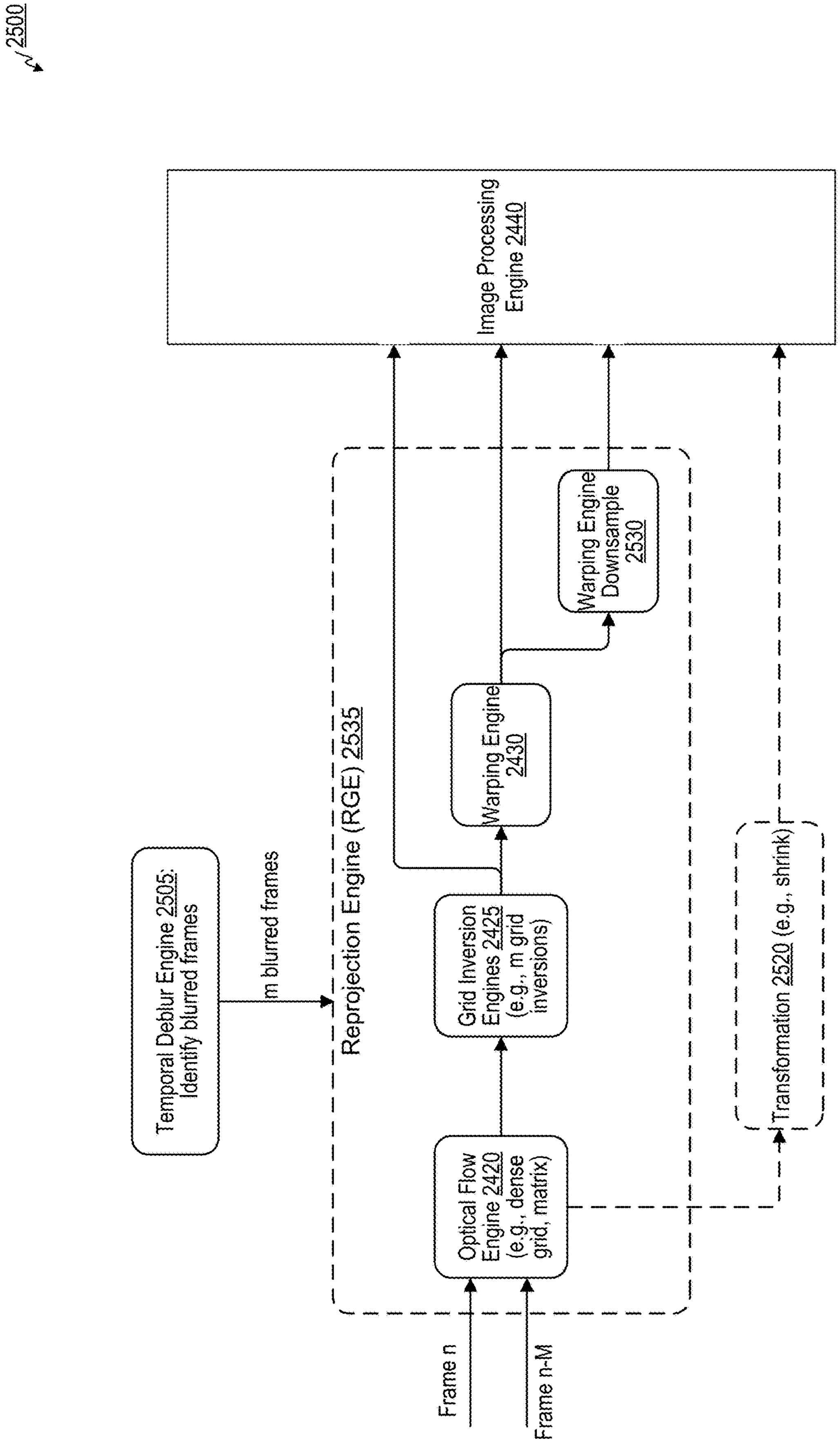
FIG. 25 is a block diagram illustrating an example architecture of a reprojection engine with temporal deblur, in some examples for the time warp engine with temporal deblur, in accordance with some examples.

FIG. 25 is a block diagram 2500 illustrating an example architecture of the reprojection engine 2535 with temporal deblur, in some examples for the time warp engine 230 with temporal deblur. The architecture in FIG. 25 is similar to the architecture in FIG. 24, but, a temporal deblur engine 2505 of the system determines which M frames are blurry (e.g., based on motion detection and/or image analysis) and uses the partial motion vectors generated by the grid inversion engines 2425 to deblur and/or sharpen the blurred frames. In some examples, a temporal deep learning algorithm of the reprojection engine 2535 analyzes pose sensor data and sees how much movement (and thus how much blur) there was during capture of each frame. In some examples, the original motion vectors are provided from the optical flow engine 2420 to the image processing engine 2440, in some cases after further transformation 2520 (e.g., shrinking).

Figure 26:
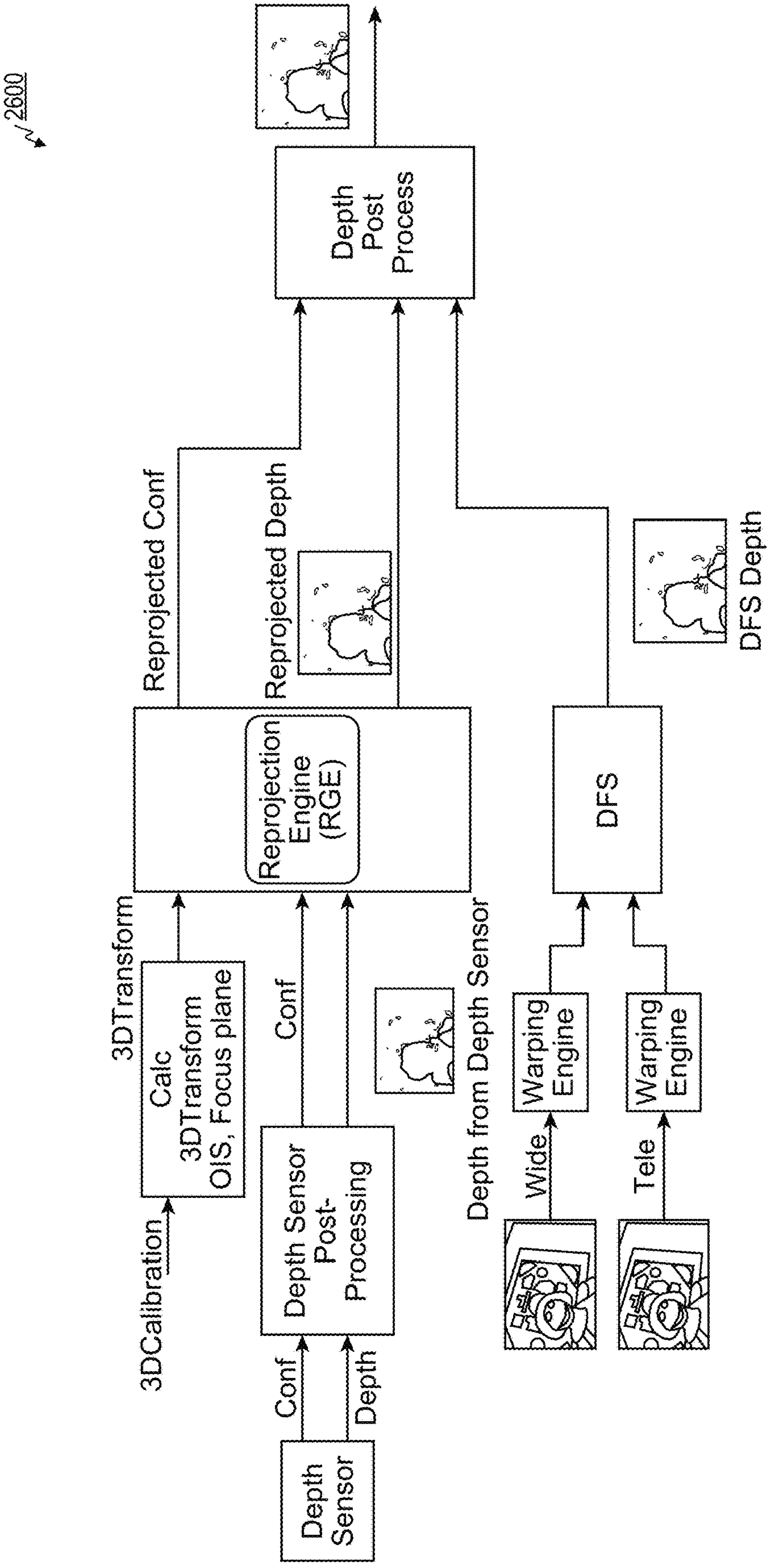
FIG. 26 is a block diagram illustrating an example architecture of the depth sensor support engine for a time of flight (ToF) sensor, in accordance with some examples.

FIG. 26 is a block diagram 2600 illustrating an example architecture of the depth sensor support engine 235. Time of Flight (ToF) sensor is an example of a depth sensor, but the depth sensor support engine 235 can in some examples use a different type of depth sensor as described herein. Post processing can be applied to clean up the depth values from the depth sensor to provide higher quality depth values, for example by filtering out outliers and/or normalizing noise. In some cases, the post processing may also receive a confidence map together with the depth, and the post processing can then clean the confidence map as well, and/or use the confidence map to assist in the depth processing. The depth, and in some cases the confidence, are sent to the reprojection engine, which can reproject the depth image and the confidence map based on the 3D transformation, for instance to align with an image sensor (e.g., wide angle or telephoto). The reprojection engine may generate reprojected depth and confidence values, which may be run through depth post-processing once again to clean up the depth and confidence values. The depth post-processing may also accept images from the wide angle and telephoto sensors, and/or secondary depth sensor data from a secondary depth sensor (e.g., DFS depth), and the depth post-processing can adjust the depth to further improve it and correct inaccuracies coming from the original depth. The 3D transformation can be based on a 3D calibration between the image sensors and the depth sensors. If the depth sensors and the image sensors move relative to one another (e.g., focus change, zoom, OIS, and/or others), the 3D calibration may account for this and update the 3D transformation. It should be understood that the secondary depth flow in the bottom part of FIG. 26, (i.e., DFS with Wide and Tele images), is an illustrative example. In other examples the secondary depth can come from another depth sensor, a deep learning depth engine, and/or any other depth source. In some examples, the depth post processing will not have a secondary depth. In some examples the depth post processing can have more than two depth sources.

Figure 27:
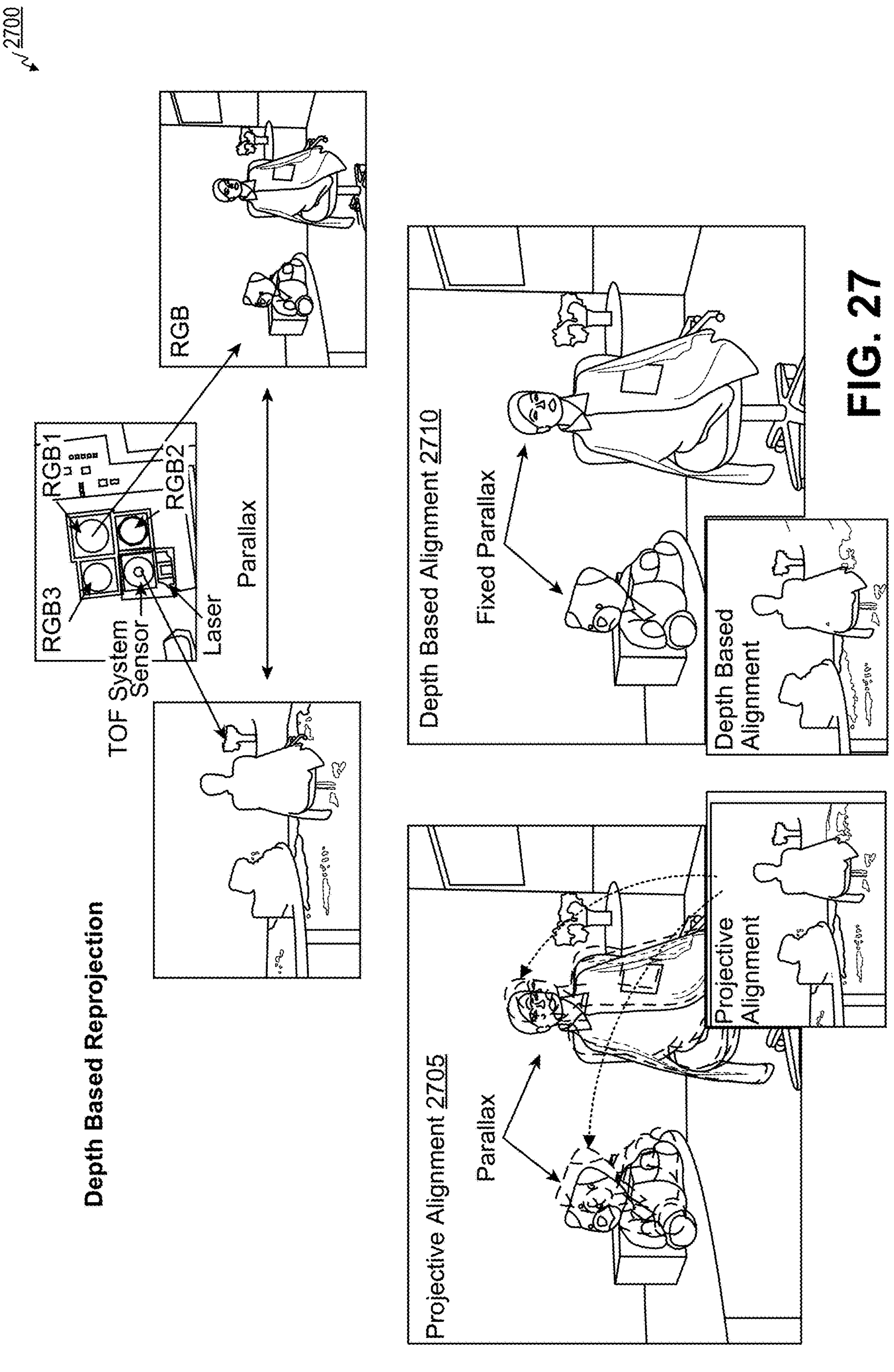
FIG. 27 is a conceptual diagram illustrating additional examples of depth sensor support performed by the depth sensor support engine, in accordance with some examples.

FIG. 27 is a conceptual diagram 2700 illustrating additional examples of depth sensor support 805 performed by the depth sensor support engine 235. In these additional examples, a main image sensor (e.g., RGB3) and a depth sensor (e.g., TOF system) are illustrated on a circuit board. Both depth maps and images are illustrated. In the example on the left (projective alignment 2705), some elements are aligned, but other objects with different distances to the camera, such as the teddy bear or the head of the figure, are misaligned between the image data and the depth data. For instance, the depth data (e.g., illustrated using dashed lines) for the bear is to the right (parallax shift) compared to the image data for the bear. Similarly, the depth data (e.g., illustrated using dashed lines) for the figure is to the right (parallax shift) compared to the image data for the figure. On the other hand, in the example on the right (depth based alignment 2710), the parallax is fixed and the depth data and image data for each object are aligned.

Figure 28:
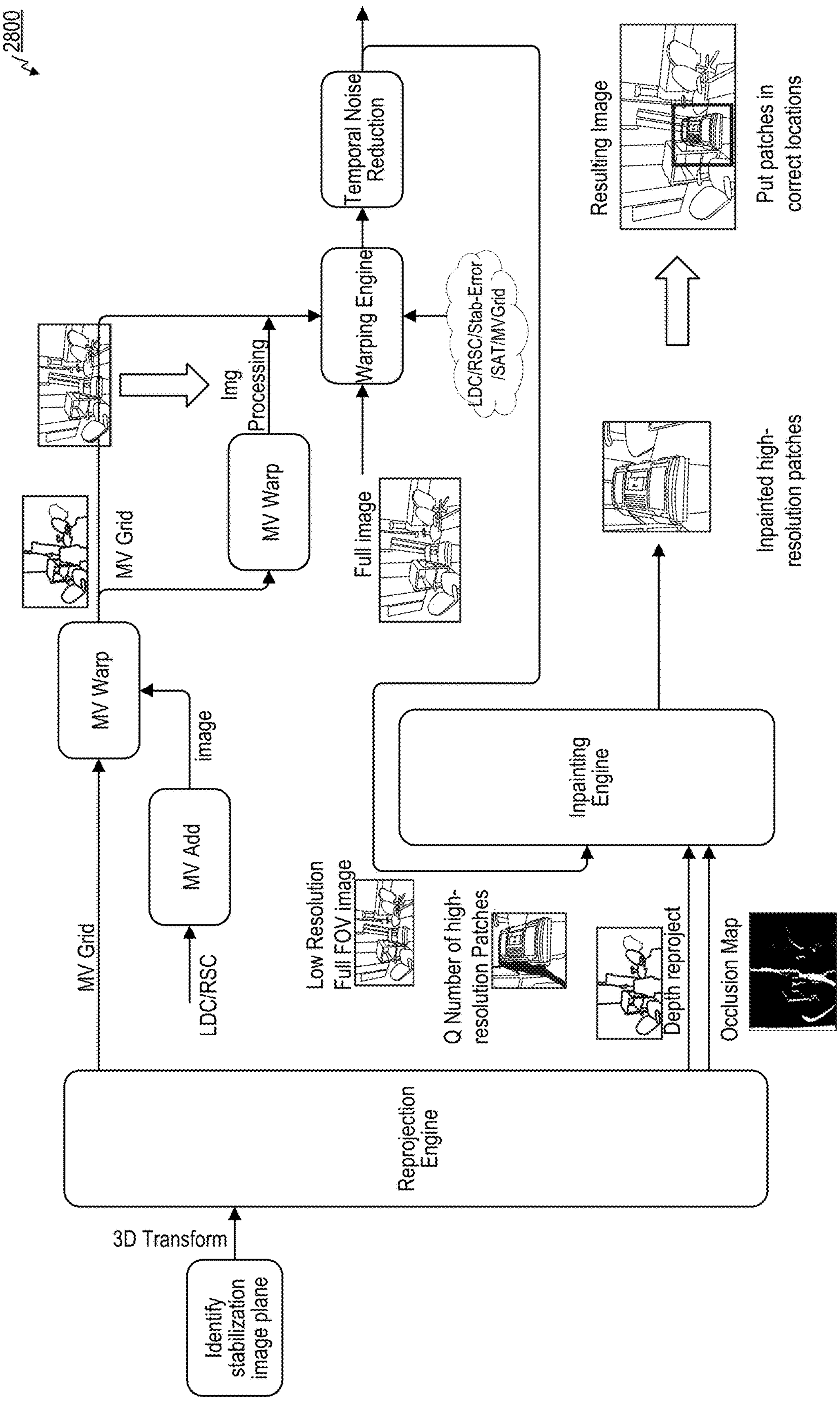
FIG. 28 is a block diagram illustrating an example architecture of an imaging system that includes the image reprojection engine and/or the 3D stabilization engine, in accordance with some examples.

FIG. 28 is a block diagram 2800 illustrating an example architecture of an imaging system that includes the image reprojection engine 215 and/or the 3D stabilization engine 240. The imaging system takes an input and reprojects the perspective to a new location in the environment. In the case of 3D stabilization, this reprojection can be done to reduce or eliminate wobbling of the camera, and/or to simulate a situation in which the camera is stable and/or stabilized, so that any movement includes no (or little) wobble or shakiness. For instance, the 3D stabilization engine 240 of the imaging system can create a virtual path, as if the video were captured along a virtual path that includes little or no shake and/or wobble. The imaging system can also be used for at least some of the other applications of image reprojection described herein, such as time warping, head pose correction, sensor support, and the like. The imaging system receives, as an input, image data and/or depth data, stabilizes or otherwise corrects any distortions in the data, and then provides the data to the reprojection engine. For 3D stabilization, the 3D stabilization engine 240 of the imaging system can creates matrices that indicate a stable smooth virtual path. The imaging system can create 3D transforms to change perspectives of images. For instance, for 3D stabilization, the 3D transforms can change respective perspectives of a series of images so that the respective perspectives of the images have origin points along a virtual path (e.g., the stable smooth virtual path). The 3D transforms, and in some cases the virtual path, can be fed to the reprojection engine. The reprojection engine can generate motion vectors (MVGrid) to warp the images to the identified perspective (e.g., so that the capture perspective is along the virtual path). In some examples, imaging system can perform lens distortion correction (LDC) and/or rolling shutter correction (RSC) to the image to reduce any distortion from the lens and/or rolling shutter, using another motion vector grid. In other examples, other distortions and/or transform errors can be corrected as well, using motion vectors and/or matrix. As illustrated in FIG. 30, in some examples, the 3D stabilization and the grid for LDC and RSC are combined together by combining motion vectors from both, and warped together. The new set of MVs can do both 3D stabilization and LDC and RSC. In some examples, the LDC and RSC MV grid may be more sparse than the 3D stabilization MV grid, in which case the LDC and RSC MV grid may be upscaled before the combination. In some examples, the 3D stabilization MV grid may be more sparse than the LDC and RSC MV grid, in which case the 3D stabilization MV grid may be upscaled before the combination. The combined MV grid can be sent to the warping engine that performs the warping. The resulting image is illustrated, with 3D stabilization (via reprojection), LDC, and RSC applied.

Occlusion areas may still remain in the resulting image due to the use of the reprojection for the 3D stabilization. Depth reprojection, occlusion maps, a low resolution copy of the image (e.g., with a full field of view (FoV)), and/or Q high resolution patches from the image (e.g., 500 patches that are 64×64 in size, or other number of patches having any suitable size), can be sent to the deep learning engine (NSP) to perform inpainting. For example, the 3D stabilization engine 240 can take a patch out of one area, but does not need to read another area. The 3D stabilization engine 240 knows which areas to focus on with the high resolution patches because of the occlusion map. In some examples, the patches and the occlusion map are small (e.g., the occlusion map is binary or can include a small number of bits, such as 3 bits, 4 bits, 6 bits, etc.), making the patches inexpensive inputs to the deep learning engine (NSP) for performing inpainting. The depth reprojection can help ensure that the right type of material is used for inpainting. For instance, the deep learning engine (NSP) will not use a closeby object like the toolbox to do inpainting for a background area—the only thing that should be used for inpainting for a background area is image data from a background area at a similar depth. This smart inpainting is efficient and uses less power.

In some examples, the inpainting can use temporal filtering, using for example previous images in a video to bring in image content for a particular area. For instance, if a previous image has clear image content in an area of the scene that is is depicted in an occlusion area in the current image frame, the image data from the previous image can be used to for inpainting, and/or for the 3D stabilization to calm any wobbling. The patches can be aligned to compressed tiles, so that the inpainted patches output by the deep learning engine (NSP) can be moved into memory (e.g., directly into DRAM) for the relevant portion of the resulting image.

FIG. 29 is a conceptual diagram 2900 illustrating additional examples of a time warp 705 performed with the time warp engine 230 compared to images without the time warp engine 230 processing. The examples with the time warp engine 230 appear clearer and sharper than the images without the time warp engine 230, especially at and around edges and corners in the images. For example, edges that appear blurry are reproduced using dashed lines in FIG. 29, while edges that appear shared and clear are reproduced using solid lines in FIG. 29.

FIG. 30 is a conceptual diagram 3000 illustrating additional examples 3005 of 3D stabilization 905 performed by the 3D stabilization engine 240. The additional examples 3005 include four video frames of a video, illustrated in both original (non-stabilized) and stabilized forms. Reprojection is used to remove wobble and/or parallax movement as discussed previously.

FIG. 31 is a conceptual diagram 3100 illustrating additional examples of 3D zoom 1005 performed by the 3D zoom engine 245. The digital zoom 3105 crops and upscales as illustrated using the box with dashed lines on the left side of the figure, and the dashed lines. A depth image of the skateboarder is shown alongside the 3D depth-based zoom. The 3D depth-based zoom uses reprojection based on the depth image to simulate bringing the camera closer to the skateboarder as illustrated in the illustration 3110 of bringing the phone closer to the man.

FIG. 32 is a conceptual diagram 3200 illustrating additional examples of reprojection 1105 performed by the reprojection SAT engine 250. The reprojection 1105 shifts the perspective by an offset using reprojection from the perspective of one sensor to the perspective of a different sensor.

FIG. 33 is a conceptual diagram 3300 illustrating additional examples of head pose correction 1205 performed by the head pose correction engine 255. The depth image 3515 of the woman's head that is the basis for the reprojection is illustrated. The occlusion map 3320 of the reprojected image 1215 is also illustrated. A depiction of a relative position of a person to the camera is shown below the input image 1210, showing that the camera is taking the picture from slightly below the user's face, angled slightly upward. A depiction of a simulated relative position of the person to the camera is shown below the reprojected image 1215, showing that the simulated camera position is taking the picture from an altitude or elevation that matches an altitude or elevation of the user's face, an offset distance 3305 apart from the position from which the input image 1210 was captured, and an offset angle 3310 apart from the angle from which the input image 1210 was captured. The capture angle for the reprojected image 1215 is perpendicular to the person's face, body, and/or to gravity.

Figure 34:
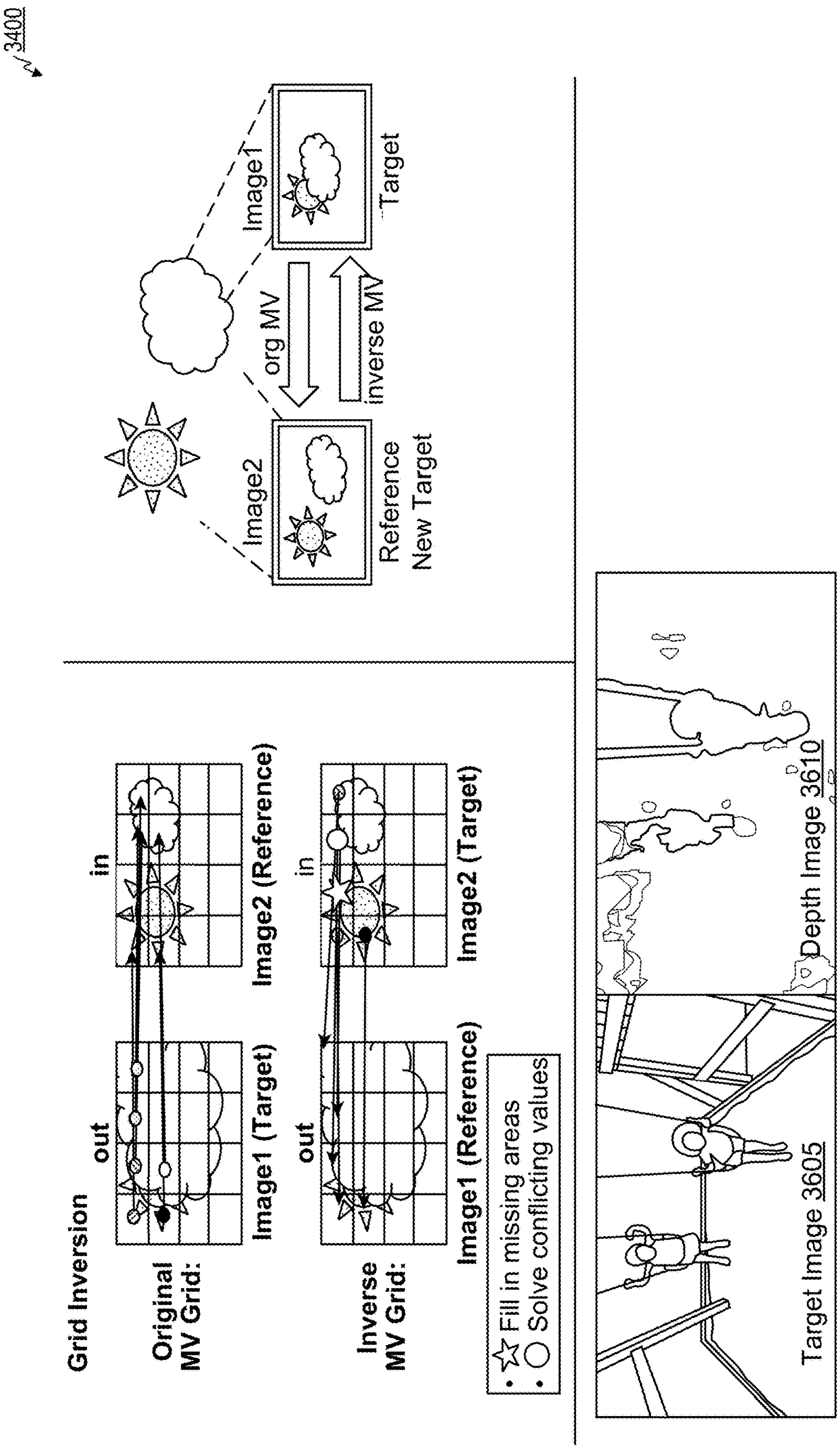
FIG. 34 is a conceptual diagram illustrating additional examples of grid inversion, in accordance with some examples.

FIG. 34 is a conceptual diagram 3400 illustrating additional examples of grid inversion. Original MV grids and inverse MV grids are illustrated for a target image with a sun and a cloud. Examples where missing content is to be filled in (via interpolation and/or inpainting) are illustrated using stars, for example where a portion of the sun was blocked by a cloud in the input image but is not in the reprojected image. Examples of conflicting values are illustrated using circles, for example where there is data for both a cloud and the sun, and the cloud data ultimately wins out because the cloud is in front of the sun.

Figure 35:
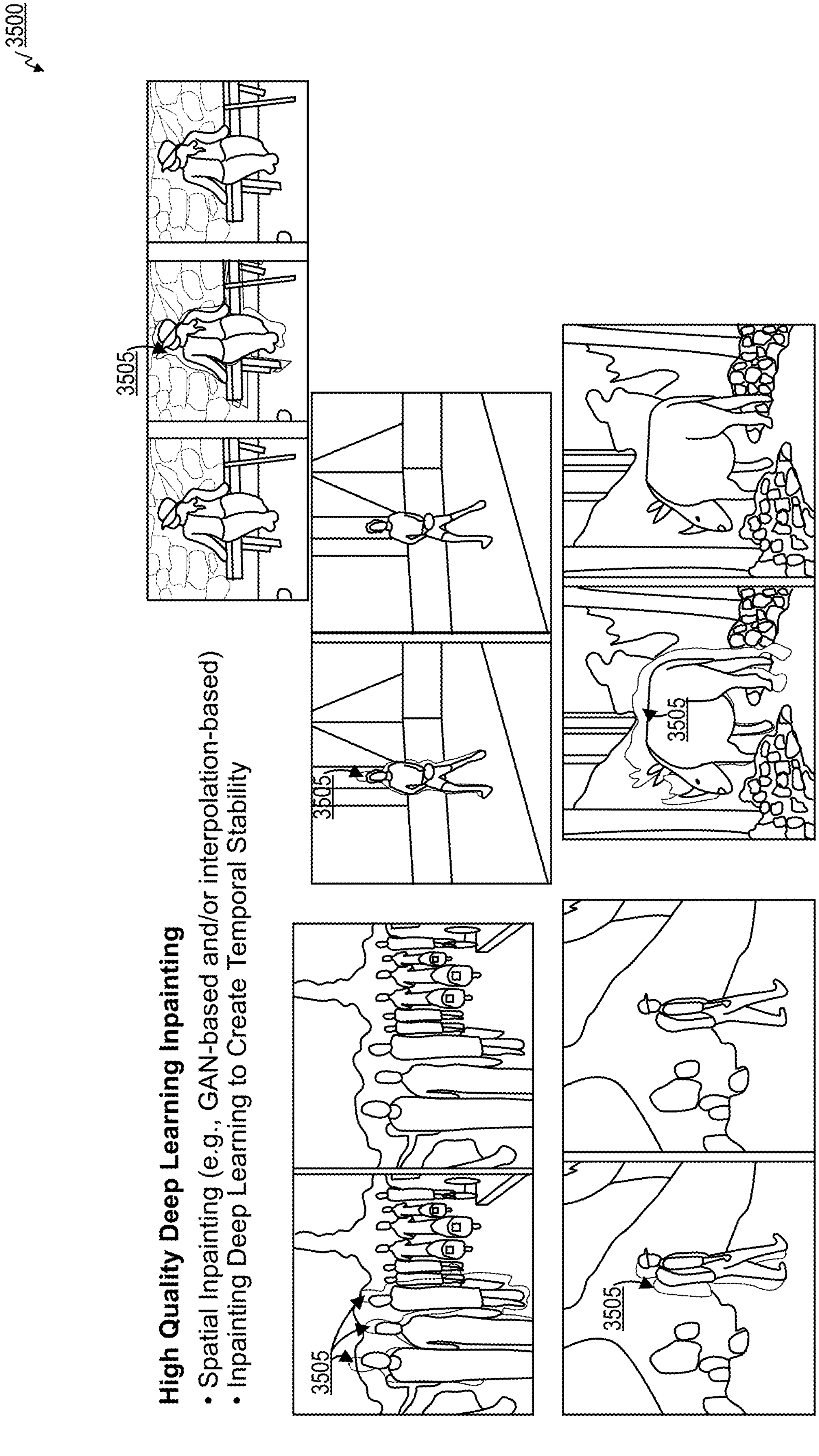
FIG. 35 is a conceptual diagram illustrating examples of use of deep learning based inpainting, in accordance with some examples.

FIG. 35 is a conceptual diagram 3500 illustrating examples of use of deep learning based inpainting. Sets of images are illustrated, with each of the sets of images including occlusion areas 3505 in one of the images of the set. The occlusion areas are illustrated as blank before being filled in using a trained deep learning inpainting engine, such as the neural network 3900.

Figure 36:
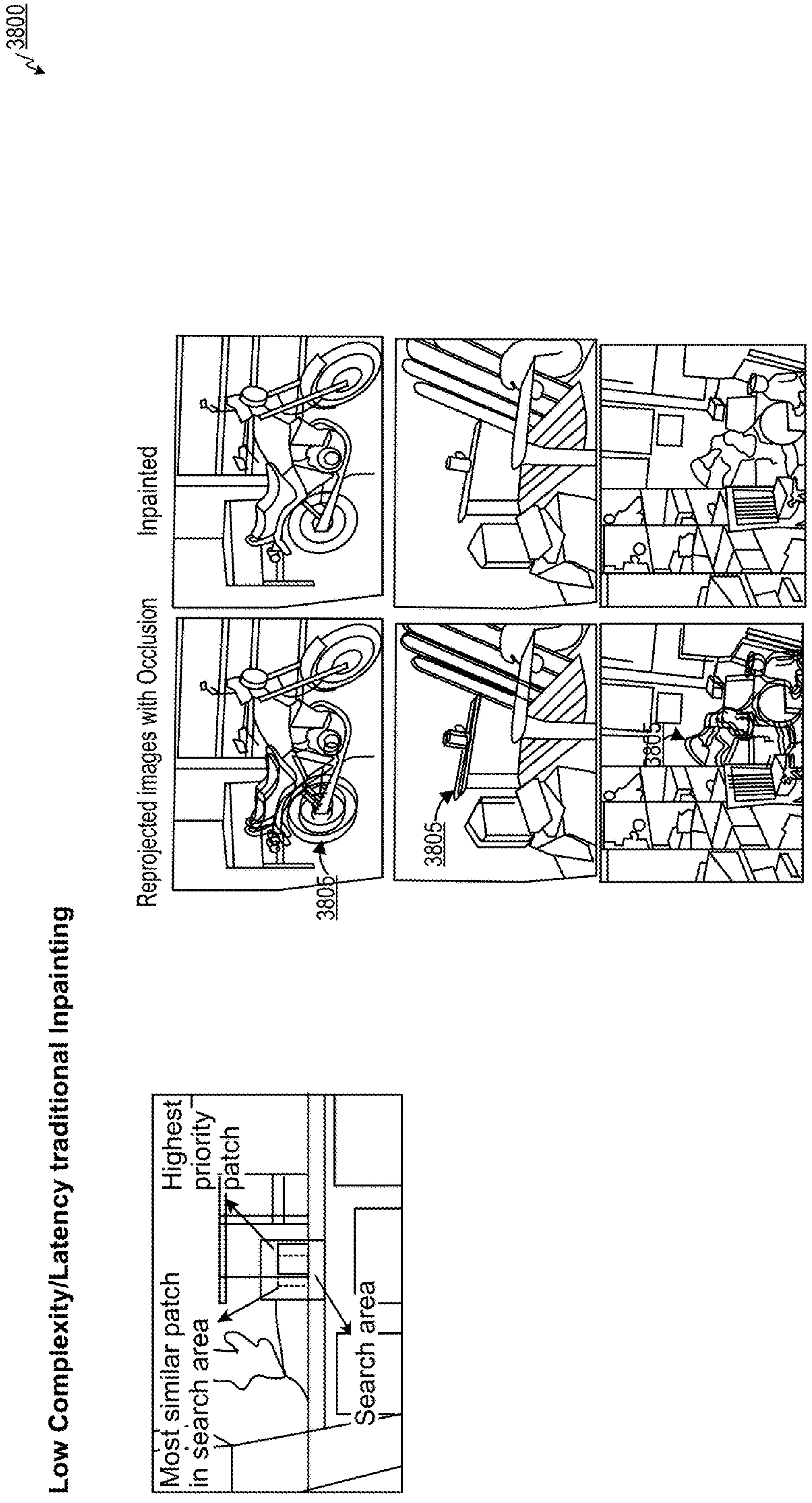
FIG. 36 is a conceptual diagram illustrating examples of use of inpainting that does not use deep learning, in accordance with some examples.

FIG. 36 is a conceptual diagram 3600 illustrating examples of use of inpainting that does not use deep learning. Sets of images are illustrated arranged in columns. A first column includes images output by a grid inversion engine (RGE) that include occlusion areas 3605, which are illustrated as blank. A second column includes images output by the grid inversion engine (RGE), where inpainting is issued to fill in the occlusion areas 3605. For example, the inpainting of FIG. 36 can use interpolation and/or in-line or nearest value inpainting. Patches for inpainting can be selected based on similarity and/or priority as illustrated. A third column includes images output by the grid inversion engine (RGE) without occlusion areas 3605. The images in the third column include blurring or visual "smearing" around some of the edges where the occlusion areas 3605 are in the first column of images, which may look similar to motion blur, and which may be caused by other positions and/or depictions of the object from the originally-captured image that is being transformed using the grid inversion engine (RGE).

Figure 37:
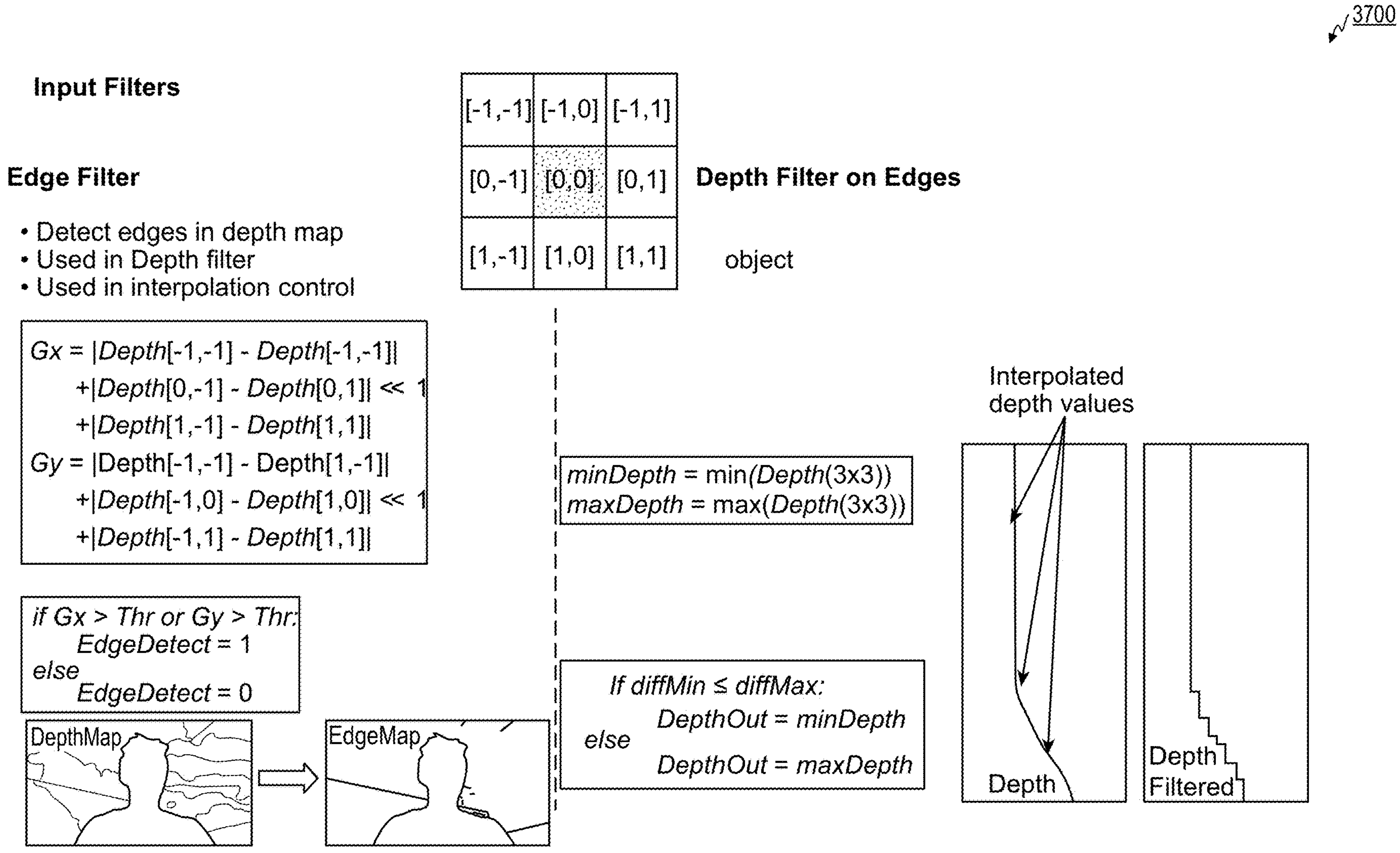
FIG. 37 is a conceptual diagram illustrating examples of use of edge filters and depth filters on edges, in accordance with some examples.

FIG. 37 is a conceptual diagram 3700 illustrating examples of use of edge filters and depth filters on edges. The edge filters can, in some examples, be used to smooth out blocky edges in depth data and/or image data, which can reduce visual artifacts in image reprojection. While the filter is shown as having a size of 3×3, the filter can be larger in some cases (e.g., 4×4, 6×6, etc.) The edge filters can detect edges in a depth map. The depth filter on edges can reduce interpolated depth values, which do not belong to any object.

Figure 38:
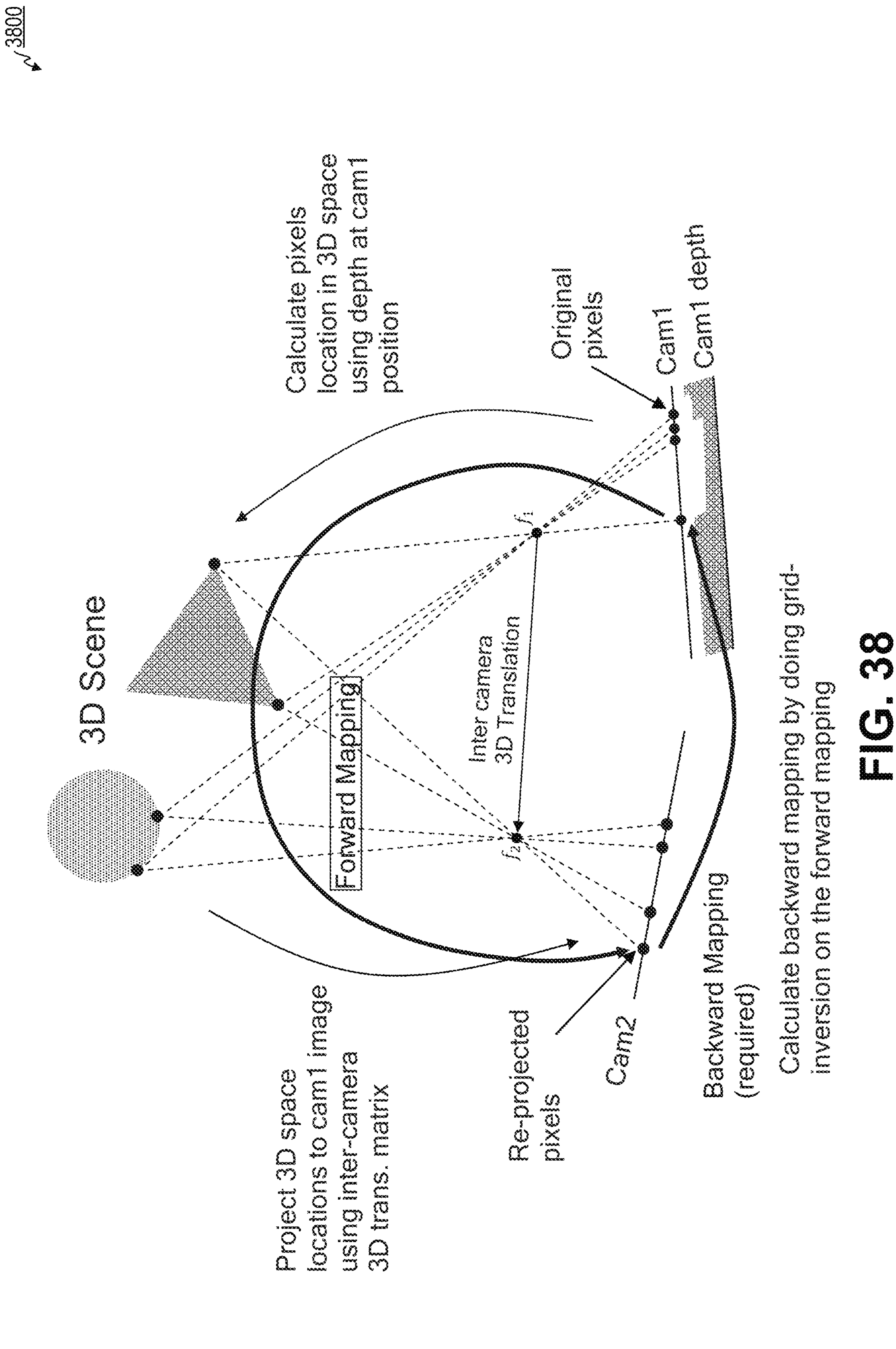
FIG. 38 is a conceptual diagram illustrating an example of reprojection, in accordance with some examples.

FIG. 38 is a conceptual diagram 3800 illustrating an example of reprojection. Sensors 205 include a camera cam1 that captures image(s) and depth data (cam1 depth) of a 3D scene. An inter-camera 3D translation is used to reproject the 3D scene depicted in the image(s) in 3D space to use a perspective a camera cam2. Forward mapping (e.g., a motion vector grid) is illustrated using dashed lines. Backward mapping (e.g., an inverse motion vector grid) is illustrated using a solid arrow from cam2 back to cam1.

Figure 39:
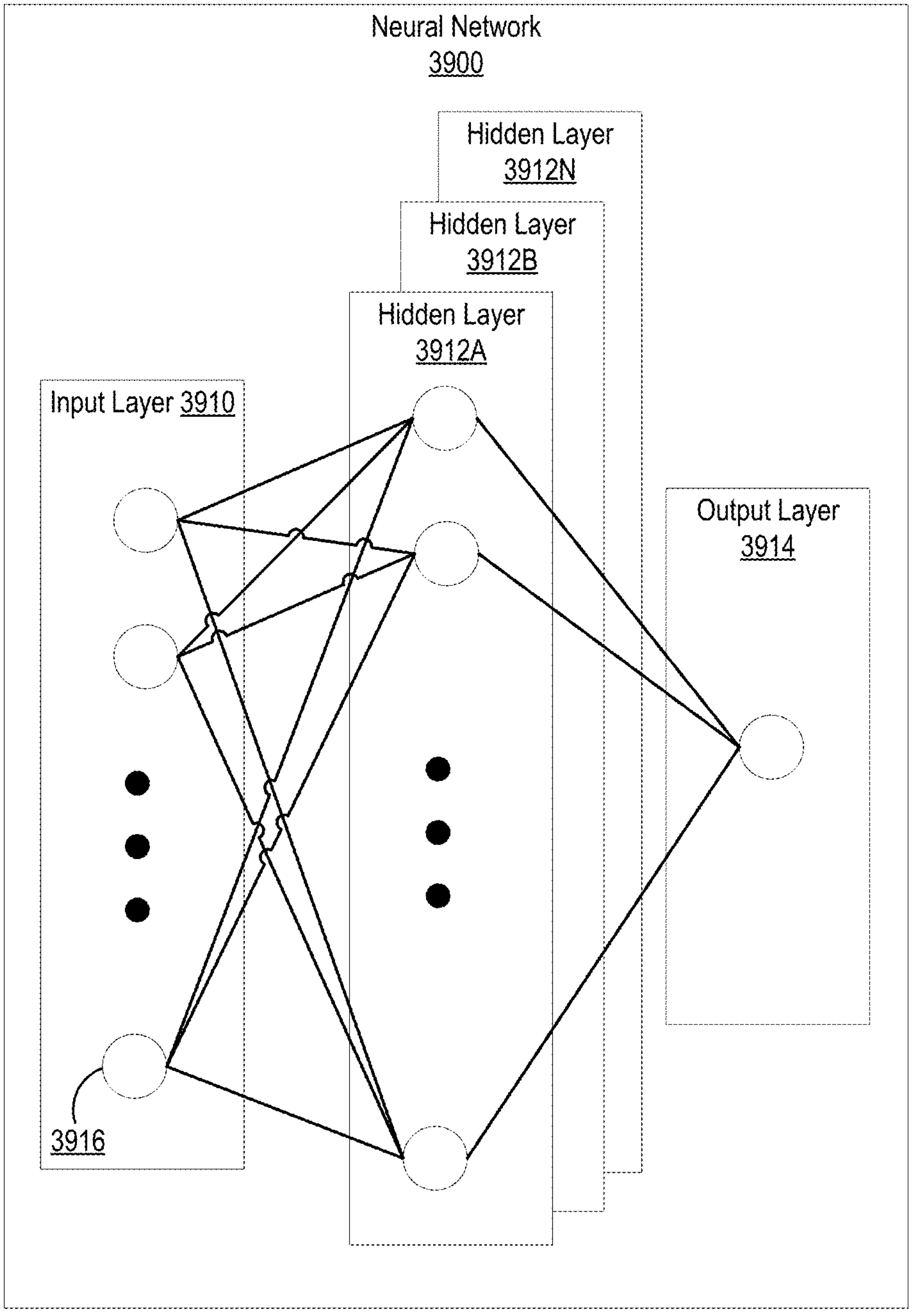
FIG. 39 is a block diagram illustrating an example of a neural network that can be used for media processing operations, in accordance with some examples.

FIG. 39 is a block diagram illustrating an example of a neural network (NN) 3900 that can be used for media processing operations. The neural network 3900 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 3900 may be an example of one of the one or more trained neural networks of the imaging system 200, such as neural networks of any of the application engines 210, such as the image reprojection engine 215, the motion vector engine 220, the grid inversion engine 225, the Time Warp Engine 230, the Depth sensor support Engine 235, the 3D Stabilization Engine 240, the 3D Zoom Engine 245, the Reprojection SAT Engine 250, the Head pose correction Engine 255, the XR Late Stage Reprojection Engine 260, the Special Effects Engine 265, or a combination thereof.

An input layer 3910 of the neural network 3900 includes input data. The input data of the input layer 3910 can include data representing the pixels of one or more input image frames, such as the media data 285, sensor data from the sensor(s) 205, virtual content from the virtual content generator 207, or a combination thereof. The input data of the input layer 3910 can include depth data from depth sensor(s). The input data of the input layer 3910 can include motion vectors and/or optical flows. The input data of the input layer 3910 can include matrices. The input data of the input layer 3910 can include occlusion maps.

The images can include image data from an image sensor including raw pixel data (including a single color per pixel based, for example, on a Bayer filter) or processed pixel values (e.g., RGB pixels of an RGB image). The neural network 3900 includes multiple hidden layers 3912A, 3912B, through 3912N. The hidden layers 3912A, 3912B, through 3912N include "N" number of hidden layers, where "N" is an integer greater than or equal to one. The number of hidden layers can be made to include as many layers as needed for the given application. The neural network 3900 further includes an output layer 3914 that provides an output resulting from the processing performed by the hidden layers 3912A, 3912B, through 3912N.

In some examples, the output layer 3914 can provide an output image, or a portion thereof such as the modified media data 290, any reprojected image discussed herein, any reprojected depth data discussed herein, any motion vector or optical flow discussed herein, any inpainting image data discussed herein, or a combination thereof.

The neural network 3900 is a multi-layer neural network of interconnected filters. Each filter can be trained to learn a feature representative of the input data. Information associated with the filters is shared among the different layers and each layer retains information as information is processed. In some cases, the neural network 3900 can include a feed-forward network, in which case there are no feedback connections where outputs of the network are fed back into itself. In some cases, the network 3900 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 3910 can activate a set of nodes in the first hidden layer 3912A. For example, as shown, each of the input nodes of the input layer 3910 can be connected to each of the nodes of the first hidden layer 3912A. The nodes of a hidden layer can transform the information of each input node by applying activation functions (e.g., filters) to this information. The information derived from the transformation can then be passed to and can activate the nodes of the next hidden layer 3912B, which can perform their own designated functions. Example functions include convolutional functions, downscaling, upscaling, data transformation, and/or any other suitable functions. The output of the hidden layer 3912B can then activate nodes of the next hidden layer, and so on. The output of the last hidden layer 3912N can activate one or more nodes of the output layer 3914, which provides a processed output image. In some cases, while nodes (e.g., node 3916) in the neural network 3900 are shown as having multiple output lines, a node has a single output and all lines shown as being output from a node represent the same output value.

In some cases, each node or interconnection between nodes can have a weight that is a set of parameters derived from the training of the neural network 3900. For example, an interconnection between nodes can represent a piece of information learned about the interconnected nodes. The interconnection can have a tunable numeric weight that can be tuned (e.g., based on a training dataset), allowing the neural network 3900 to be adaptive to inputs and able to learn as more and more data is processed.

The neural network 3900 is pre-trained to process the features from the data in the input layer 3910 using the different hidden layers 3912A, 3912B, through 3912N in order to provide the output through the output layer 3914.

Figure 40:
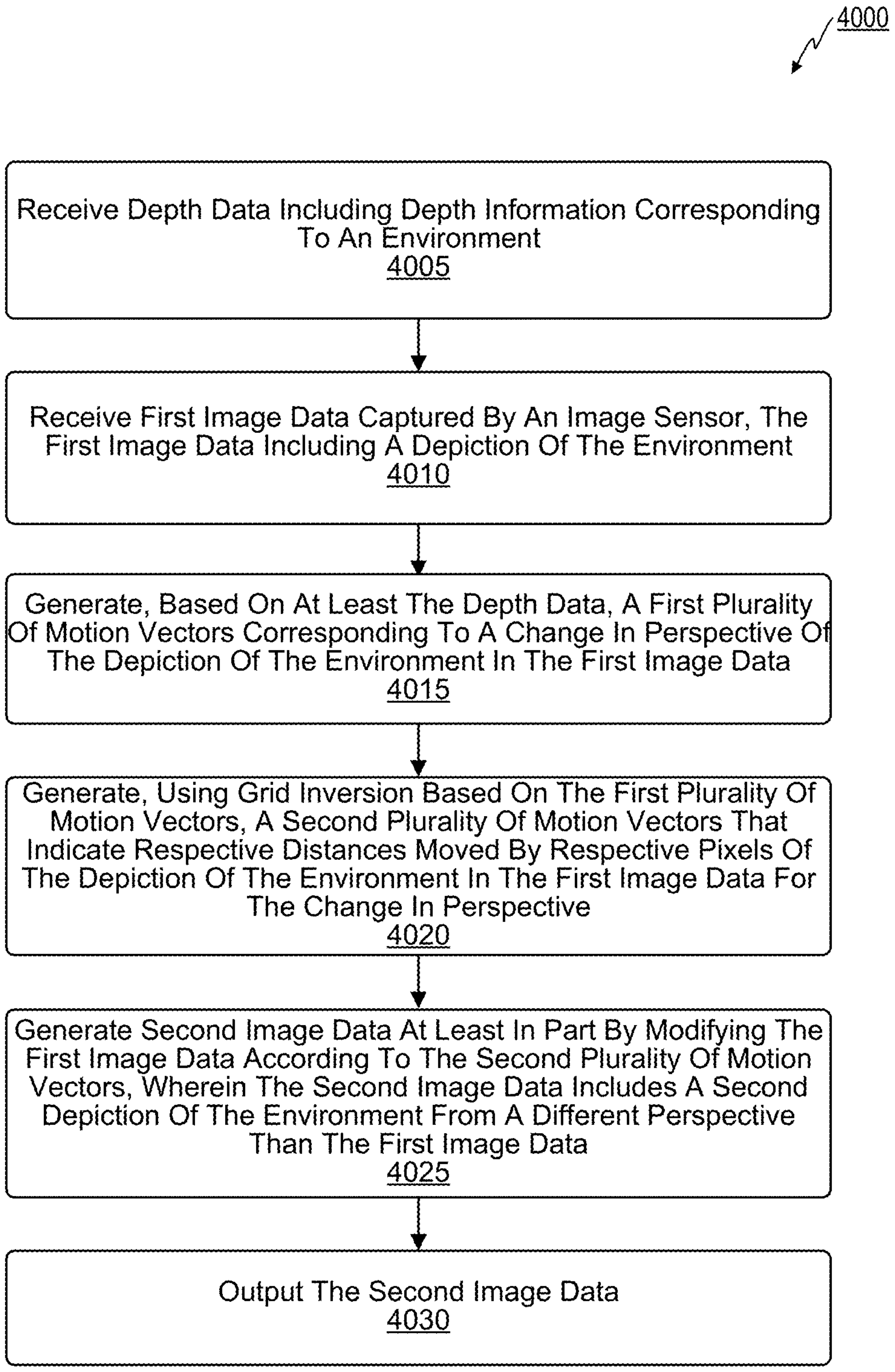
FIG. 40 is a flow diagram illustrating a process for media processing, in accordance with some examples.

FIG. 40 is a flow diagram illustrating a process for media processing operations. The process 4000 may be performed by a media processing system. In some examples, the media processing system can include, for example, the image capture and processing system 100, the image capture device 105A, the image processing device 105B, the image processor 150, the ISP 154, the host processor 152, the imaging system 200, the HMD 310, the mobile handset 410, the reprojection and grid inversion system 2490, the system of FIG. 25, the system of FIG. 26, the system of FIG. 27, the system of FIG. 28, the neural network 3900, the computing system 4100, the processor 4110, or a combination thereof.

At operation 4005, the media processing system is configured to, and can, receive depth data including depth information corresponding to an environment. In some examples, the depth information may include depth measurements for a representation of the environment from a first perspective. In some examples, the depth information includes a point cloud corresponding to the environment. In some examples, the depth data may be captured using one or more depth sensors, such as one or more light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, or combinations thereof. In some examples, the depth data may be captured using one or more cameras and/or image sensors, for instance based on stereoscopic depth sensing using a stereoscopic camera arrangement. In some examples, the depth data may be captured using the image capture and processing system 100, the sensors 205, the cameras 330A-330B, the cameras 430A-430D, the image sensors 810, the depth sensors 815, the tele sensor 1110, the wide sensor 1115, the sensor 1125, the image sensor 2610, cam1 in FIG. 38, cam2 in FIG. 38, any other sensors described herein, or a combination thereof. Examples of the depth data include the media data 285, the depth data 620, the depth data 1020, the depth data 1160, the depth data 1220, the depth data of FIG. 15, the depth map 1610, the depth data associated with the first option 1915, the depth input 2402, the depth of FIG. 26, the depth data of FIG. 27, the depth data of FIG. 28, the depth data 3315, the depth image 3410, the depth map of FIG. 37, the Cam1 depth of FIG. 38, any other depth data described herein, or a combination thereof.

At operation 4010, the media processing system is configured to, and can, receive first image data captured by an image sensor, the first image data including a depiction of the environment. In some examples, the first image data may be captured using the image capture and processing system 100, the sensors 205, the cameras 330A-330B, the cameras 430A-430D, the image sensors 810, the depth sensors 815, the tele sensor 1110, the wide sensor 1115, the sensor 1125, the image sensor 2610, cam1 in FIG. 38, cam2 in FIG. 38, any other sensors described herein, or a combination thereof. Examples of the first image data include the media data 285, the first image Img1 510, the camera image 610, the image 710, the "orig" images in FIG. 9, an original non-zoomed image of FIG. 10 (before zoom), the tele image 1130, the input image 1210, the input image 1310, the input image 1410, the captured image 1510, the captured image 1710, the input image Image1 of the flow 2310, the input image of the flow 2320, the input images without time warp 705 in FIG. 25, frames n and n-M in FIGS. 24-25, the m blurred frames of FIG. 25, the wide and tele images of FIG. 26, the input image of FIG. 27, the "orig" images of FIG. 30, the non-zoomed input image of FIG. 31, the input images of FIG. 34, the input images of FIG. 35, the input images of FIG. 36, the original pixels in FIG. 38, image(s) provided to the input layer 3910, other image data described herein, or a combination thereof.

At operation 4015, the media processing system is configured to, and can, generate, based on at least the depth data, a first plurality of motion vectors corresponding to a change in perspective of the depiction of the environment in the first image data. Examples of the first plurality of motion vectors include the motion vectors in the MV grid 505, the motion vectors (e.g., $MV_{in}$, $MV_x$, $MV_y$) of FIG. 15, the MV 1620, the dense MV of FIG. 23, motion vectors associated with the optical flow engine 2420, the MV grid of FIG. 28, the original MVs and MV grids of FIG. 34, the forward mapping of FIG. 38, other motion vectors described herein, or a combination thereof.

At operation 4020, the media processing system is configured to, and can, generate, using grid inversion based on the first plurality of motion vectors, a second plurality of motion vectors that indicate respective distances moved by respective pixels of the depiction of the environment in the first image data for the change in perspective. Examples of the second plurality of motion vectors include the motion vectors in the inverse MV grid 520, the inverse MV 1630, the inverse MV 1730, inverse motion vectors associated with the grid inversion engine 2425, the MV grid of FIG. 28, the inverse MVs and MV grids of FIG. 24, the backward mapping of FIG. 38, other inverse motion vectors described herein, or combinations thereof.

At operation 4025, the media processing system is configured to, and can, generate second image data at least in part by modifying the first image data according to the second plurality of motion vectors, wherein the second image data includes a second depiction of the environment from a different perspective than the first image data. Examples of the second image data include the modified media data 290, the second image Img2 515, the reprojected image 615, the image 715, the "stable" images of FIG. 9, the 3D zoomed images of FIG. 10, the modified tele. image 1140, the reprojected image 1215, the input image 1315, the reprojected image 1415, the reprojected image 1515, the reprojected image 1715, the reprojected image 1805, the inpainted image 1815, the reprojected image 2110, the reprojected image 2115, the reprojected image of the flow 2210, the reprojected images of the flow 2220, the reprojected images with time warp 705 in FIG. 23, an image output using the image processing engine 2440, the depth-based alignment 2710 image of FIG. 27, the time warp images of FIG. 29, the "stable" images of FIG. 30, the depth-based 3D zoomed image of FIG. 31, the output images of FIG. 34, the output images of FIG. 35, the output images of FIG. 36, the reprojected pixels in FIG. 38, image(s) output using the output layer 3914, other image data described herein, or a combination thereof.

In some examples, the second image data includes an interpolated image configured to depict the environment at a second time between a first time and a third time. In such examples, the first image data includes at least one image depicting the environment at least at one of the first time or the third time. Examples of such image interpolation can be performed using the time warp 705 as in FIGS. 7 and/or 23. In some examples, the imaging system can generate the interpolated image without using the depth data.

In some examples, the first image data includes a plurality of frames of video data that includes a parallax movement, wherein the second image data includes a stabilized variant of the plurality of frames of video data that reduces the parallax movement. For instance, the 3D stabilization 905 can stabilize, reduce, and/or eliminate parallax movements, rotations, or combinations thereof, as in FIGS. 9 and/or 30.

In some examples, the first image data includes a person looking at the image sensor from a first angle, and the second image data includes the person looking at the image sensor from a second angle that is distinct from the first angle. Examples of this include the head pose correction 1205, as in FIGS. 12 and/or 33.

In some examples, the change in perspective includes a rotation in perspective according to an angle and about an axis. In some examples, a change in perspective includes a translation in perspective according to a direction and a distance. In some examples, a change in perspective includes a transformation. In some examples, the change in perspective includes a movement along an axis between an original perspective of the depiction of the environment in the first image data and a position of an object in the environment, wherein at least a portion of the object is depicted in the first image data. In some examples, the rotations, translations, transformations, and/or movements can be identified based on what is needed to perform any of the types of reprojection and/or warping described herein, for instance in any of the examples of FIGS. 7-14. In some examples, the rotations, translations, transformations, and/or movements can be identified using a user interface. For instance, in some examples, the change in perspective includes at least one of a parallax movement in perspective or a rotation in perspective about an axis, further comprising: receiving, via a user interface, one of: an indication of a distance of the parallax movement in perspective, or an indication of an angle or an axis of the rotation in perspective.

At operation 4030, the media processing system is configured to, and can, output the second image data (e.g., using output device(s) 270). For example, the media processing system may display the second image data, output the second image data for further processing, store the second image data, any combination thereof, and/or otherwise output the second image data.

In some examples, outputting the second image data includes causing the second image data to be displayed using at least a display. In some examples, outputting the second image data includes causing the second image data to be sent to at least a recipient device using at least a communication interface.

In some examples, the media processing system is configured to, and can, identify one or more gaps in the second image data based on one or more gaps in the second plurality of motion vectors, and modify the second image data at least in part by filling in the one or more gaps in the second image data using interpolation before outputting the second image data. In some examples, the media processing system is configured to, and can, identify, basing on one or more gaps in respective endpoints of the first plurality of motion vectors, one or more gaps in the second plurality of motion vectors that cause one or more gaps in the second image data, and modify the second image data at least in part by filling in the one or more gaps in the second image data using interpolation before outputting the second image data. Examples of the gaps include the gaps n the inverse MV grid 520 (and/or in the second image Img2 515) indicated by stars in FIG. 5.

In some examples, the media processing system is configured to, and can, identify one or more occlusion areas in the second image data based on one or more gaps in the second plurality of motion vectors, and modify the second image data at least in part by filling in the one or more gaps in the second image data using inpainting before outputting the second image data. Inpainting can use interpolation, machine learning, neural networks, or a combination thereof. Examples of inpainting are illustrated in FIGS. 18, 21, 22, 28, 33, 34, 35, 36, and/or 37.

In some examples, the media processing system is configured to, and can, identify one or more occlusion areas in the second image data based on one or more gaps in the second plurality of motion vectors, and modify the second image data at least in part by filling in the one or more gaps in the second image data using inpainting using one or more trained machine learning models before outputting the second image data. Inpainting can use interpolation, machine learning, neural networks, or a combination thereof. Examples of inpainting are illustrated in FIGS. 18, 21, 22, 28, 33, 34, 35, 36, and/or 37.

In some examples, the media processing system is configured to, and can, identify one or more conflicts in the second image data based on one or more conflicting values from the first image data in the second plurality of motion vectors, and select one of the one or more conflicting values from the first image data based on movement data associated with the second plurality of motion vectors. An example of the one or more conflicts includes the conflict at cell 8 of the inverse MV grid 520.

In some examples, the depiction of the environment in the first image data depicts the environment from a first perspective, and the change in perspective is a change between the first perspective and the different perspective corresponding to the second depiction of the environment in the second image data. In some examples the first plurality of motion vectors point from the first perspective to the different perspective, and the second plurality of motion vectors point from the different perspective to the first perspective.

In some examples, the processes described herein (e.g., the process 4000 and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the HMD 310, the mobile handset 410, the reprojection and grid inversion system 2490, the system of FIG. 23, the system of FIG. 24, the system of FIG. 25, the system of FIG. 26, the system of FIG. 28, the system of FIG. 29, the neural network 3900, the computing system 4100, the processor 4110, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 41:
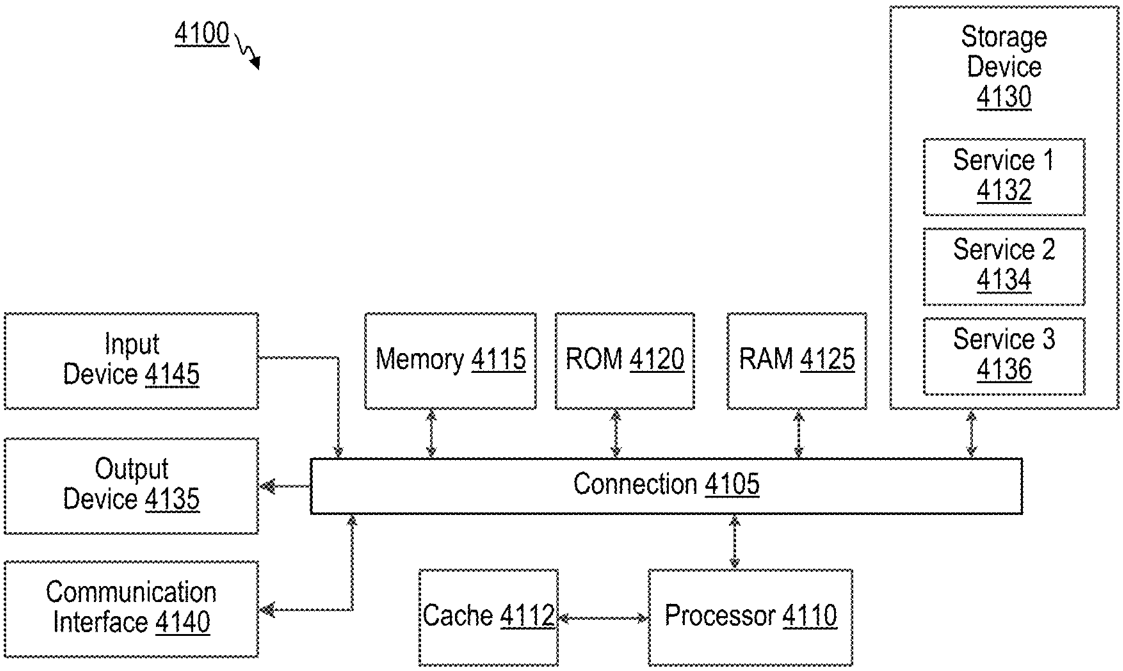
FIG. 41 is a diagram illustrating an example of a computing system for implementing certain aspects described herein.

FIG. 41 is a diagram illustrating an example of a system for implementing certain aspects of the present technology. In particular, FIG. 41 illustrates an example of computing system 4100, which can be for example any computing device making up internal computing system, a remote computing system, a camera, or any component thereof in which the components of the system are in communication with each other using connection 4105. Connection 4105 can be a physical connection using a bus, or a direct connection into processor 4110, such as in a chipset architecture. Connection 4105 can also be a virtual connection, networked connection, or logical connection.

In some embodiments, computing system 4100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 4100 includes at least one processing unit (CPU or processor) 4110 and connection 4105 that couples various system components including system memory 4115, such as read-only memory (ROM) 4120 and random access memory (RAM) 4125 to processor 4110. Computing system 4100 can include a cache 4112 of high-speed memory connected directly with, in close proximity to, or integrated as part of processor 4110.

Processor 4110 can include any general purpose processor and a hardware service or software service, such as services 4132, 4134, and 4136 stored in storage device 4130, configured to control processor 4110 as well as a special-purpose processor where software instructions are incorporated into the actual processor design. Processor 4110 may essentially be a completely self-contained computing system, containing multiple cores or processors, a bus, memory controller, cache, etc. A multi-core processor may be symmetric or asymmetric.

To enable user interaction, computing system 4100 includes an input device 4145, which can represent any number of input mechanisms, such as a microphone for speech, a touch-sensitive screen for gesture or graphical input, keyboard, mouse, motion input, speech, etc. Computing system 4100 can also include output device 4135, which can be one or more of a number of output mechanisms. In some instances, multimodal systems can enable a user to provide multiple types of input/output to communicate with computing system 4100. Computing system 4100 can include communications interface 4140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 4140 may also include one or more Global Navigation Satellite System (GNSS) receivers or transceivers that are used to determine a location of the computing system 4100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 4130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 4130 can include software services, servers, services, etc., that when the code that defines such software is executed by the processor 4110, it causes the system to perform a function. In some embodiments, a hardware service that performs a particular function can include the software component stored in a computer-readable medium in connection with the necessary hardware components, such as processor 4110, connection 4105, output device 4135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1A. An apparatus for image processing, the apparatus comprising: at least one memory; and at least one processor coupled to the at least one memory, the at least one processor configured to: e.

Aspect 2A. The apparatus of Aspect 1A, wherein the second image data includes an interpolated image configured to depict the environment at a second time between a first time and a third time, wherein the first image data includes at least one image depicting the environment at least at one of the first time or the third time.

Aspect 3A. The apparatus of any of Aspects 1A to 2A, wherein the first image data includes a plurality of frames of video data that includes a parallax movement, wherein the second image data includes a stabilized variant of the plurality of frames of video data that reduces the parallax movement.

Aspect 4A. The apparatus of any of Aspects 1A to 3A, wherein the first image data includes a person looking at the image sensor from a first angle, wherein the second image data includes the person looking at the image sensor from a second angle that is distinct from the first angle.

Aspect 5A. The apparatus of any of Aspects 1A to 4A, wherein a change in perspective includes a rotation in perspective according to an angle and about an axis.

Aspect 6A. The apparatus of any of Aspects 1A to 5A, wherein a change in perspective includes a translation in perspective according to a direction and a distance.

Aspect 7A. The apparatus of any of Aspects 1A to 6A, wherein a change in perspective includes a transformation.

Aspect 8A. The apparatus of any of Aspects 1A to 7A, wherein the change in perspective includes a movement along an axis between an original perspective of the depiction of the environment in the first image data and a position of an object in the environment, wherein at least a portion of the object is depicted in the first image data.

Aspect 9A. The apparatus of any of Aspects 1A to 8A, wherein the at least one processor is configured to: identify one or more gaps in the second image data based on one or more gaps in the second plurality of motion vectors; and modify the second image data at least in part by filling in the one or more gaps in the second image data using interpolation before outputting the second image data.

Aspect 10A. The apparatus of any of Aspects 1A to 9A, wherein the at least one processor is configured to: identify one or more occlusion areas in the second image data based on one or more gaps in the second plurality of motion vectors; and modify the second image data at least in part by filling in the one or more gaps in the second image data using inpainting before outputting the second image data.

Aspect 11A. The apparatus of any of Aspects 1A to 10A, wherein the at least one processor is configured to: identify one or more occlusion areas in the second image data based on one or more gaps in the second plurality of motion vectors; and modify the second image data at least in part by filling in the one or more gaps in the second image data using inpainting using one or more trained machine learning models before outputting the second image data.

Aspect 12A. The apparatus of any of Aspects 1A to 11A, wherein the at least one processor is configured to: identify one or more conflicts in the second image data based on one or more conflicting values from the first image data in the second plurality of motion vectors; and select one of the one or more conflicting values from the first image data based on movement data associated with the second plurality of motion vectors.

Aspect 13A. The apparatus of any of Aspects 1A to 12A, wherein the depth information includes a three-dimensional representation of an environment from a first perspective.

Aspect 14A. The apparatus of any of Aspects 1A to 13A, wherein the depth data is received from at least one depth sensor.

Aspect 15A. The apparatus of any of Aspects 1A to 14A, further comprising: a display, wherein, to output the second image data, the at least one processor is configured to display the second image data using at least the display.

Aspect 16A. The apparatus of any of Aspects 1A to 15A, further comprising: a communication interface, wherein, to output the second image data, the at least one processor is configured to send at least the second image data to at least a recipient device using at least the communication interface.

Aspect 17A. The apparatus of any of Aspects 1A to 16A, wherein the apparatus includes at least one of a head-mounted display (HMD), a mobile handset, or a wireless communication device.

Aspect 18A. The apparatus of any of Aspects 1A to 17A, wherein the depiction of the environment in the first image data depicts the environment from a first perspective, wherein the change in perspective is a change between the first perspective and the different perspective corresponding to the second depiction of the environment in the second image data.

Aspect 19A. The apparatus of any of Aspects 1A to 18A, wherein the change in perspective includes at least one of a parallax movement in perspective or a rotation in perspective about an axis, wherein the at least one processor is configured to: receive, via a user interface, one of: an indication of a distance of the parallax movement in perspective, or an indication of an angle or an axis of the rotation in perspective.

Aspect 20A. The apparatus of any of Aspects 1A to 19, wherein the at least one processor is configured to: identify, based on one or more gaps in respective endpoints of the first plurality of motion vectors, one or more gaps in the second plurality of motion vectors that cause one or more gaps in the second image data; and modify the second image data at least in part by filling in the one or more gaps in the second image data using interpolation before outputting the second image data.

Aspect 21A. A method for image processing, the method comprising: receiving depth data including depth information corresponding to an environment; receiving first image data captured by an image sensor, the first image data including a depiction of the environment; generating, based on at least the depth data, a first plurality of motion vectors corresponding to a change in perspective of the depiction of the environment in the first image data; generating, using grid inversion based on the first plurality of motion vectors, a second plurality of motion vectors that indicate respective distances moved by respective pixels of the depiction of the environment in the first image data for the change in perspective; generating second image data at least in part by modifying the first image data according to the second plurality of motion vectors, wherein the second image data includes a second depiction of the environment from a different perspective than the first image data; and outputting the second image data.

Aspect 22A. The method of Aspect 21A, wherein the second image data includes an interpolated image configured to depict the environment at a second time between a first time and a third time, wherein the first image data includes at least one image depicting the environment at least at one of the first time or the third time.

Aspect 23A. The method of any of Aspects 21A to 22A, wherein the first image data includes a plurality of frames of video data that includes a parallax movement, wherein the second image data includes a stabilized variant of the plurality of frames of video data that reduces the parallax movement.

Aspect 24A. The method of any of Aspects 21A to 23A, wherein the first image data includes a person looking at the image sensor from a first angle, wherein the second image data includes the person looking at the image sensor from a second angle that is distinct from the first angle.

Aspect 25A. The method of any of Aspects 21A to 24A, wherein a change in perspective includes a rotation in perspective according to an angle and about an axis.

Aspect 26A. The method of any of Aspects 21A to 25A, wherein a change in perspective includes a translation in perspective according to a direction and a distance.

Aspect 27A. The method of any of Aspects 21A to 26A, wherein a change in perspective includes a transformation.

Aspect 28A. The method of any of Aspects 21A to 27A, wherein the change in perspective includes a movement along an axis between an original perspective of the depiction of the environment in the first image data and a position of an object in the environment, wherein at least a portion of the object is depicted in the first image data.

Aspect 29A. The method of any of Aspects 21A to 28A, further comprising: identifying one or more gaps in the second image data based on one or more gaps in the second plurality of motion vectors; and modifying the second image data at least in part by filling in the one or more gaps in the second image data using interpolation before outputting the second image data.

Aspect 30A. The method of any of Aspects 21A to 29A, further comprising: identifying one or more occlusion areas in the second image data based on one or more gaps in the second plurality of motion vectors; and modifying the second image data at least in part by filling in the one or more gaps in the second image data using inpainting before outputting the second image data.

Aspect 31A. The method of any of Aspects 21A to 30A, further comprising: identifying one or more occlusion areas in the second image data based on one or more gaps in the second plurality of motion vectors; and modifying the second image data at least in part by filling in the one or more gaps in the second image data using inpainting using one or more trained machine learning models before outputting the second image data.

Aspect 32A. The method of any of Aspects 21A to 31A, further comprising: identifying one or more conflicts in the second image data based on one or more conflicting values from the first image data in the second plurality of motion vectors; and selecting one of the one or more conflicting values from the first image data based on movement data associated with the second plurality of motion vectors.

Aspect 33A. The method of any of Aspects 21A to 32A, wherein the depth information includes a three-dimensional representation of an environment from a first perspective.

Aspect 34A. The method of any of Aspects 21A to 33A, wherein the depth data is received from at least one depth sensor.

Aspect 35A. The method of any of Aspects 21A to 34A, wherein outputting the second image data includes causing the second image data to be displayed using at least a display.

Aspect 36A. The method of any of Aspects 21A to 35A, wherein outputting the second image data includes causing the second image data to be sent to at least a recipient device using at least a communication interface.

Aspect 37A. The method of any of Aspects 21A to 36A, wherein the method is performed using an apparatus that includes at least one of a head-mounted display (HMD), a mobile handset, or a wireless communication device.

Aspect 38A. The method of any of Aspects 21A to 37A, wherein the depiction of the environment in the first image data depicts the environment from a first perspective, wherein the change in perspective is a change between the first perspective and the different perspective corresponding to the second depiction of the environment in the second image data.

Aspect 39A. The method of any of Aspects 21A to 38A, wherein the change in perspective includes at least one of a parallax movement in perspective or a rotation in perspective about an axis, further comprising: receiving, via a user interface, one of: an indication of a distance of the parallax movement in perspective, or an indication of an angle or an axis of the rotation in perspective.

Aspect 40A. The method of any of Aspects 21A to 39A, further comprising: identifying, based on one or more gaps in respective endpoints of the first plurality of motion vectors, one or more gaps in the second plurality of motion vectors that cause one or more gaps in the second image data; and modifying the second image data at least in part by filling in the one or more gaps in the second image data using interpolation before outputting the second image data.

Aspect 41A: A non-transitory computer-readable medium having stored thereon instructions that, when executed by one or more processors, cause the one or more processors to: receive depth data including depth information corresponding to an environment; receive first image data captured by an image sensor, the first image data including a depiction of the environment; generate, based on at least the depth data, a first plurality of motion vectors corresponding to a change in perspective of the depiction of the environment in the first image data; generate, using grid inversion based on the first plurality of motion vectors, a second plurality of motion vectors that indicate respective distances moved by respective pixels of the depiction of the environment in the first image data for the change in perspective; generate second image data at least in part by modifying the first image data according to the second plurality of motion vectors, wherein the second image data includes a second depiction of the environment from a different perspective than the first image data; and output the second image data.

Aspect 42A: The non-transitory computer-readable medium of Aspect 41A, further comprising operations according to any of Aspects 2A to 20A, and/or any of Aspects 22A to 40A.

Aspect 43A: An apparatus for image processing, the apparatus comprising: means for receiving first image data captured by an image sensor, the first image data including a depiction of the environment; means for generating, based on at least the depth data, a first plurality of motion vectors corresponding to a change in perspective of the depiction of the environment in the first image data; means for generating, using grid inversion based on the first plurality of motion vectors, a second plurality of motion vectors that indicate respective distances moved by respective pixels of the depiction of the environment in the first image data for the change in perspective; means for generating second image data at least in part by modifying the first image data according to the second plurality of motion vectors, wherein the second image data includes a second depiction of the environment from a different perspective than the first image data; and means for outputting the second image data.

Aspect 44A: The apparatus of Aspect 43A, further comprising means for performing operations according to any of Aspects 2A to 20A, and/or any of Aspects 22A to 40A.

Aspect 1B. An apparatus for image processing, the apparatus comprising. at least one memory; and one or more processors coupled to the at least one memory, the one or more processors configured to. receive depth data captured by a depth sensor, the depth data including a three-dimensional representation of an environment from a first perspective; determine, based on at least the depth data, a first plurality of motion vectors corresponding to a change from the first perspective to a second perspective; receive first image data captured by an image sensor, the first image data depicting the environment from a third perspective; determine, using grid inversion based on the first plurality of motion vectors, a second plurality of motion vectors corresponding to a change from the third perspective to a fourth perspective; generate second image data at least in part by modifying the first image data according to the second plurality of motion vectors, the second image data depicting the environment from the fourth perspective; and output the second image data.

Aspect 2B. The apparatus of Aspect 1B, wherein the second image data includes an interpolated image configured to depict the environment at a second time between a first time and a third time, wherein the first image data includes a first image depicting the environment at the first time and a second image depicting the environment at the third time.

Aspect 3B. The apparatus of any of Aspects 1B to 2B, wherein the first image data includes video data that includes a parallax movement, wherein the second image data includes a stabilized variant of the video data without the parallax movement.

Aspect 4B. The apparatus of any of Aspects 1B to 3B, wherein the first image data includes depicts a person looking at the image sensor from a first angle, wherein the second image data includes depicts the person looking at the image sensor from a second angle that is distinct from the first angle.

Aspect 5B. The apparatus of any of Aspects 1B to 4B, wherein the fourth perspective is the first perspective.

Aspect 6B. The apparatus of any of Aspects 1B to 5B, wherein the fourth perspective is the second perspective.

Aspect 7B. The apparatus of any of Aspects 1B to 6B, wherein a change from the first perspective to the second perspective includes a rotation in perspective according to an angle, wherein a change from the third perspective to the fourth perspective includes the rotation in perspective according to the angle.

Aspect 8B. The apparatus of any of Aspects 1B to 7B, wherein a change from the first perspective to the second perspective includes a translation in perspective according to a direction and a distance, wherein a change from the third perspective to the fourth perspective includes the translation in perspective according to the direction and the distance.

Aspect 9B. The apparatus of any of Aspects 1B to 8B, wherein a change from the first perspective to the second perspective includes a transformation, wherein a change from the third perspective to the fourth perspective includes the transformation.

Aspect 10B. The apparatus of any of Aspects 1B to 9B, wherein the one or more processors are configured to. identify one or more gaps in the second image data based on one or more gaps in the second plurality of motion vectors; and modify the second image data at least in part by filling in the one or more gaps in the second image data using interpolation before outputting the second image data.

Aspect 11B. The apparatus of any of Aspects 1B to 10B, wherein the one or more processors are configured to. identify one or more occlusion areas in the second image data based on one or more gaps in the second plurality of motion vectors; and modify the second image data at least in part by filling in the one or more gaps in the second image data using inpainting before outputting the second image data.

Aspect 12B. A method of image processing, the method comprising. receiving depth data captured by a depth sensor, the depth data including a three-dimensional representation of an environment from a first perspective; determining, based on at least the depth data, a first plurality of motion vectors corresponding to a change from the first perspective to a second perspective; receiving first image data captured by an image sensor, the first image data depicting the environment from a third perspective; determining, using grid inversion based on the first plurality of motion vectors, a second plurality of motion vectors corresponding to a change from the third perspective to a fourth perspective; generating second image data at least in part by modifying the first image data according to the second plurality of motion vectors, the second image data depicting the environment from the fourth perspective; and outputting the second image data.

Aspect 13B. The method of Aspect 12B, wherein the second image data includes an interpolated image configured to depict the environment at a second time between a first time and a third time, wherein the first image data includes a first image depicting the environment at the first time and a second image depicting the environment at the third time.

Aspect 14B. The method of any of Aspects 12B to 13B, wherein the first image data includes video data that includes a parallax movement, wherein the second image data includes a stabilized variant of the video data without the parallax movement.

Aspect 15B. The method of any of Aspects 12B to 14B, wherein the first image data includes depicts a person looking at the image sensor from a first angle, wherein the second image data includes depicts the person looking at the image sensor from a second angle that is distinct from the first angle.

Aspect 16B. The method of any of Aspects 12B to 15BB, wherein the fourth perspective is the first perspective.

Aspect 17B. The method of any of Aspects 12B to 16B, wherein the fourth perspective is the second perspective.

Aspect 18B. The method of any of Aspects 12B to 17B, wherein a change from the first perspective to the second perspective includes a rotation in perspective according to an angle, wherein a change from the third perspective to the fourth perspective includes the rotation in perspective according to the angle.

Aspect 19B. The method of any of Aspects 12B to 18B, wherein a change from the first perspective to the second perspective includes a translation in perspective according to a direction and a distance, wherein a change from the third perspective to the fourth perspective includes the translation in perspective according to the direction and the distance.

Aspect 20B. The method of any of Aspects 12B to 19B, wherein a change from the first perspective to the second perspective includes a transformation, wherein a change from the third perspective to the fourth perspective includes the transformation.

Aspect 21B. The method of any of Aspects 12B to 20B, further comprising. identifying one or more gaps in the second image data based on one or more gaps in the second plurality of motion vectors; and modifying the second image data at least in part by filling in the one or more gaps in the second image data using interpolation before outputting the second image data.

Aspect 22B. The method of any of Aspects 12B to 21B, further comprising. identifying one or more occlusion areas in the second image data based on one or more gaps in the second plurality of motion vectors; and modifying the second image data at least in part by filling in the one or more gaps in the second image data using inpainting before outputting the second image data.

Aspect 23B. A non-transitory computer-readable medium having stored thereon instructions that, when executed by one or more processors, cause the one or more processors to perform operations according to any of Aspects 1B to 22B.

Aspect 24B. An apparatus for image processing, the apparatus comprising one or more means for performing operations according to any of Aspects 1B to 22B.

What is claimed is:

1. An apparatus for image processing, the apparatus comprising:

at least one memory; and at least one processor coupled to the at least one memory, the at least one processor configured to:

receive depth data including depth information corresponding to an environment;

receive first image data captured by an image sensor, the first image data including a depiction of the environment;

generate, based on at least the depth data, a first plurality of motion vectors corresponding to a change in perspective of the depiction of the environment in the first image data;

generate, using grid inversion to modify at least one characteristic of the first plurality of motion vectors, a second plurality of motion vectors that indicate respective distances moved by respective pixels of the depiction of the environment in the first image data for the change in perspective;

generate second image data at least in part by modifying the first image data according to the second plurality of motion vectors, wherein the second image data includes a second depiction of the environment from a different perspective than the first image data; and output the second image data.

2. The apparatus of claim 1, wherein the second image data includes an interpolated image configured to depict the environment at a second time between a first time and a third time, wherein the first image data includes at least one image depicting the environment at least at one of the first time or the third time.

3. The apparatus of claim 1, wherein the first image data includes a plurality of frames of video data that includes a parallax movement, wherein the second image data includes a stabilized variant of the plurality of frames of video data that reduces the parallax movement.

4. The apparatus of claim 1, wherein the first image data includes a person looking at the image sensor from a first angle, wherein the second image data includes the person looking at the image sensor from a second angle that is distinct from the first angle.

5. The apparatus of claim 1, wherein a change in perspective includes a rotation in perspective according to an angle and about an axis.

6. The apparatus of claim 1, wherein a change in perspective includes a translation in perspective according to a direction and a distance.

7. The apparatus of claim 1, wherein a change in perspective includes a transformation.

8. The apparatus of claim 1, wherein the change in perspective includes a movement along an axis between an original perspective of the depiction of the environment in the first image data and a position of an object in the environment, wherein at least a portion of the object is depicted in the first image data.

9. The apparatus of claim 1, wherein the at least one processor is configured to:

identify one or more gaps in the second image data based on one or more gaps in the second plurality of motion vectors; and modify the second image data at least in part by filling in the one or more gaps in the second image data using interpolation before outputting the second image data.

10. The apparatus of claim 1, wherein the at least one processor is configured to:

identify one or more occlusion areas in the second image data based on one or more gaps in the second plurality of motion vectors; and modify the second image data at least in part by filling in the one or more gaps in the second image data using inpainting before outputting the second image data.

11. The apparatus of claim 1, wherein the at least one processor is configured to:

identify one or more occlusion areas in the second image data based on one or more gaps in the second plurality of motion vectors; and modify the second image data at least in part by filling in the one or more gaps in the second image data using inpainting using one or more trained machine learning models before outputting the second image data.

12. The apparatus of claim 1, wherein the at least one processor is configured to:

identify one or more conflicts in the second image data based on one or more conflicting values from the first image data in the second plurality of motion vectors; and select one of the one or more conflicting values from the first image data based on movement data associated with the second plurality of motion vectors.

13. The apparatus of claim 1, wherein the depth information includes a three-dimensional representation of an environment from a first perspective.

14. The apparatus of claim 1, wherein the depth data is received from at least one depth sensor.

15. The apparatus of claim 1, further comprising:

a display, wherein, to output the second image data, the at least one processor is configured to display the second image data using at least the display.

16. The apparatus of claim 1, further comprising:

a communication interface, wherein, to output the second image data, the at least one processor is configured to send at least the second image data to at least a recipient device using at least the communication interface.

17. The apparatus of claim 1, wherein the apparatus includes at least one of a head-mounted display (HMD), a mobile handset, or a wireless communication device.

18. A method for image processing, the method comprising:

receiving depth data including depth information corresponding to an environment;

receiving first image data captured by an image sensor, the first image data including a depiction of the environment;

generating, based on at least the depth data, a first plurality of motion vectors corresponding to a change in perspective of the depiction of the environment in the first image data;

generating, using grid inversion to modify at least one characteristic of the first plurality of motion vectors, a second plurality of motion vectors that indicate respective distances moved by respective pixels of the depiction of the environment in the first image data for the change in perspective;

generating second image data at least in part by modifying the first image data according to the second plurality of motion vectors, wherein the second image data includes a second depiction of the environment from a different perspective than the first image data; and outputting the second image data.

19. The method of claim 18, wherein the second image data includes an interpolated image configured to depict the environment at a second time between a first time and a third time, wherein the first image data includes at least one image depicting the environment at least at one of the first time or the third time.

20. The method of claim 18, wherein the first image data includes a plurality of frames of video data that includes a parallax movement, wherein the second image data includes a stabilized variant of the plurality of frames of video data that reduces the parallax movement.

21. The method of claim 18, wherein the first image data includes a person looking at the image sensor from a first angle, wherein the second image data includes the person looking at the image sensor from a second angle that is distinct from the first angle.

22. The method of claim 18, wherein a change in perspective includes a rotation in perspective according to an angle and about an axis.

23. The method of claim 18, wherein a change in perspective includes a translation in perspective according to a direction and a distance.

24. The method of claim 18, wherein a change in perspective includes a transformation.

25. The method of claim 18, wherein the change in perspective includes a movement along an axis between an original perspective of the depiction of the environment in the first image data and a position of an object in the environment, wherein at least a portion of the object is depicted in the first image data.

26. The method of claim 18, further comprising:

identifying one or more gaps in the second image data based on one or more gaps in the second plurality of motion vectors; and modifying the second image data at least in part by filling in the one or more gaps in the second image data using interpolation before outputting the second image data.

27. The method of claim 18, further comprising:

identifying one or more occlusion areas in the second image data based on one or more gaps in the second plurality of motion vectors; and modifying the second image data at least in part by filling in the one or more gaps in the second image data using inpainting before outputting the second image data.

28. The method of claim 18, further comprising:

identifying one or more occlusion areas in the second image data based on one or more gaps in the second plurality of motion vectors; and modifying the second image data at least in part by filling in the one or more gaps in the second image data using inpainting using one or more trained machine learning models before outputting the second image data.

29. The method of claim 18, further comprising:

identifying one or more conflicts in the second image data based on one or more conflicting values from the first image data in the second plurality of motion vectors; and selecting one of the one or more conflicting values from the first image data based on movement data associated with the second plurality of motion vectors.

30. The method of claim 18, wherein outputting the second image data includes causing the second image data to be displayed using at least a display.

* * * * *